US010155517B2

(12) United States Patent
Tohta et al.

(10) Patent No.: US 10,155,517 B2
(45) Date of Patent: Dec. 18, 2018

(54) ENGINE CONTROL DEVICE FOR VEHICLE AND ENGINE CONTROL METHOD FOR VEHICLE

(71) Applicant: JATCO Ltd, Fuji-shi, Shizuoka (JP)

(72) Inventors: Yuzuru Tohta, Kanagawa (JP); Hideshi Wakayama, Hadano (JP); Mamiko Inoue, Ebina (JP); Takuichiro Inoue, Fujisawa (JP)

(73) Assignee: JATCO LTD, Fuji-shi (JP)

( * ) Notice: Subject to any disclaimer, the term of this patent is extended or adjusted under 35 U.S.C. 154(b) by 190 days.

(21) Appl. No.: 15/124,994

(22) PCT Filed: Feb. 26, 2015

(86) PCT No.: PCT/JP2015/055542
§ 371 (c)(1),
(2) Date: Sep. 9, 2016

(87) PCT Pub. No.: WO2015/146451
PCT Pub. Date: Oct. 1, 2015

(65) Prior Publication Data
US 2017/0021834 A1 Jan. 26, 2017

(30) Foreign Application Priority Data
Mar. 25, 2014 (JP) .................... 2014-062210

(51) Int. Cl.
*B60W 10/115* (2012.01)
*B60W 30/18* (2012.01)
(Continued)

(52) U.S. Cl.
CPC ............ *B60W 30/18* (2013.01); *B60W 10/04* (2013.01); *B60W 10/06* (2013.01); *B60W 10/11* (2013.01);
(Continued)

(58) Field of Classification Search
CPC ......... Y10T 477/6895; F16H 2037/028; F16H 61/0437; F16H 2061/0087;
(Continued)

(56) References Cited

U.S. PATENT DOCUMENTS 4,682,518 A * 7/1987 Takada .................. F16H 37/022
475/209
2010/0227736 A1 9/2010 Takahashi et al.
(Continued)

FOREIGN PATENT DOCUMENTS

EP 0 414 547 A2 2/1991
EP 2 228 562 A1 9/2010
(Continued)

*Primary Examiner* — Roger L Pang
(74) *Attorney, Agent, or Firm* — Foley & Lardner LLP

(57) ABSTRACT

An engine control device for a vehicle including a power train where a continuously variable transmission is coupled to an engine, includes engine torque control means configured to control the engine so as to obtain an basic engine torque corresponding to an operating state of the vehicle, and command means configured to command engine torque control means to increase an engine torque from the basic engine torque during a gear shifting from a first speed stage to a second speed stage. The continuously variable transmission includes a continuously variable transmission mechanism, an auxiliary transmission mechanism that includes at least a first engagement portion and a second engagement portion to achieve the gear shifting from the first speed stage to the second speed stage, and shift control means configured to set a target value of a transmission gear ratio of the entire continuously variable transmission mechanism and the auxiliary transmission mechanism based on the operating state of the vehicle to control the continuously variable transmission mechanism such that the target value is achieved.

20 Claims, 35 Drawing Sheets

(51) Int. Cl.
*B60W 10/04* (2006.01)
*B60W 10/06* (2006.01)
*B60W 10/11* (2012.01)
*F16H 61/662* (2006.01)
*F16H 61/04* (2006.01)
*F16H 37/02* (2006.01)
*F16H 61/00* (2006.01)

(52) U.S. Cl.
CPC ....... *B60W 10/115* (2013.01); *F16H 61/0437* (2013.01); *F16H 61/66259* (2013.01); *B60W 2400/00* (2013.01); *B60W 2510/0638* (2013.01); *B60W 2510/0657* (2013.01); *B60W 2710/02* (2013.01); *B60W 2710/0666* (2013.01); *B60W 2710/10* (2013.01); *F16H 37/022* (2013.01); *F16H 2037/028* (2013.01); *F16H 2061/0087* (2013.01); *F16H 2061/0477* (2013.01); *Y10T 477/6895* (2015.01)

(58) Field of Classification Search
CPC .......... F16H 2061/0477; F16H 37/022; B60W 30/18; B60W 10/06; B60W 10/11; B60W 10/115; B60W 2510/0657; B60W 2510/0638; B60W 2710/0666; B60W 2710/10; B60W 2710/02
USPC .................................................. 475/208, 209
See application file for complete search history.

(56) References Cited

U.S. PATENT DOCUMENTS

| | | |
|---|---|---|
| 2011/0015833 A1 | 1/2011 | Urata et al. |
| 2017/0159729 A1* | 6/2017 | Sakamoto ............... F16H 61/00 |
| 2017/0210373 A1* | 7/2017 | Kawamoto ............... B60K 6/36 |

FOREIGN PATENT DOCUMENTS

| | | |
|---|---|---|
| EP | 2 275 706 A1 | 1/2011 |
| EP | 2 275 714 A2 | 1/2011 |
| JP | 2007-092665 A | 4/2007 |
| JP | 2010-209946 A | 9/2010 |
| JP | 2011-021664 A | 2/2011 |

* cited by examiner

ENGINE CONTROL DEVICE FOR VEHICLE AND ENGINE CONTROL METHOD FOR VEHICLE

TECHNICAL FIELD

The present invention relates to an engine control for a vehicle, especially a case where a continuously variable transmission includes a continuously variable transmission mechanism and an auxiliary transmission mechanism.

BACKGROUND ART

JP2010-209946A discloses a technique where an auxiliary transmission mechanism with two forward speed stages of a first speed stage and a second speed stage that has a small transmission gear ratio compared with the first speed stage is disposed in series with respect to a continuously variable transmission mechanism.

In the technique disclosed in JP2010-209946A, when a gear is shifted from the above-described first speed stage to the above-described second speed stage, a changeover of a first engagement portion (first speed clutch) and a second engagement portion (second speed clutch) is performed in a torque phase. In an inertia phase subsequent to the torque phase, the transmission gear ratio of the auxiliary transmission mechanism is up-shifted. The transmission gear ratio of the continuously variable transmission mechanism is down-shifted by an amount of the change of the transmission gear ratio of the up-shifted auxiliary transmission mechanism to keep the transmission gear ratio of the entire continuously variable transmission mechanism and auxiliary transmission mechanism constant. However, since a driving force of the first engagement portion and a driving force of the second engagement portion are different from one another, and in the torque phase, the driving force changes to the smaller side, a negative acceleration generates in a vehicle front-rear direction. This generation of the negative acceleration in the vehicle front-rear direction causes a driver to feel a shock.

It is an object of the present invention to reduce a shift shock during a gear shifting from the first speed stage to the second speed stage of the auxiliary transmission mechanism.

SUMMARY OF INVENTION

According to one aspect of the present invention, an engine control device includes a continuously variable transmission that includes a continuously variable transmission mechanism configured to steplessly change a transmission gear ratio, an auxiliary transmission mechanism disposed in series with respect to the continuously variable transmission mechanism, and shift control means. The auxiliary transmission mechanism includes at least a first engagement portion and a second engagement portion, the auxiliary transmission mechanism achieving a gear shifting from a first speed stage to a second speed stage by shifting the first engagement portion from an engaged state to a released state while shifting the second engagement portion from a released state to an engaged state, the second speed stage having a small transmission gear ratio compared with the first speed stage. The shift control means set a target value of a transmission gear ratio through the continuously variable transmission mechanism and the auxiliary transmission mechanism based on an operating state of the vehicle, and controls the continuously variable transmission mechanism and the auxiliary transmission mechanism such that the target value is achieved. In a vehicle provided with a power train that includes the above-mentioned continuously variable transmission and an engine coupled to one another, the engine control device further includes engine torque control means and command means. The engine torque control means controls the engine so as to obtain a basic engine torque corresponding to the operating state of the vehicle. The command means commands the engine torque control means to increase an engine torque from the basic engine torque during the gear shifting from the first speed stage to the second speed stage.

DESCRIPTION OF EMBODIMENTS

The following describes embodiments of the present invention by referring to the attached drawings.
(First Embodiment)

Figure 1:
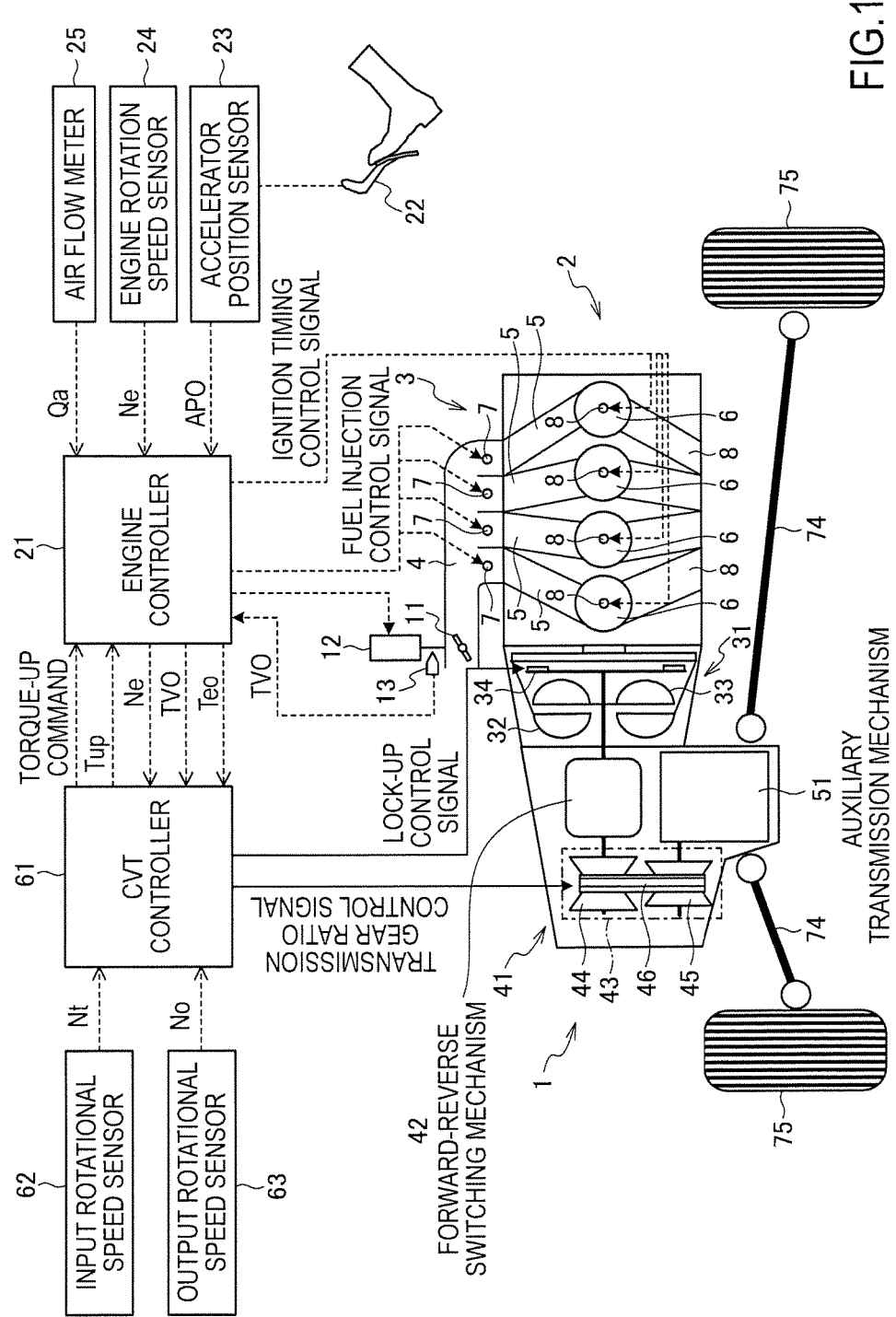
FIG. 1 is a schematic configuration diagram illustrating a vehicle that has a power train according to a first embodiment.
Figure 2:
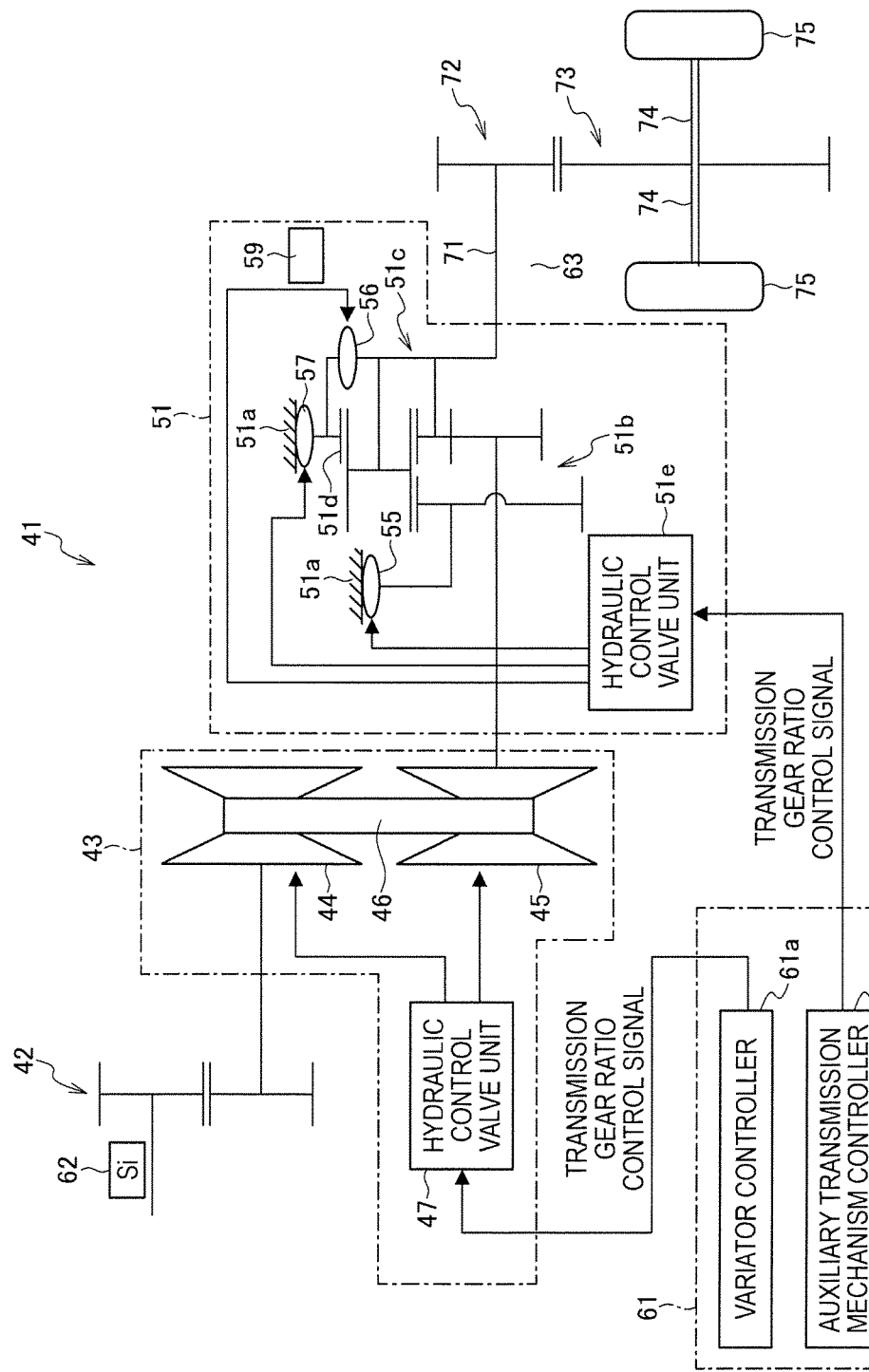
FIG. 2 is a schematic configuration diagram illustrating an auxiliary transmission mechanism according to the first embodiment.

FIG. 1 is a schematic configuration diagram illustrating a vehicle 1 that has a power train 2, and FIG. 2 is a schematic configuration diagram illustrating an auxiliary transmission mechanism 51 according to a first embodiment. The power train 2 includes an engine 3, a torque converter 31 that includes a lock-up clutch 34, a CVT (belt-type automatic transmission) 41, a final drive gear 72, a differential gear 73, and a drive shaft 74.

In FIG. 1, air is introduced from an intake passage 4 to a gasoline engine 3 as a driving source to be supplied to a combustion chamber 6 passing through an intake port 5 of each cylinder. An amount of the air supplied to the combustion chamber 6 is adjusted by a degree of opening of a throttle valve 11, which is included in the intake passage 4 and electronically controlled, (hereinafter referred to as "a throttle valve opening"). The throttle valve opening of the throttle valve 11 is controlled by a throttle motor 12. The actual throttle valve opening is detected by a throttle sensor 13 and input to an engine controller 21.

Each intake port 5 includes a fuel injection valve 7. The fuel injection valve 7 intermittently supplies fuel toward the air flowing through the intake port 5. The gasoline engine 3 includes ignition plugs 8 facing the combustion chambers 6. The air flowing into the combustion chambers 6 is mixed with the fuel to constitute air-fuel mixture. The engine controller 21 cuts off a primary-side current of an ignition coil at a predetermined time before a compression top dead center to cause the ignition plug 8 to generate a spark. This ignites the air-fuel mixture inside the combustion chamber 6. The gas burnt by this ignition is discharged to an exhaust passage (not illustrated).

The vehicle 1 includes the engine controller 21 to control the engine 3. To the engine controller 21, a signal of an accelerator position (an amount of depression of an accelerator pedal 22) from an accelerator position sensor 23, a signal of a crank angle from a crank angle sensor (an engine rotation speed sensor) 24, and a signal of an intake air amount from an air flow meter 25 are input. The rotation speed of the engine 2 is calculated with the signal from the crank angle sensor 24. The engine controller 21 calculates a target intake air amount and a target fuel injection amount on the basis of these signals and commands the throttle motor 12 and the fuel injection valve 7 of each cylinder to obtain the target intake air amount and the target fuel injection amount.

To an output shaft of the engine 3, the torque converter 31 and the CVT 41 are coupled. The torque converter 31 includes a pump impeller 32 and a turbine runner 33.

The CVT 41 includes a forward-reverse switching mechanism 42, a variator 43, and the auxiliary transmission mechanism 51. The variator 43 includes a primary pulley 44, a secondary pulley 45, and a steel belt 46 that is stretched around these pulleys 44 and 45. The primary pulley 44 and the secondary pulley 45 are supplied with hydraulic oil. The width of the pulley is configured to be freely changed corresponding to the pressure of the hydraulic oil (hereinafter, the pressure of the hydraulic oil is simply referred to as "hydraulic"). This ensures to control the hydraulic supplied to the primary pulley 44 and the hydraulic supplied to the secondary pulley 45 to steplessly change the transmission gear ratio of the variator 43.

The auxiliary transmission mechanism 51 disposed in series with respect to the variator 43 is composed of, as illustrated in FIG. 2, a case 51a, a compound sun gear 51b, a carrier 51c, a ring gear 51d, and similar parts, and a Ravigneaux type planetary gear mechanism that includes a frictional engagement element (55, 56, and 57). That is, the auxiliary transmission mechanism 51 is a stepwise variable transmission mechanism that couples to drive the secondary pulley 45 to the compound sun gear 51b to set the sun gear 51b input, and couples to drive the carrier 51c to a transmission output shaft 71 to set the carrier 51c output. It should be noted that, this embodiment is not limited to a case where the auxiliary transmission mechanism 51 is configured of the Ravigneaux type planetary gear mechanism.

The above-described frictional engagement element is composed of a low and reverse brake (hereinafter, the brake is referred to as "a first speed clutch") 55, a high clutch (hereinafter, the clutch is referred to as "a second speed clutch") 56, and a reverse brake 57. The sun gear 51b is secured to the case 51a via the first speed clutch 55, and the carrier 51c is coupled to drive to the ring gear 51d via the second speed clutch 56. Furthermore, the ring gear 51d is secured to the case 51a via the reverse brake 57.

The auxiliary transmission mechanism 51 is configured to supply also the first speed clutch 55 (first engagement portion), the second speed clutch 56 (second engagement portion) and the reverse brake 57 with the hydraulic oil, and configured to freely engage and release each frictional engagement element corresponding to the hydraulic supplied to the frictional engagement elements. This ensures the auxiliary transmission mechanism 51 to control the hydraulic supplied to the first speed clutch 55, the second speed clutch 56, and the reverse brake 57 to choose a first forward speed, a second forward speed, and a reverse speed.

In a case of choosing the first forward speed, the auxiliary transmission mechanism 51 engages the first speed clutch 55 and releases the second speed clutch 56. In a case of choosing the second forward speed, the auxiliary transmission mechanism 51 releases the first speed clutch 55 and engages the second speed clutch 56. Thus, the auxiliary transmission mechanism 51 includes at least two clutches of the clutch 55 and the clutch 56, and shifts the first speed clutch 55 from an engaged state to a released state while shifting the second speed clutch 56 from the released state to the engaged state to ensure the gear shifting from a first speed stage to a second speed stage.

The rotary driving force of the engine 2 is finally transmitted to vehicle drive wheels 75 via the torque converter 31, the variator 43, the auxiliary transmission mechanism 51, the final drive gear 72, the differential gear 73, and the drive shaft 74.

Thus, the vehicle 1 includes a CVT controller 61 to control the CVT 41 mainly composed of the variator 43 and the auxiliary transmission mechanism 51. As illustrated in FIG. 2, the CVT controller 61 includes a variator controller 61a and an auxiliary transmission mechanism controller 61b. The variator controller 61a calculates a target input rotational speed Ni of the variator 43 to steplessly control a transmission gear ratio Ra of the CVT 41 on the basis of the target input rotational speed Ni. The auxiliary transmission mechanism controller 61b calculates a target shift stage of the auxiliary transmission mechanism 51 to control to this target shift stage. That is, the CVT 41 as a whole coordinates the shift control operation of the variator 43 and the shift control operation of the auxiliary transmission mechanism 51 to ensure a targeted transmission gear ratio Io.

A hydraulic control valve unit 47 includes a plurality of solenoid valves. The CVT controller 61 controls ON and OFF of each of the plurality of the solenoid valves via the variator controller 61a to control the hydraulic supplied to the primary pulley 44 and the secondary pulley 45 (usually, only the hydraulic supplied to the primary pulley 44). This ensures the transmission gear ratio of the variator 43 to be steplessly changed.

Similarly, a hydraulic control valve unit 51e (hydraulic adjusting means) also includes a plurality of solenoid valves. The CVT controller 61 controls ON and OFF of each of the plurality of the solenoid valves via the auxiliary transmission mechanism controller 61b to control the hydraulic supplied to the first speed clutch 55, the second speed clutch 56 and the reverse brake 57. This causes the first forward speed or the second forward speed to be chosen.

Thus, each solenoid valve included in the hydraulic control valve units 47 and 51e is controlled by a command hydraulic provided by the CVT controller 61.

The vehicle 1 includes the CVT controller 61 to control the CVT 41 composed of the variator 43 and the auxiliary transmission mechanism. To the CVT controller 61, an input rotational speed Nt from an input rotational speed sensor 61 and an output rotation speed No from an output rotational speed sensor 62 are input. The input rotational speed is also a rotation speed of the turbine runner 33 (turbine rotation speed) because an input shaft of the variator 43 is coupled to the turbine runner 33. The CVT controller 61 calculates a vehicle speed VSP on the basis of the output rotation speed No, the number of teeth of the final drive gear 72, the number of teeth of the differential gear 73, and an effective tire radius of the drive wheel 75 to steplessly control the transmission gear ratio of the CVT 41 corresponding to a driving condition of the vehicle 1 determined by the vehicle speed VSP and a throttle valve opening TVO.

The CVT controller 61 is coupled to the above-described engine controller 21 by a CAN (Controller Area Network). Via the CAN communication, the engine controller 21 inputs the engine rotation speed Ne, the throttle valve opening TVO, and a basic engine torque Te0 to the CVT controller 61.

The torque converter 31 includes the mechanical lock-up clutch 34 that engages and releases the pump impeller 32 and the turbine runner 33. A driving range of the vehicle that engages the lock-up clutch 34 is preliminarily determined as a lock-up range (that has the vehicle speed and the throttle position as a parameter). The CVT controller 61 engages the lock-up clutch to couple the engine 3 to the CVT 41 in a direct-coupled state when the driving condition of the vehicle is in the lock-up range, and releases the lock-up clutch 34 when the driving condition of the vehicle is not in the lock-up range. When the engine 3 is coupled to the CVT 41 in the direct-coupled state, the torque converter 31 does not absorb the torque. Then, the fuel consumption is improved by that amount.

Next, performing a continuously variable transmission in the variator 43 simultaneously with a changeover shift in the auxiliary transmission mechanism 51 causes the shift control operation of the variator 43 to be cooperated with the shift control operation of the auxiliary transmission mechanism 51. This shift control operation is referred to as a cooperative shift control operation. The cooperative shift control operation will be described with reference to FIG. 3.

Figure 3:
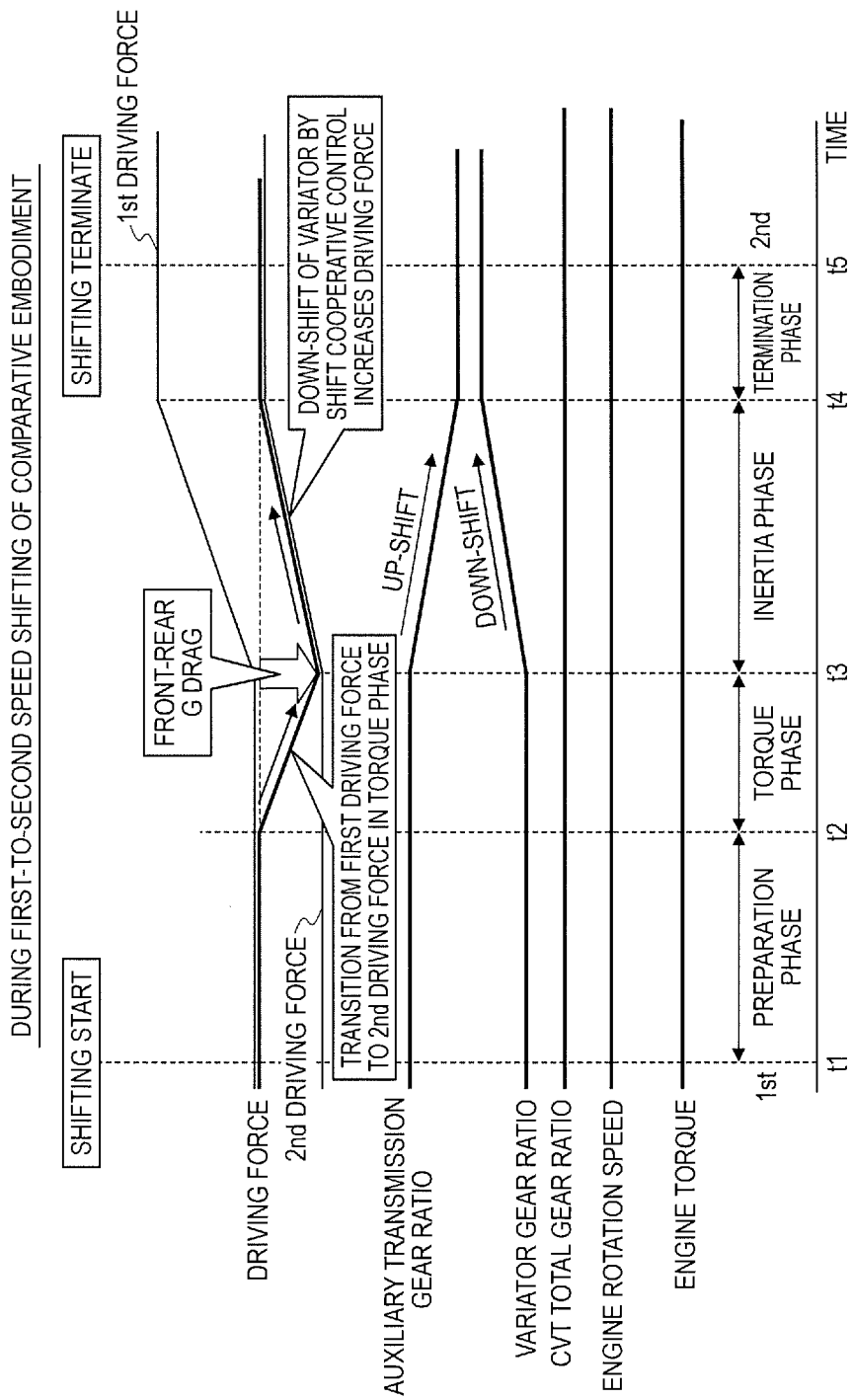
FIG. 3 is a timing chart illustrating a change during a first-to-second speed shifting of a comparative embodiment.

FIG. 3 is a timing chart of a comparative embodiment illustrating a change during a speed shifting of the auxiliary transmission mechanism 51 from the first speed stage to the second speed stage (hereinafter, this during speed shifting is referred to as "during first-to-second speed shifting") under the condition of a constant accelerator position. FIG. 3 includes, from the top, a driving force, an auxiliary transmission gear ratio, a variator gear ratio, a CVT total gear ratio, an engine rotation speed, and an engine torque indicating how to change during the first-to-second speed shifting as a model. Here, "the auxiliary transmission gear ratio" of the second line is the transmission gear ratio of the auxiliary transmission mechanism 51, "the variator gear ratio" of the third line is the transmission gear ratio of the variator 43, and the CVT total gear ratio of the fourth line is the transmission gear ratio of the entire CVT 41.

As illustrated in the second line and the third line of FIG. 3, during the first-to-second speed shifting, the changeover from the first speed clutch 61 to the second speed clutch 62 is performed in the torque phase. That is, the torque phase is a phase that distributes an input torque of the auxiliary transmission mechanism 51 to the first speed clutch 55 (the first engagement portion) and the second speed clutch 56 (the second engagement portion) to perform the changeover of the torque.

Then, the auxiliary transmission gear ratio is up-shifted in the inertia phase. In synchronization with the change of this up-shifting, the variator gear ratio is changed while the variator gear ratio is down-shifted by the amount of the change of the auxiliary transmission gear ratio. The inertia phase is a phase where the input rotational speed Nin of the auxiliary transmission mechanism 51 transitions from the rotation speed before the changeover of the torque to the rotation speed after the changeover of the torque. This cancels the change of the auxiliary transmission gear ratio and the change of the variator gear ratio to achieve a smooth gear shifting as if there is no change in the CVT total gear ratio.

However, in practice, a clutch engagement shock is proved to generate because an acceleration in the vehicle front-rear direction temporarily changes during the first-to-second speed shifting. That is, the acceleration in the vehicle front-rear direction decreases compared with immediately before the changeover of the torque in the torque phase, and the acceleration in the vehicle front-rear direction increases to return to the value immediately before the changeover of the torque in the subsequent inertia phase. Thus, since the acceleration in the vehicle front-rear direction temporarily changes in a negative direction during the torque phase and the inertia phase, a driver feels this as a shock.

The reason is as follows. That is, as illustrated in the top line of FIG. 3, the driving force transitions from the driving force of the first speed stage to the driving force of the second speed stage in the torque phase. The decrease of the driving force in accordance with the transition causes the acceleration in the vehicle front-rear direction (in FIG. 3, approximately referred to as "front-rear G") to temporarily change to negative. Then, in the inertia phase, down-shifting of the variator gear ratio causes the driving force to recover to the driving force before the changeover of the torque. Thus, the acceleration in the vehicle front-rear direction (in FIG. 3, referred to as "front-rear G drag") that temporarily changes to negative causes the driver to identically react to a sudden stop of the vehicle to weaken the driving sense. Further, the torque capacity of the first speed stage is larger than the torque capacity of the second speed stage. Then, the transition from the torque capacity of the first speed stage to the torque capacity of the second speed stage without changing the engine rotation speed reduces the torque capacity to generate a deceleration shock corresponding to the amount of the decrease of the torque capacity.

Therefore, in the first embodiment, the CVT controller 61 is configured to command the engine controller 21 (the engine torque control means) to increase the engine torque from the basic engine torque Te0 during the first-to-second speed shifting. This will be described by referring to FIG. 4.

Figure 4:
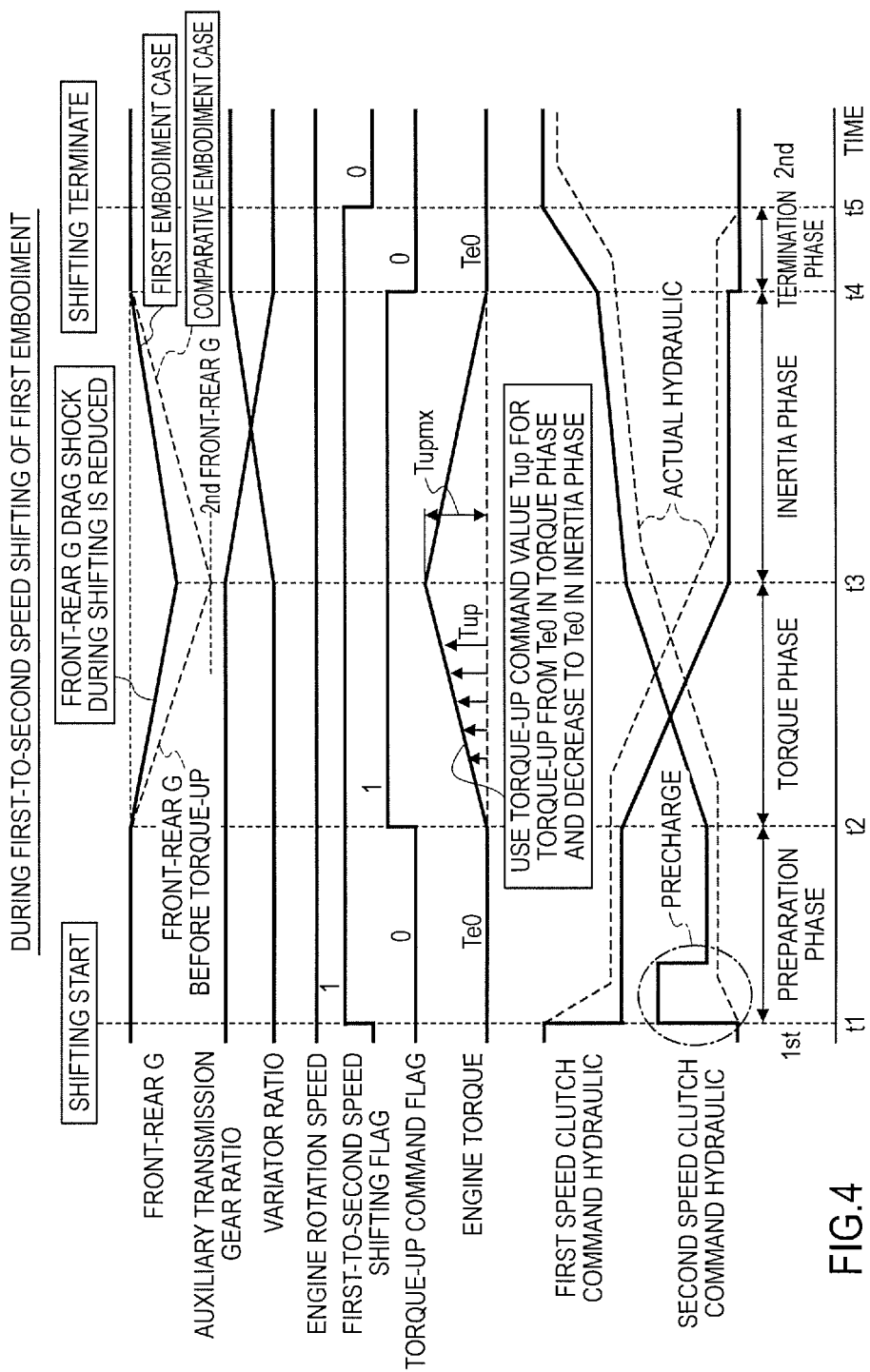
FIG. 4 is a timing chart illustrating a change during a first-to-second speed shifting according to the first embodiment.

FIG. 4 is a timing chart illustrating a change during the first-to-second speed shifting under the condition that the accelerator position is constant according to the first embodiment. FIG. 4 includes, from the top, the acceleration in the vehicle front-rear direction, the auxiliary transmission gear ratio, the variator gear ratio, the CVT total gear ratio, the engine rotation speed, the engine torque, a first speed clutch command hydraulic, and a second speed clutch command hydraulic indicating how to change during the first-to-second speed shifting as a model. Here, "the first speed clutch command hydraulic" is a command hydraulic provided to the first speed clutch 55, and "the second speed clutch command hydraulic" is a command hydraulic provided to the second speed clutch 56. In FIG. 4, like reference numerals designate like elements as in FIG. 3. It should be noted that, while FIG. 3 indicates the change of the driving force on the top line, FIG. 4 indicates the change of the acceleration in the vehicle front-rear direction on the top line. However, because of a formula of driving force=mass× acceleration, the change of the driving force indicated on the top line in FIG. 3 is similar to the change of the acceleration indicated on the top line in FIG. 4. In the top line in FIG. 3, "2nd front-rear G" is an acceleration in the vehicle front-rear direction (front-rear G) at a timing of t3 where the second speed clutch 56 completes to be engaged. This acceleration is the maximum acceleration generated during the first-to-second speed shifting.

In this embodiment, the CVT controller 61 is configured to additionally have a function as command means, and a torque-up command flag is additionally introduced as illustrated in the sixth line of FIG. 4. The torque-up command flag is set by the CVT controller 61. The torque-up command flag is transmitted from the CVT controller 61 to the engine controller 21 as a torque-up command as illustrated in FIG. 1. On the other hand, the engine controller 21 that receives the torque-up command (the torque-up command flag) increases the engine torque from the basic engine torque Te0 during the torque-up command flag=1.

Specifically, the above-described command means is composed of two command means of torque-up command means performed in the torque phase and torque-down command means performed in the inertia phase. That is, the CVT controller 61 as the torque-up command means commands to linearly increase the engine torque from the basic engine torque Te0 in the torque phase as illustrated in the seventh line of FIG. 4. The CVT controller 61 as the torque-down command means commands to linearly decrease the engine torque to return to the basic engine torque Te0 in the subsequent inertia phase as illustrated in the seventh line of FIG. 4. Thus, according to the embodiment, during the first-to-second speed shifting, the CVT controller 61 uses the engine controller 21 to increase the engine torque from the basic engine torque Te0. This reduces the change of the acceleration in the vehicle front-rear direction to the negative side generated during the first-to-second speed shifting. Then, the gear shift shock generated in accordance with the changeover of the clutch during the first-to-second speed shifting can be improved.

As described above, "increasing the engine torque from the basic engine torque Te0" includes increasing a torque-up command value Tup from zero, and decreasing the torque-up command value Tup to zero after increasing the torque-up command value Tup to a maximum value Tupmx. Hereinafter, "increasing the engine torque from the basic engine torque Te0" is simply referred to as "torque-up" in other words. Furthermore, increasing the torque-up command value Tup from zero is referred to as "torque-up," and decreasing the torque-up command value Tup to zero is referred to as "torque-down," in other words.

Here, the above-described torque-up command value Tup is the amount of the increase from the basic engine torque Te0. The change of the torque-up command value Tup shows a triangular shape in the whole of the torque phase and the inertia phase as illustrated in the seventh line of FIG. 4. The engine torque increases by the area of the triangular shape compared with the case of the comparative embodiment illustrated in FIG. 3. It should be noted that the torque-up command value Tup is calculated in the CVT controller 61 side, and the calculated torque-up command value Tup is transmitted to the engine controller 21. The engine controller 21 that receives the torque-up command value Tup adds the amount of the torque-up command value Tup to the basic engine torque Te0, that is, uses the following formula, to calculate an engine torque command value Te (described later).

$$Te = Te0 + Tup \quad (1)$$

The reason to configure the change of the torque-up command value Tup to show the triangular shape is that, since the change of the acceleration in the vehicle front-rear direction (front-rear G) shows an inverted triangular shape as illustrated in the top line of FIG. 4, the shape of the change of the torque-up command value Tup is corresponded. That is, as illustrated in the top line of FIG. 4 by a dashed line, in the torque phase, the acceleration in the vehicle front-rear direction (front-rear G) linearly decreases (or can be considered to linearly decrease). As illustrated in the top line of FIG. 4 by the dashed line, in the inertia phase subsequent to the torque phase, the acceleration in the vehicle front-rear direction linearly increases to return to the state before the gear shifting (or can be considered to linearly increase). The change of the acceleration in the vehicle front-rear direction shows an inverted triangular shape in the whole of the torque phase and the inertia phase. Since the acceleration in the vehicle front-rear direction is proportionate to the driving force, the change of the driving force also shows an inverted triangular shape. To cancel the change (decrease) of the driving force that shows the inverted triangular shape, as illustrated in the seventh line of FIG. 4, the torque-up command value Tup in the triangular shape is provided. As illustrated in the top line of FIG. 4 by a solid line, this ensures the CVT controller 61 (the torque-up command means) to reduce the decrease of the acceleration in the vehicle front-rear direction generated in the torque phase. As illustrated in the top line of FIG. 4 by the solid line, the CVT controller 61 (the torque-down command means) can reduce the increase of the acceleration in the vehicle front-rear direction generated in the inertia phase.

In the top line of FIG. 4, the change of the acceleration in the vehicle front-rear direction in the case of the embodiment is indicated by the solid line, and the change of the acceleration in the vehicle front-rear direction in the case of the comparative embodiment is indicated by the dashed line by overlapping. In this embodiment, the acceleration in the vehicle front-rear direction (2nd front-rear G) at an engagement completion timing (t3) of the second speed clutch 56 is decreased compared with the case of the comparative embodiment.

Further, while the change of the acceleration in the vehicle front-rear direction in the embodiment shows the inverted triangular shape as well as the comparative embodiment, the embodiments are not limited to the case. The acceleration in the vehicle front-rear direction at the engagement completion timing (t3) of the second speed clutch 56 (that is, the maximum value of the acceleration in the vehicle front-rear direction in the negative side) depends on the torque-up command value Tup at t3 (that is, the maximum value Tupmx of the torque-up command value). While the more increased the maximum value Tupmx of the torque-up command value is, the more decreased the acceleration in the vehicle front-rear direction at the engagement completion timing (t3) of the second speed clutch 56 can be, on the other hand, the more increased the maximum value Tupmx of the torque-up command value is, the more poor the fuel consumption is. Accordingly, even if the acceleration in the vehicle front-rear direction slightly acts to the negative side as illustrated in the top line of FIG. 4 by the solid line, it is only necessary for the acceleration in the vehicle front-rear direction to be within the extent that the driver does not feel the acceleration in the vehicle front-rear direction as a shock. This reduces the degradation of the fuel consumption.

Next, in the embodiment, the timing where the CVT controller 61 (the torque-up command means) starts to increase the torque-up command value Tup (increase the engine torque from the basic engine torque Te0) is the timing of the start of the torque phase. The reason is as follows. That is, a clutch engagement capacity of the second clutch 56 (hereinafter, simply referred to as "second clutch engagement capacity") is generated from the timing of the start of the torque phase, and then, the acceleration in the vehicle front-rear direction decreases. Accordingly, if the timing of the start of increasing the torque-up command value Tup deviates to before or after the timing of the start of the torque phase, the decrease of the acceleration in the vehicle front-rear direction generated from the timing of the generation of the second clutch engagement capacity fails to be reduced with high accuracy. Therefore, to reduce the decrease of the acceleration in the vehicle front-rear direction generated from the timing of the generation of the second clutch engagement capacity with high accuracy, the timing of the start of increasing the torque-up command value Tup is configured to match the timing of the start of the torque phase.

In the embodiment, the timing where the CVT controller 61 (the torque-down command means) starts to decrease the torque-up command value Tup (engine torque) is the timing of the start of the inertia phase. The reason is as follows. That is, the variator 43 acts from the timing of the start of the inertia phase to achieve a target value of the transmission gear ratio of the entire CVT, and then, the acceleration in the vehicle front-rear direction increases. Accordingly, if the timing of the start of decreasing the torque-up command value Tup deviates to before or after the timing of the start of the inertia phase, the increase of the acceleration in the vehicle front-rear direction generated from the timing where the variator 43 acts fails to be reduced with high accuracy. Therefore, to reduce the increase of the acceleration in the vehicle front-rear direction generated from the timing where the variator 43 acts with high accuracy, the timing of the start of decreasing the torque-up command value Tup is configured to match the timing of the start of the inertia phase.

The control executed by the CVT controller 61 and the engine controller 21 will be described by referring to flowcharts in FIG. 5 and FIG. 6.

Figure 5:
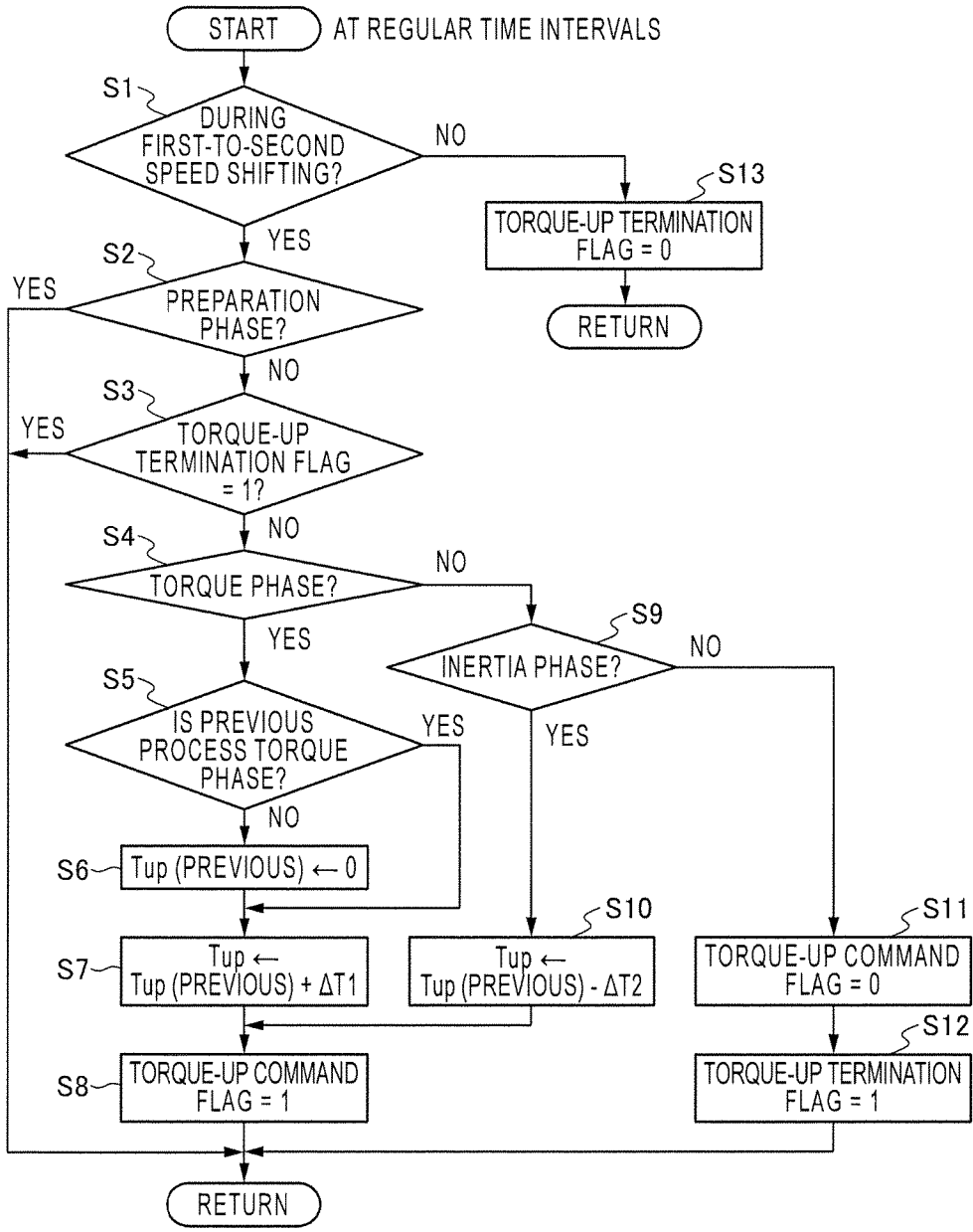
FIG. 5 is a flowchart indicating a setting of a torque-up command flag according to the first embodiment.

The flowchart in FIG. 5 is a flowchart to set the torque-up command flag, and executed by the CVT controller 61 at regular time intervals (such as every 10 ms). When the CVT controller 61 sets the torque-down command flag, the CVT controller 61 uses the throttle valve opening TVO and the basic engine torque Te0 transmitted from the engine controller 21.

In Step S1, the CVT controller 61 determines whether it is during the first-to-second speed shifting. The CVT controller 61 includes a gear shifting diagram (not illustrated) that has the vehicle speed VSP as a horizontal axis, and the input rotational speed Ni as a vertical axis. On the gear shifting diagram, the gear shifting from the first speed stage to the second speed stage is performed when crossing a 1→2 up line, and then, a first-to-second speed shifting flag (zero in the initial setting)=1 is set. Receiving the first-to-second speed shifting flag=1, the auxiliary transmission mechanism controller 61b provides a first clutch command hydraulic and a second clutch command hydraulic respectively illustrated in the eighth line and the ninth line of FIG. 4 to each solenoid valve included in the hydraulic control valve 51e. As illustrated in the fifth line of FIG. 4, the first-to-second speed shifting flag becomes 1 at the timing of, for example, the start of the preparation phase, and is returned to zero at the timing of termination of the termination phase. Then, in the case of the first-to-second speed shifting flag=0, the CVT controller 61 determines that it is not during the first-to-second speed shifting, and terminates the current process.

In Step S1, in the case of the first-to-second speed shifting flag=1, the CVT controller 61 determines that it is during the first-to-second speed shifting. Then, the process proceeds to Step S2 and following Steps. In Step S2, the CVT controller 61 determines whether it is during the preparation phase. Whether it is during the preparation phase can be determined by the first speed clutch command hydraulic and the second speed clutch command hydraulic. When it is during the preparation phase, the CVT controller 61 terminates the current process.

When it is not during the preparation phase, the CVT controller 61 determines that the phase has transitioned to the phase after the preparation phase (the torque phase, the inertia phase, the termination phase), and advances the process to Step S3. In Step S3, the CVT controller 61 refers to a torque-up termination flag (initially set to zero when the engine is started). Here, assuming to the torque-up termination flag=0, the CVT controller 61 advances the process to Steps S4 and S5.

In Step S4, the CVT controller 61 determines whether the current process is the torque phase. In Step S5, the CVT controller 61 determines whether the previous process is the torque phase. Whether it is the torque phase can be determined by the first speed clutch command hydraulic and the second speed clutch command hydraulic. When the current process is the torque phase and the previous process is not the torque phase, that is, the current process is the torque phase for the first time, the CVT controller 61 advances the process to Steps S6 and S7.

Steps S6 and S7 are steps that linearly increases the torque-up command value Tup from zero when the phase transitions to the torque phase. In Step S6, the CVT controller 61 puts zero of the initial value to "a Tup (previous)" [Nm] as the previous torque-up command value. In Step S7, the CVT controller 61 calculates a value that adds a predetermined value $\Delta T1$ [Nm] to "the Tup (previous)," which the zero is put to and is the previous torque-up command value, as a current torque-up command value Tup. The above-described predetermined value $\Delta T1$ is a value to determine the gradient of the increase of the torque-up command value in the torque phase, and predetermined.

In Step S8, the CVT controller 61 sets the torque-up command flag (initially set to zero when the engine is started)=1. The torque-up command flag is a flag that instructs the engine controller 21 to increase the engine torque (cause torque-up) from the basic engine torque Te0 in the case of the torque-up command flag=1 (see the sixth line in FIG. 4).

In Steps S4 and S5, when the current process is the torque phase and the previous process is also the torque phase, that is, when the phase is continuously the torque phase, the CVT controller 61 executes Steps S7 and S8 skipping Step S6. Insofar as the phase is the torque phase, the operations of Steps S7 and S8 are repeated. This increases the torque-up command value Tup, which is zero at the start of the torque phase, by the $\Delta T1$ during the torque phase. During the period of the torque phase, it is the torque-up command flag=1 (see the sixth line in FIG. 4).

Later, when the phase ceases to be the torque phase in Step S4, the CVT controller 61 determines that the phase has transitioned to the phase after the torque phase (the inertia phase, the termination phase), and advances the process to Step S9. In Step S9 the CVT controller 61 determines whether the phase is the inertia phase. Whether the phase is the inertia phase can be determined by the first speed clutch command hydraulic and the second speed clutch command hydraulic. When the phase is the inertia phase, the CVT controller 61 advances the process to Step S10.

Step S10 is a step that linearly decreases the torque-up command value Tup from the maximum value (the torque-up command value has the maximum value at the timing of the termination of the torque phase) when the phase transitioned to the inertia phase. That is, in Step S10, the CVT controller 61 calculates a value that subtracts a predetermined value $\Delta T2$ [Nm] from "the Tup (previous)," which is the previous torque-up command value, as the current torque-up command value Tup. The above-described predetermined value $\Delta T2$ is a value to determine the gradient of the decrease of the torque-up command value in the inertia phase, and predetermined.

Insofar as the phase is the inertia phase in Step S9, the operations of Steps S10 and S8 are repeated. This decreases the torque-up command value Tup by the $\Delta T2$ from the start of the inertia phase. During the period of the inertia phase, it is also the torque-up command flag=1 (see the sixth line in FIG. 4).

Later, when the phase ceases to be the inertia phase in Step S9, the CVT controller 61 determines that the phase has transitioned to the phase subsequent to the inertia phase (that is, the termination phase). Then, the CVT controller 61 terminates the torque-up and advances the process to Steps S10 and S11 to return the engine torque to the basic engine torque Te0. In Step S11, the CVT controller 61 sets the torque-up command flag=0. In Step S12, the CVT controller 61 sets the torque-up termination flag=1. Since the torque-up termination flag=1 is set in Step S12, from the next process, that is, in the termination phase, even if it is during the first-to-second speed shifting in Step S1, the CVT controller 61 cannot proceed the process from Steps S2 and S3 to Step S4 and following Steps.

In Step S1, in the case of being returned to the first-to-second speed shifting flag=0, the CVT controller 61 determines that it ceases to be during the first-to-second speed shifting, advances the process to Step S13 preparing for the next first-to-second speed shifting, and sets the torque-up termination flag=0.

The CVT controller 61 transmits the torque-up command flag (the torque-up command), which is set in such way, to the engine controller 21 via the CAN communication with the torque-up command value Tup (see FIG. 1).

Figure 6:
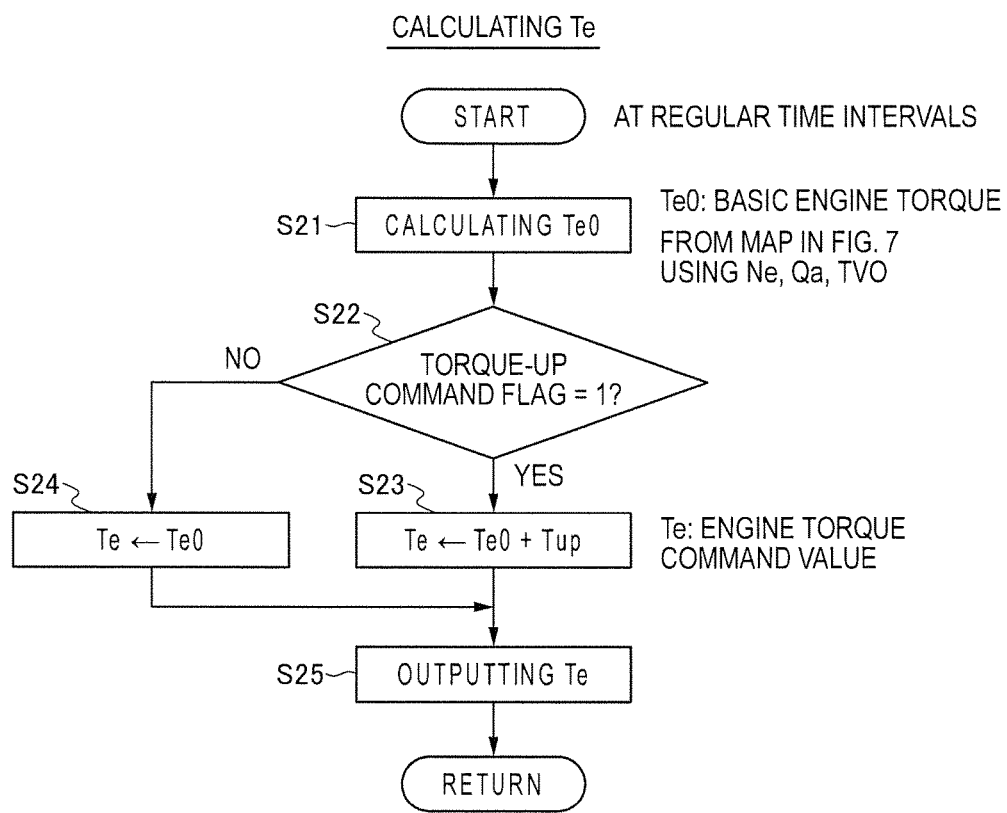
FIG. 6 is a flowchart indicating a calculation of an engine torque command value according to the first embodiment.

Next, the flowchart in FIG. 6 is a flowchart to calculate an engine torque command value Te, and executed by the engine controller 21 at regular time intervals (such as every 10 ms). When the engine controller 21 calculates the engine torque command value Te, the engine controller 21 uses the torque-up command flag and the torque-up command value Tup transmitted from the CVT controller 61 as the torque-up command.

Figure 7:
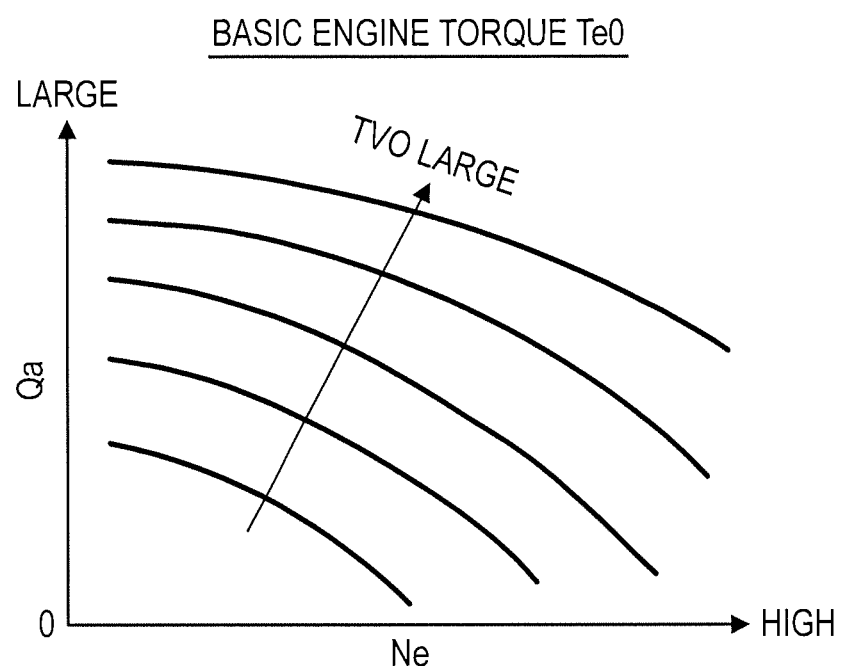
FIG. 7 is a characteristic diagram illustrating a basic engine torque.

In Step S21, the engine controller 21 searches a map that includes the content of FIG. 7 with the engine rotation speed Ne [rpm], an intake air amount Qa detected by the air flow meter 25, and the throttle valve opening TVO to calculate the basic engine torque Te0 [Nm]. As illustrated in FIG. 7, the basic engine torque Te0 is a value that becomes larger as the increase of the intake air amount Qa under the condition where the engine rotation speed Ne and the throttle valve opening TVO are constant. The basic engine torque Te0 is a value that becomes larger as the increase of the engine rotation speed Ne under the condition where the intake air amount Qa and the throttle valve opening TVO are constant. The basic engine torque Te0 is a value that becomes larger as the increase of the throttle valve opening TVO under the condition where the intake air amount Qa and the engine rotation speed Ne are constant.

In Step S22, the engine controller 21 refers to the torque-up command flag. The torque-up command flag is transmitted from the CVT controller 61. In the case of the torque-up command flag=0, the engine controller 21 determines that the torque-up command has not been instructed. At this case, the engine controller 21 advances the process to Step S24 to put the basic engine torque Te0 to the engine torque command value Te [Nm] as it is.

On the other hand, in the case of the torque-up command flag=1 in Step S22, the engine controller 21 advances the process to Step S23 to increase the engine torque (cause torque-up) from the basic engine torque Te0. In Step S23, the engine controller 21 calculates a value that adds the torque-up command value Tup [Nm] to the basic engine torque Te0 as the engine torque command value Te [Nm]. That is, the engine controller 21 uses the above-described formula (1) to calculate the engine torque command value Te. This causes the engine torque to be linearly increased from the basic engine torque Te0 in the torque phase. In the inertia phase, on the other hand, the engine torque is linearly decreased from the value at the timing of the termination of the torque phase to be returned to the basic engine torque Te0 at the timing of the termination of the inertia phase.

In Step S25, the engine controller 21 outputs the engine torque command value Te. In the other flowchart (not illustrated) included in the engine controller 21, the engine controller 21 calculates the target intake air amount on the basis of the engine torque command value Te. When the engine torque command value Te increases by the amount of the torque-up command value Tup, the target intake air amount increases by the amount of the torque-up command value Tup, and then, the throttle valve opening TVO increases. When the throttle valve opening TVO increases, the intake air amount Qa increases, and the fuel injection amount increases by the amount of the increase of the intake air amount Qa. This increases the actual engine torque compared with the case of the comparative embodiment where the basic engine torque Te0 is set to the engine torque command value Te as it is.

Here, the operational advantage of the embodiment will be described.

In the embodiment, the variator 43 (the continuously variable transmission mechanism) configured to steplessly change the transmission gear ratio, the auxiliary transmission mechanism 51 disposed in series with respect to the variator 43, and the CVT controller 61 (shift control means) are disposed. The above-described auxiliary transmission mechanism 51 includes at least two clutches of 55 and 56 (engagement portion). Then, the auxiliary transmission mechanism 51 shifts the first speed clutch 55 from the engaged state to the released state, and shifts the second speed clutch 56 from the released state to the engaged state to ensure the gear shifting from the first speed stage to the second speed stage. The above-described CVT controller 61 sets the target value of the transmission gear ratio of the whole of the variator 43 and the auxiliary transmission mechanism 51 on the basis of the operating state of the vehicle. Then, the CVT controller 61 controls the variator 43 so as to achieve the target value. In the embodiment, the vehicle 1, which includes the power train 2 where the above-described CVT 41 is coupled to the engine 3, further includes the engine controller 21 (the engine torque control means) and the CVT controller 61 as the command means. The above-described engine controller 21 controls the engine 3 so as to obtain the basic engine torque Te0 corresponding to the operating state of the vehicle. The above-described CVT controller 61 as the command means commands the engine controller 21 to increase the engine torque from the basic engine torque Te0 during the first-to-second speed shifting. According to the embodiment, the engine controller 21 is used to increase the engine torque from the basic engine torque Te0 during the first-to-second speed shifting by use of the auxiliary transmission mechanism 51. Then, the change of the acceleration in the vehicle front-rear direction, which is generated during the first-to-second speed shifting, toward the negative side can be reduced. This improves the gear shift shock during the first-to-second speed shifting by use of the auxiliary transmission mechanism 51.

The negative acceleration in the vehicle front-rear direction generated during the first-to-second speed shifting returns to the state before the first-to-second speed shifting such that the acceleration in the vehicle front-rear direction linearly decreases in the torque phase and the acceleration in the vehicle front-rear direction linearly increases in the inertia phase subsequent to the torque phase. Corresponding to such change of the acceleration in the vehicle front-rear direction, in the embodiment, the command means is configured of the torque-up command means and the torque-down command means. The above-described torque-up command means linearly increases the engine torque from the basic engine torque Te0. The above-described torque-down command means linearly decreases the engine torque after the torque-up command means increased the engine torque, and commands to return the engine torque to the basic engine torque Te0. This ensures to individually reduce the decrease of the acceleration in the vehicle front-rear direction generated by the torque-up command means in the torque phase and the increase of the acceleration in the vehicle front-rear direction generated by the torque-down command means in the inertia phase.

In the embodiment, the timing where the CVT controller 61 (the torque-up command means) starts to increase the engine torque from the basic engine torque Te0 is the timing of the start of the torque phase. This reduces the decrease of the acceleration in the vehicle front-rear direction, which generates from the timing of the generation of the second speed clutch engagement capacity, with high accuracy.

In the embodiment, the timing where the CVT controller 61 (the torque-down command means) starts to decrease the engine torque is the timing of the start of the inertia phase. This reduces the increase of the acceleration in the vehicle front-rear direction, which generates from the timing that the variator 43 acts at, with high accuracy.

(Second Embodiment)

Figure 8A:
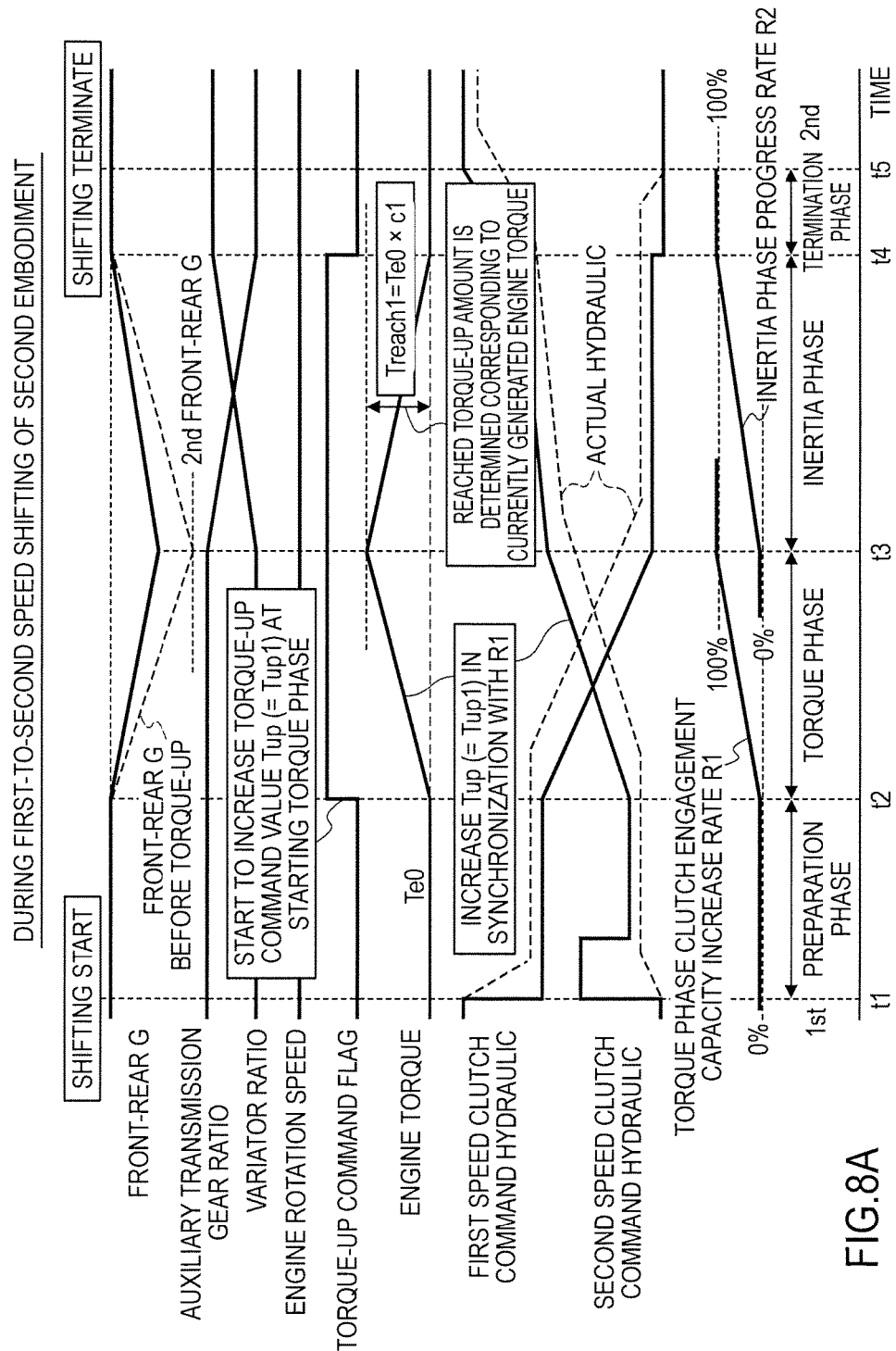
FIG. 8A is a timing chart illustrating a change during a first-to-second speed shifting according to a second embodiment.
Figure 8B:
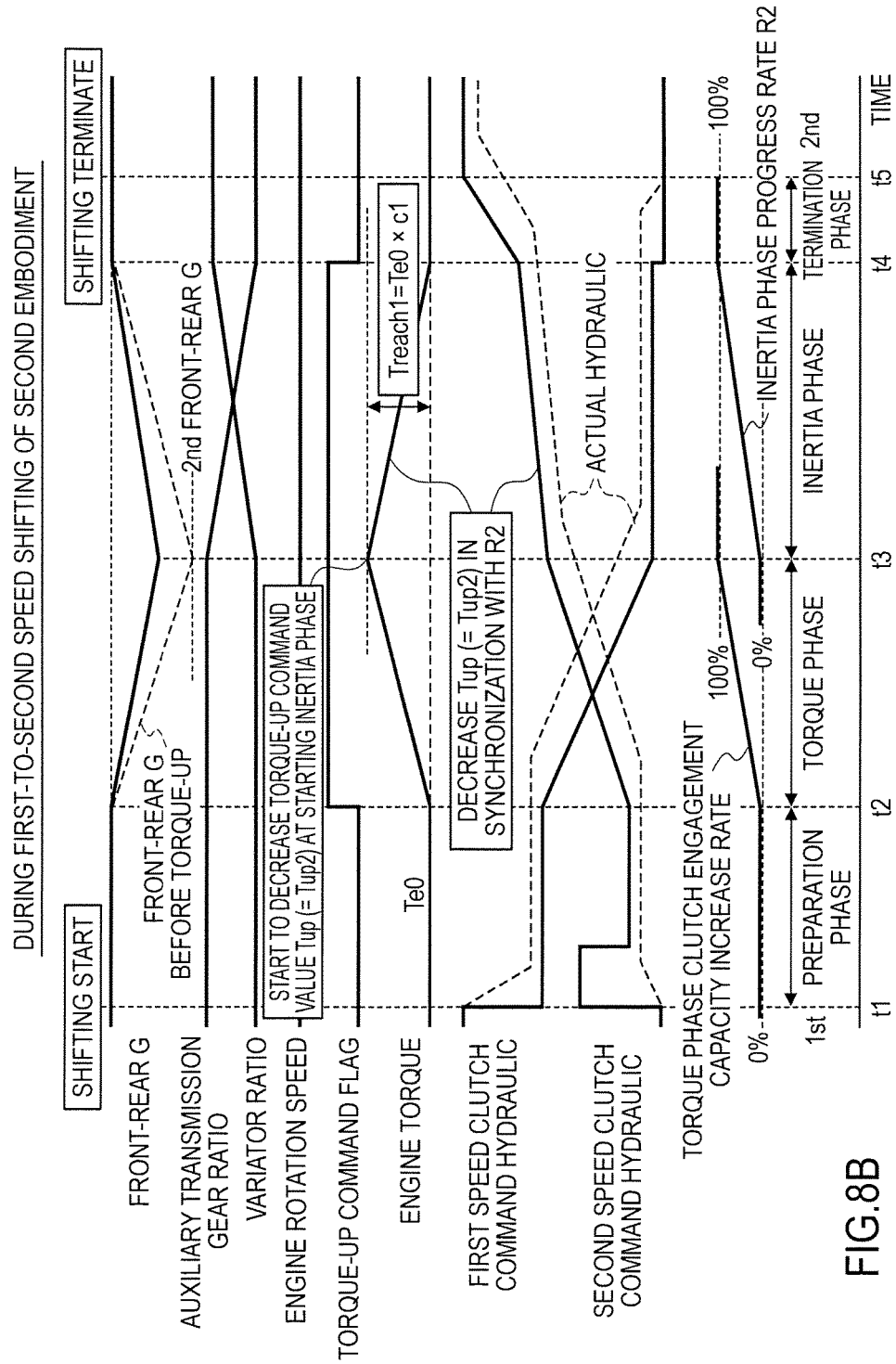
FIG. 8B is a timing chart illustrating a change during a first-to-second speed shifting according to the second embodiment.

FIG. 8A and FIG. 8B are timing charts illustrating the changes during the first-to-second speed shifting of a second embodiment. FIG. 8A mainly indicates the torque-up (increasing the torque-up command value Tup from zero) in the torque phase. FIG. 8B mainly indicates the torque-down (decreasing the torque-up command value Tup to zero) in the inertia phase. In FIG. 8A and FIG. 8B, like reference numerals denote like elements as in FIG. 4 of the first embodiment.

In the second embodiment, as illustrated in FIG. 8A and FIG. 8B, the CVT controller 61 (the torque-down command means) increases the torque-up command value Tup in synchronization with a torque phase clutch engagement capacity increase rate R1 in a torque-up phase. Here, the torque phase clutch engagement capacity increase rate R1 is a value additionally introduced in the second embodiment. That is, the torque phase clutch engagement capacity increase rate R1 is an increase rate of the second speed clutch engagement capacity in the torque phase. The second speed clutch engagement capacity is a transfer torque [Nm] that the second speed clutch 56 generates. The second speed clutch engagement capacity is zero at the start of the engagement of the second clutch 56, and maximum at the termination of the engagement of the second clutch 56. Therefore, the torque phase clutch engagement capacity increase rate R1 [%] is a rate that linearly increases from the start of the torque phase to the termination of the torque phase as 0% at the start timing of the torque phase and 100% at the termination timing of the torque phase.

The time (period) required for the torque phase is determined corresponding to the second clutch command hydraulic and the temperature of the hydraulic oil supplied to the second clutch 56. Assuming that the time (period) required for the torque phase is a $\Delta t1$ [ms] at an adapted hydraulic oil temperature, the torque phase clutch engagement capacity increase rate R1 [%] is represented by the following formula where the elapsed time from the start timing of the torque phase is an x1 [ms].

$$R1=100 \times x1/\Delta t1 \tag{2}$$

Here, the reason to increase the torque-up command value Tup (increase the engine torque) from zero in synchronization with the torque phase clutch engagement capacity increase rate R1 is as follows. That is, the maximum value Tupmx of the torque-up command value, which is linearly increased from the start timing of the torque phase, is predetermined. In this case, even if the CVT controller 61 linearly increases the torque-up command value Tup from the start timing of the torque phase, the torque-up command value is not necessarily to just reach the maximum value Tupmx at the termination timing of the torque phase. If the torque-up command value Tup reaches the maximum value Tupmx of the torque-up command value deviating to before or after the termination timing of the torque phase, the decrease of the acceleration in the vehicle front-rear direction generated in the torque phase fails to be reduced with high accuracy. On the other hand, the timing of the start and the termination of the torque phase can be preliminarily obtained by the second speed clutch command hydraulic. Therefore, to reach the torque-up command value to the maximum value Tupmx just at the termination timing of the torque phase, the torque-up command value Tup is increased from zero in synchronization with the torque phase clutch engagement capacity increase rate R1.

In the second embodiment, the maximum value Tupmx of the torque-up command value, which the CVT controller 61 (the torque-up command means) increases, as illustrated in FIG. 8A and FIG. 8B, is determined corresponding to the currently generated engine torque. In the second embodiment, the maximum value Tupmx of the torque-up command value is again defined as "a reached torque-up amount" Treach1. Here, the currently generated engine torque is the basic engine torque Te0 [Nm]. Then, the reached torque-up amount Treach1 [Nm] is calculated by the following formula.

$$Treach1=Te0 \times C1 \tag{3}$$

However, C1: constant,
The setting method of the constant C1 of the formula (3) is as follows. That is, the constant C1 is set to approximately 1.8 matching with the ratio of the gear ratio of the first speed stage and the gear ratio of the second speed stage (ratio between the gear stages) because the ratio between the gear stages is approximately 1.8 times. That is, it is only necessary to set the constant C1 such that the change of the acceleration in the vehicle front-rear direction generated during the first-to-second speed shifting to the negative side is reduced compared with the case of the comparative embodiment.

Thus, when the reached torque-up amount Treach1 and the torque phase engagement clutch capacity increase rate R1 are introduced, the torque-up command value Tup1 [Nm] in the torque phase is represented by the following formula.

$$Tup1=Treach1 \times R1/100 \tag{4}$$

Next, the processing in the torque phase is enhanced to the inertia phase. That is, in the second embodiment, as illustrated in FIG. 8A and FIG. 8B, the CVT controller 61 (the torque-down command means) decreases the torque-up command value Tup from the maximum value in synchronization with an inertia phase progress rate R2 [%] in the inertia phase. Here, the inertia phase progress rate R2 is also the value additionally introduced in the second embodiment. That is, the inertia phase progress rate is a rate that linearly increases from the start of the inertia phase to the termination of the inertia phase as 0% at the start timing of the inertia phase and 100% at the termination timing of the inertia phase.

The time (period) required for the inertia phase is determined corresponding to the second clutch command hydraulic and the temperature of the hydraulic oil supplied to the second clutch 56. Assuming that the time (period) required for the inertia phase is a $\Delta t2$ [ms] at an adapted hydraulic oil temperature, the inertia phase progress rate R2 [%] is represented by the following formula where the elapsed time from the start timing of the inertia phase is an x2 [ms].

$$R2=100 \times x2/\Delta t2 \tag{5}$$

Here, the reason to decrease the torque-up command value Tup (decrease the engine torque) from the reached torque-up amount Treach1 in synchronization with the inertia phase progress rate R2 is as follows. That is, even if the CVT controller 61 linearly decreases the torque-up command value Tup from the start timing of the inertia phase, the torque-up command value is not necessarily to return to the basic engine torque Te0 just at the termination timing of the inertia phase. If the torque-up command value Tup returns to the basic engine torque Te0 deviating to before or after the termination timing of the inertia phase, the increase of the acceleration in the vehicle front-rear direction generated in the inertia phase fails to be reduced with high accuracy. On the other hand, the timing of the start and the termination of the inertia phase can be preliminarily obtained by the second speed clutch command hydraulic. Therefore, to return the torque-up command value to the basic engine torque Te0 just at the termination timing of the inertia phase, the torque-up command value Tup is decreased from the reached torque-up amount Treach1 in synchronization with the inertia phase progress rate R2.

Thus, when the inertia phase progress rate R2 is introduced, the torque-up command value Tup2 [Nm] in the inertia phase is represented by the following formula.

$$Tup2=Treach1 \times (1-R2/100) \tag{6}$$

The reason to introduce the above-described torque phase clutch engagement capacity increase rate is as follows. That is, the decrease gradient of the acceleration in the vehicle front-rear direction in the torque phase (or the maximum acceleration in the vehicle front-rear direction generated during the first-to-second speed shifting) depends on the engagement method of the second speed clutch 56. For example, an early engagement of the second speed clutch 56 makes the decrease gradient of the acceleration in the vehicle front-rear direction in the torque phase large (sharp), on the other hand, a late engagement of a second speed clutch 26 makes the decrease gradient of the acceleration in the vehicle front-rear direction in the torque phase small (gentle). Therefore, to determine the torque-up command value Tup in accordance with the decrease gradient of the acceleration in the vehicle front-rear direction in the torque phase, the torque phase clutch engagement capacity increase rate is introduced as the substitute for the decrease gradient of the acceleration in the vehicle front-rear direction in the torque phase.

The reason to introduce the inertia phase progress rate is as follows. That is, the increase gradient of the acceleration in the vehicle front-rear direction in the inertia phase depends on an inertia torque (inertia moment) of the second clutch 56. For example, a small inertia torque (inertia moment) of the second clutch 56 makes the increase gradient of the acceleration in the vehicle front-rear direction in the inertia phase large, on the other hand, a large inertia torque (inertia moment) of the second clutch 56 makes the increase gradient of the acceleration in the vehicle front-rear direction in the inertia phase small. Therefore, to determine the torque-up command value Tup in accordance with the increase gradient of the acceleration in the vehicle front-rear direction in the inertia phase, the inertia phase progress rate is introduced as the substitute for the increase gradient of the acceleration in the vehicle front-rear direction in the inertia phase.

Figure 9:
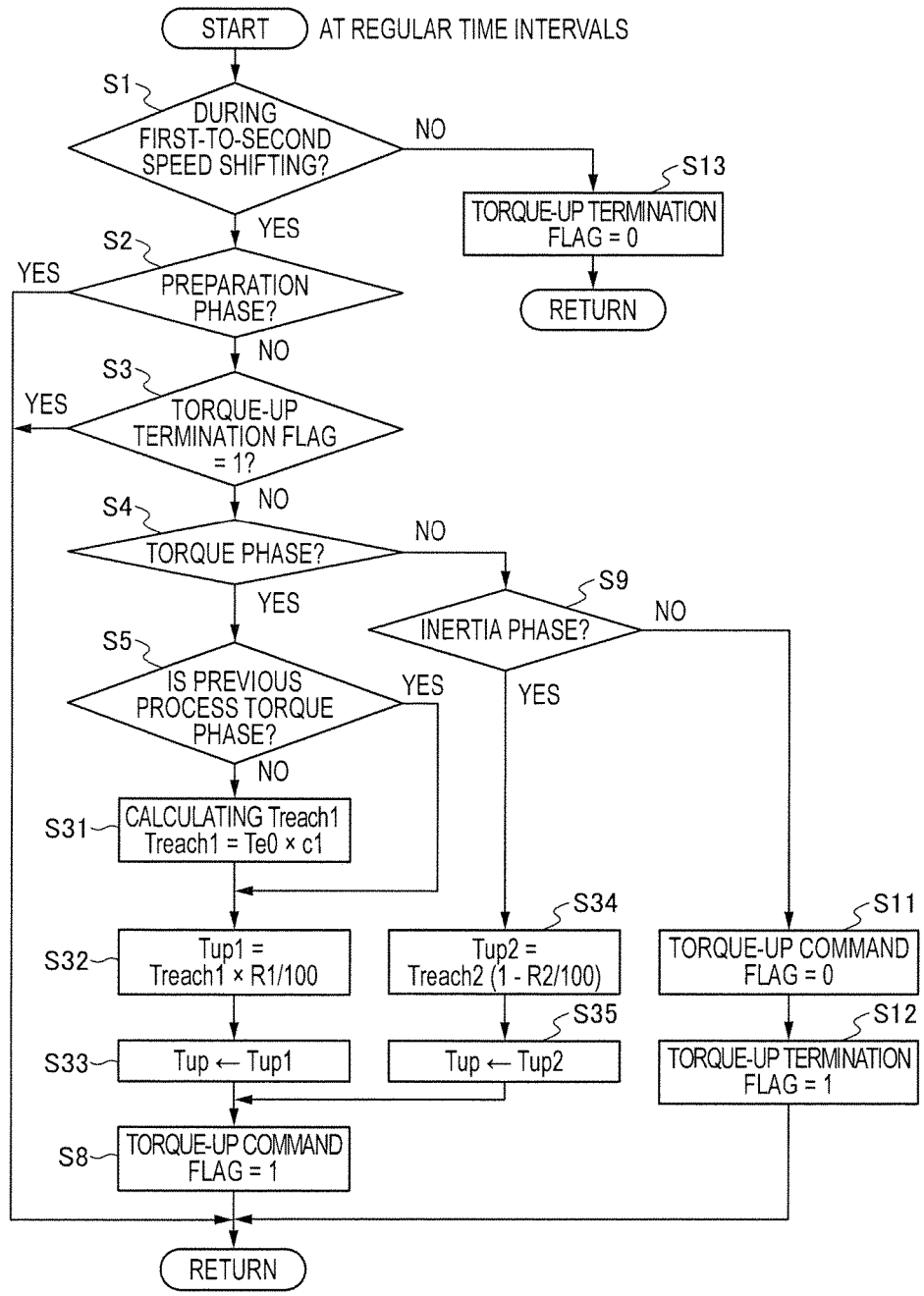
FIG. 9 is a flowchart indicating a setting of a torque-up command flag.

The flowchart in FIG. 9 is a flowchart to set the torque-up command flag of the second embodiment, and this flowchart is executed by the CVT controller 61 at regular time intervals (such as every 10 ms). In FIG. 9, like reference numerals designate like elements as in the flowchart in FIG. 5 of the first embodiment.

A description will be given of mainly the parts different from the flowchart in FIG. 5. When the current process is the torque phase and the previous process is not the torque phase in Steps S3 and S4, that is, the current process is the torque phase for the first time, the CVT controller 61 advances the process to Steps S31 and S32. In Step S31, the CVT controller 61 uses the following formula including the basic engine torque Te0 as the current engine torque and the constant C1 [abstract number] to calculate the reached torque-up amount Treach1 [Nm].

$$\mathrm{Treach1}=Te0 \times C1 \quad (7)$$

The constant C1 of the formula (7) is preliminarily adapted.

In Step S32, the CVT controller 61 use the following formula including the reached torque-up amount Treach1 and the torque phase clutch engagement capacity increase rate R1 [%] to calculate the torque-up command value Tup1 [Nm] in the case where the torque-up amount is provided with a straight line characteristic in the torque phase. Then, the CVT controller 61 transfers the value of the Tup1 to the torque-up command value Tup in Step S33.

$$\mathrm{Tup1}=\mathrm{Treach1} \times R1/100 \quad (8)$$

On the other hand, in Steps S4 and S5, when the current process is the torque phase and the previous process is also the torque phase, that is, when the phase is continuously the torque phase, the CVT controller 61 executes the operations of Steps S32 and S33 skipping Step S31. This increases the torque-up command value Tup from the start timing of the torque phase in synchronization with the torque phase clutch engagement capacity increase rate R1.

Later, when the phase ceases to be the torque phase in Step S4, the CVT controller 61 determines that the phase has transitioned to the phase after the torque phase (the inertia phase, the termination phase), and advances the process to Step S9. When the phase is the inertia phase in Step S9, the CVT controller 61 advances the process to Step S34. In Step S34, the CVT controller 61 uses the following formula including the reached torque-up amount Treach1 and the inertia phase increase rate R2 [%] to calculate the torque-up command value Tup2 [Nm] in the case where the torque-up amount is provided with the straight line characteristic in the inertia phase. Then, the CVT controller 61 transfers the value of the Tup2 to the torque-up command value Tup in Step S35.

$$\mathrm{Tup2}=\mathrm{Treach1}(1-R2/100) \quad (9)$$

On the other hand, insofar as the phase is the inertia phase in Step S9, the CVT controller 61 executes the operations of Steps S34 and S35. This decreases the torque-up command value Tup from the start timing of the inertia phase in synchronization with the inertia phase increase rate R2.

In the second embodiment, the CVT controller 61 (increase rate setting means) that sets the torque phase clutch engagement capacity increase rate R1 is disposed. Then, the CVT controller 61 (the torque-up command means) commands the engine controller 21 to increase the torque-up command value Tup (increase the engine torque) from zero in synchronization with the torque phase engagement clutch capacity increase rate R1. This causes the torque-up command value to reach the reached torque-up amount Treach1 (the maximum value of the torque-up command value) just at the termination timing of the torque phase. Then, the decrease of the acceleration in the vehicle front-rear direction generated in the torque phase can be reduced with high accuracy.

In the second embodiment, the reached torque-up amount Treach1 (the maximum value of the torque-up command value increased by the torque-up command means) is determined corresponding to the basic engine torque Te0. This ensures to provide the appropriate maximum value (Treach1) of the torque-up command value Tup corresponding to the maximum value of the acceleration in the vehicle front-rear direction generated during the first-to-second speed shifting if the basic engine torque Te0 during the first-to-second speed shifting differs.

In the second embodiment, the CVT controller 61 (progress rate setting means) that sets the inertia phase progress rate R2 is disposed. Then, the CVT controller 61 (the torque-down command means) commands the engine controller 21 to decrease the torque-up command value Tup (decrease the engine torque) from the reached torque-up amount Treach1 in synchronization with the inertia phase progress rate R2. This causes the torque-up command value to return to the basic engine torque Te0 just at the termination timing of the inertia phase. Then, the decrease of the acceleration in the vehicle front-rear direction generated in the inertia phase can be reduced with high accuracy.

(Third Embodiment)

Figure 10:
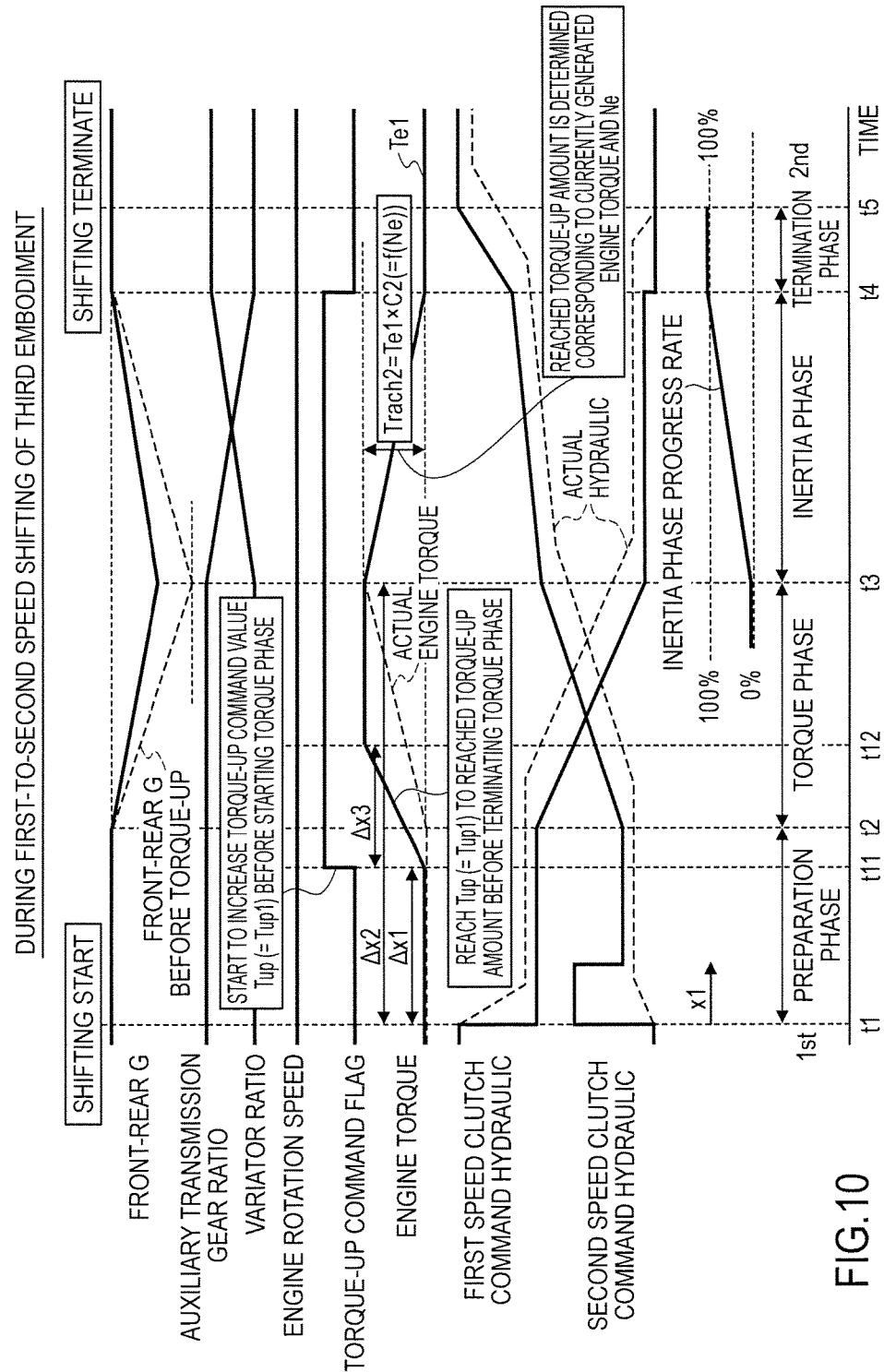
FIG. 10 is a timing chart illustrating a change during a first-to-second speed shifting according to a third embodiment.

FIG. 10 is a timing chart illustrating the change during the first-to-second speed shifting of a third embodiment. FIG. 10 mainly indicates the torque-up (increasing the torque-up command value Tup from zero) in the torque phase. In FIG.

10, like reference numerals denote like elements as in FIG. 8A of the second embodiment.

In the second embodiment, the torque-up command value Tup starts to be increased from zero at the start timing of the torque phase. On the other hand, in the third embodiment, as illustrated in the sixth line of FIG. 10, the CVT controller 61 (the torque-up command means) starts the command to increase the torque-up command value Tup at the timing of a t11 before the start of the torque phase.

Here, the reason that the command to increase the torque-up command value Tup is started at the timing of the t11 before the start of the torque phase is as follows. That is, when the CVT controller 61 commands the engine controller 21 to increase the engine torque from the basic engine torque Te0, a response lag exists from the command timing to the start of the actual increase of the engine torque. This is because the engine torque does not increase immediately even if the engine controller 21 increases the throttle valve opening TVO by a certain amount to increase the intake air amount at the timing of receiving the command. That is, the process is as follows; the intake air increased by the throttle valve 11 reaches the combustion chamber 6 with a supply delay corresponding to the amount of the volume from the throttle valve 11 to the intake port 5, and is mixed with the fuel from the fuel injection valve 7 to be the air-fuel mixture. Then, this air-fuel mixture is ignited to burn by the ignition plug 8 and increases the engine torque. If the increase of the torque-up command value Tup is started at the start timing of the torque phase without considering the above-described supply delay of the intake air, the actual engine torque increases with the delay to the start timing of the torque phase. Then, the decrease of the acceleration in the vehicle front-rear direction fails to be reduced in the period of the delay of the increase of the actual engine torque. Therefore, starting the command to increase the torque-up command value Tup at the timing of the t11 before the start of the torque phase increases the actual engine torque without delaying to the start timing of the torque phase even if the supply of the intake air delays.

In the third embodiment, as illustrated in the sixth line of FIG. 10, the CVT controller 61 (the torque-up command means) achieves the reached torque-up amount (the maximum value of the torque-up command value to be increased) at the timing of a t12 before the termination of the torque phase.

Here, the reason that causes the engine torque to reach the reached torque-up amount Treach2 (the maximum value of the torque-up command value to be increased) at the timing of the t12 before the termination of the torque phase is as follows. That is, if the command of the increase is terminated at the termination timing of the torque phase without considering the above-described supply delay of the intake air, the engine torque reaches the reached torque-up amount Treach2 with the delay to the termination timing of the torque phase. Then, the decrease of the acceleration in the vehicle front-rear direction fails to be reduced in the period of the delay to reach the reached torque-up amount Treach2. Therefore, the CVT controller 61 causes the engine torque to reach the reached torque-up amount Treach2 before the termination of the torque phase. This ensures the engine torque to reach the reached torque-up amount Treach2 without delaying to the termination timing of the torque phase even if the supply of the intake air delays.

Next, in the second embodiment, the reached torque-up amount Treach1 is calculated with the basic engine torque Te0 and the constant C1. On the other hand, in the third embodiment, the reached torque-up amount Treach2 is determined with a currently generated engine torque (Te1) and a coefficient C2 corresponding to the engine rotation speed Ne. That is, the following formula is used to calculate the reached torque-up amount Treach2.

$$Treach2 = Te1 \times C2 \qquad (10)$$

Here, in the second embodiment, the basic engine torque is described as "Te1" differing from the first embodiment. This is because the calculation method of the basic engine torque is different from one another in the first embodiment and the second embodiment. That is, in the first embodiment, the basic engine torque Te0 is calculated even with the engine rotation speed Ne as the parameter (see FIG. 7). On the other hand, in the second embodiment, the basic engine torque is calculated without the engine rotation speed Ne as the parameter (described later). In accordance with the difference of the calculation method the basic engine torque, the reached torque-up amount in the second embodiment is described as "Treach2."

Figure 11:
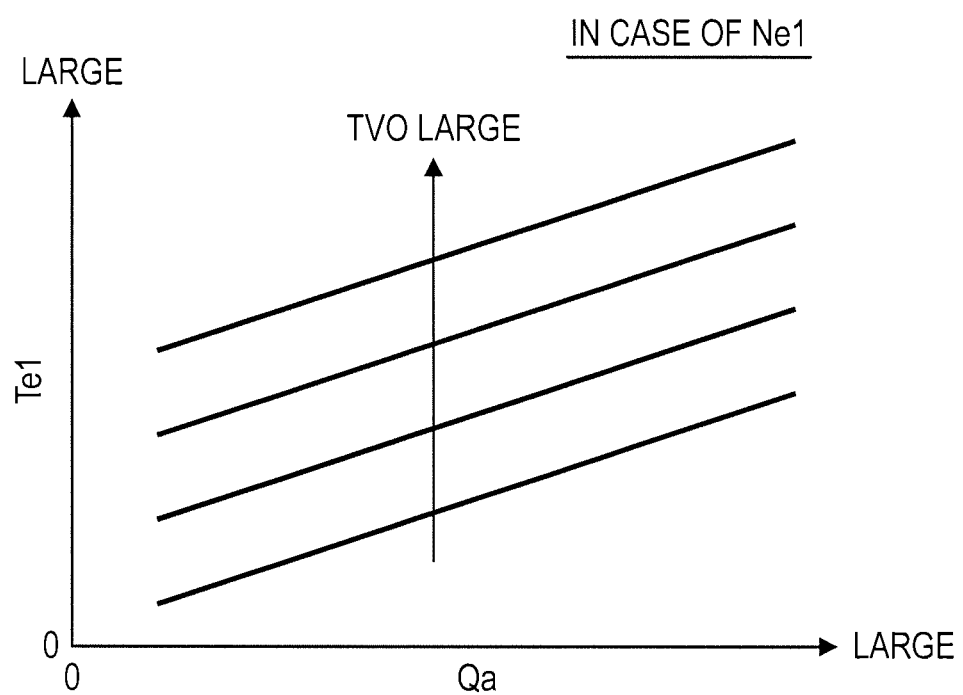
FIG. 11 is a characteristic diagram illustrating a basic engine torque according to the third embodiment.
Figure 12:
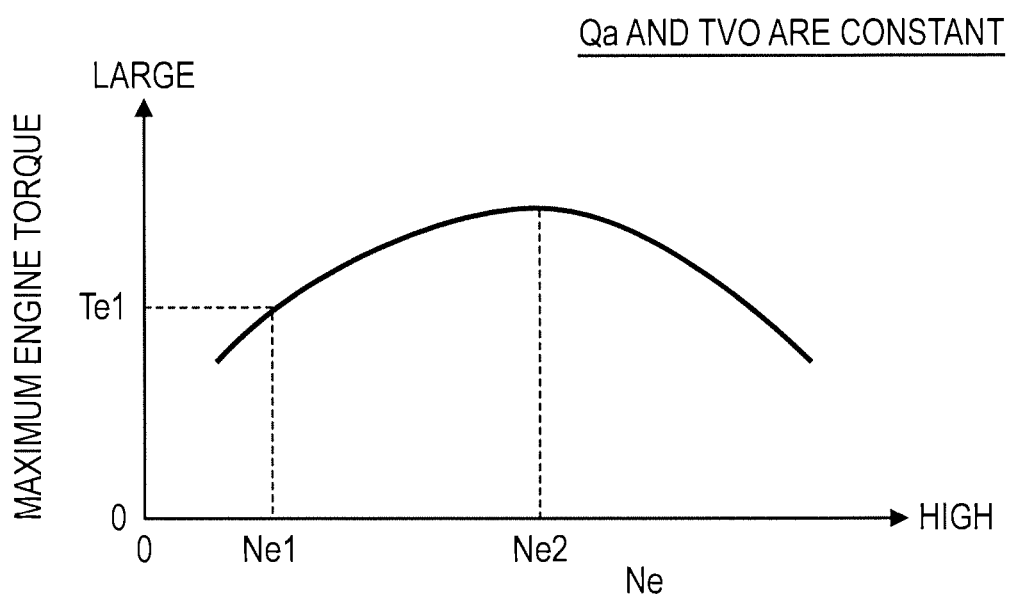
FIG. 12 is a characteristic diagram illustrating a maximum engine torque with respect to an engine rotation speed according to the third embodiment.

The reason that the coefficient C2 is set to the value corresponding to the engine rotation speed Ne as described above is as follows. That is, the maximum value of the acceleration in the vehicle front-rear direction generated during the first-to-second speed shifting is determined with the currently generated basic engine torque and the difference between the driving force of the first speed stage and the driving force of the second speed stage. Then, as described above, the difference between the driving force of the first speed stage and the driving force of the second speed stage can be preliminarily obtained by the specification of the auxiliary transmission mechanism 51. In this case, there is a method to calculate the basic engine torque Te1 without the engine rotation speed Ne as the parameter. For example, as illustrated in FIG. 11, assume that the basic engine torque Te1 is adapted at a predetermined engine rotation speed Ne1. When the predetermined engine rotation speed in this case is referred to an "adapted rotation speed," as illustrated in FIG. 12, in the case where the engine rotation speed Ne is different from the adapted rotation speed Ne1, the actual engine torque is different from the basic engine torque Te1. For example, when the actual engine torque is smaller than the basic engine torque Te1, the reached torque-up amount corresponding to the maximum value of the acceleration in the vehicle front-rear direction during the first-to-second speed shifting (the maximum value of the torque-up command value) is not provided, and the engine torque lacks to the reached torque-up amount. By the amount of the shortage of the engine torque to the reached torque-up amount, the acceleration in the vehicle front-rear direction generated during the first-to-second speed shifting fails to be reduced. Therefore, determining the reached torque-up amount Treach2 corresponding to the engine rotation speed Ne and the basic engine torque Te1 ensures the reached torque-up amount corresponding to the maximum value of the acceleration in the vehicle front-rear direction during the first-to-second speed shifting to be obtained without excess or deficiency even if in the case where the basic engine torque Te1 is calculated without considering the engine rotation speed Ne.

Figure 13:
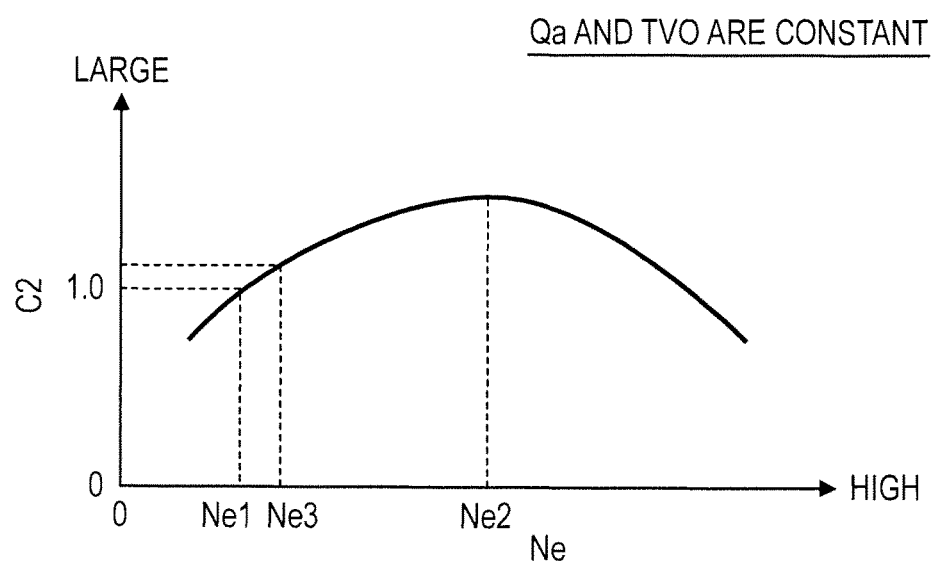
FIG. 13 is a characteristic diagram illustrating a constant according to the third embodiment.

In more detail, as illustrated in FIG. 11, assume that the basic engine torque Te1 is calculated with the intake air amount Qa and the throttle valve opening TVO. In this case, the influence to the maximum engine torque by the difference of the engine rotation speed Ne is not considered. Here, the property of the maximum engine torque in the case where the engine rotation speed Ne is differed under the condition that the intake air amount Qa and the throttle valve opening are constant is not a simple proportional characteristic as illustrated in FIG. 12. That is, as illustrated in FIG. 12, the more the Ne increases, the larger the maximum engine torque becomes until the predetermined value Ne2, and after the predetermined value Ne2, the maximum engine torque decreases. Then, the property of a constant C2 with respect to the engine rotation speed Ne is obtained as illustrated in FIG. 13 corresponding to the property illustrated in FIG. 12. Obtaining the constant C2 on the basis of the engine rotation speed Ne at a timing in accordance with the property in FIG. 13 and multiplying the constant C2 to the basic engine torque Te1 ensures the basic engine torque not to significantly deviate from the actual engine torque if the engine rotation speed Ne differs. In FIG. 13, the constant C2 is 1.0 when the engine rotation speed Ne is the adapted rotation speed Ne1. On the other hand, the constant C2 is less than 1.0 when the engine rotation speed Ne is a predetermined value Ne3 that is larger than the adapted rotation speed Ne1, and the value where the basic engine torque Te1 is increased by this constant C2 is the reached torque-up amount Treach2. This ensures to obtain the reached torque-up amount Treach2 with high accuracy if the engine rotation speed Ne differs.

Figure 14:
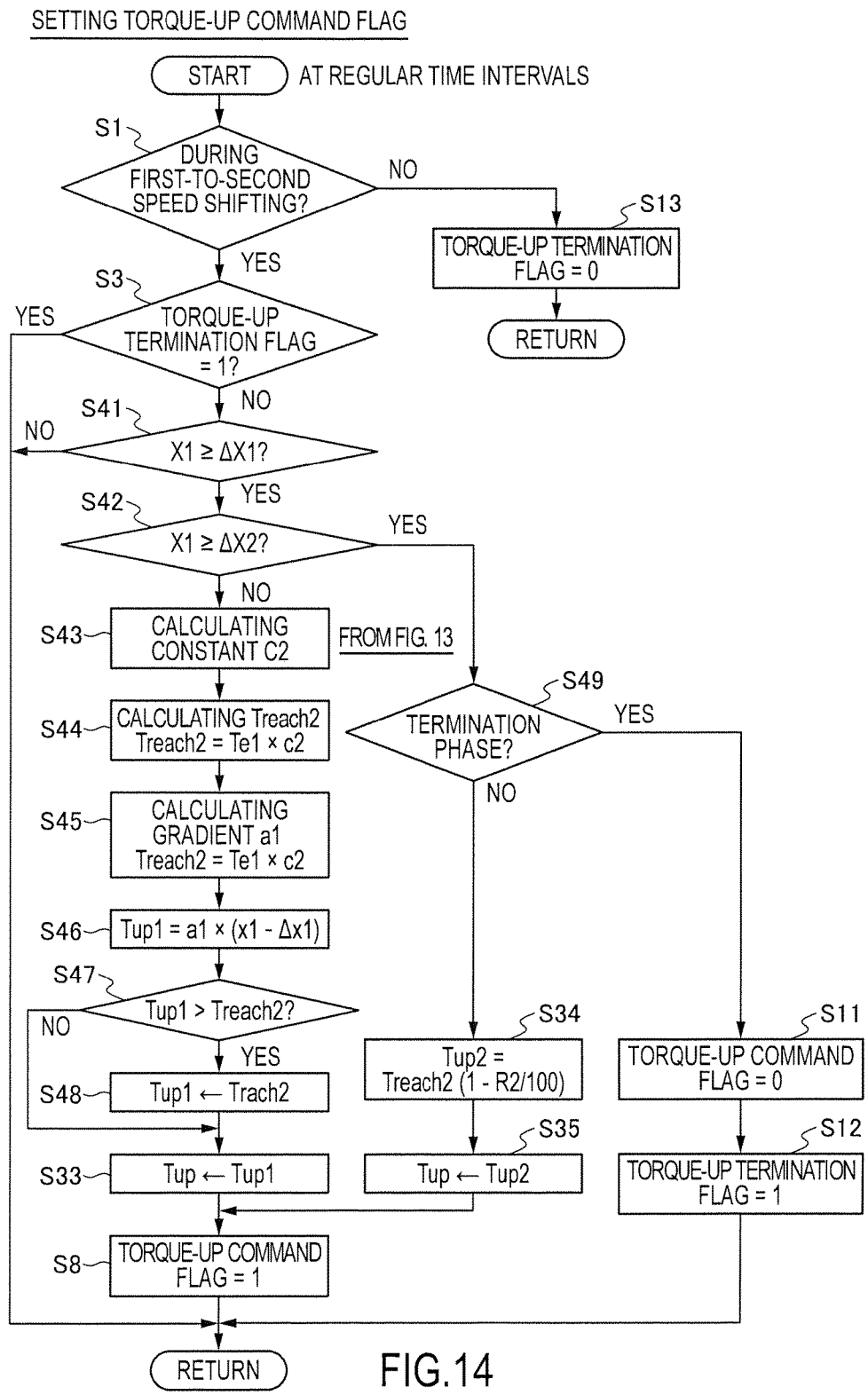
FIG. 14 is a flowchart indicating a setting of a torque-up command flag according to the third embodiment.

The flowchart in FIG. 14 is a flowchart to set the torque-up command flag of the third embodiment, and this flowchart is executed by the CVT controller 61 at regular time intervals (such as every 10 ms). In FIG. 14, like reference numerals designate like elements as in the flowchart in FIG. 9 of the second embodiment.

A description will be given of mainly the parts different from the flowchart in FIG. 9. In Steps S41 and S42, the CVT controller 61 compares an elapsed time x1 from the start timing of the preparation phase with certain time periods $\Delta x1$ and $\Delta x2$. Here, the certain time period $\Delta x1$ is a value to start to increase the torque-up command value Tup before the start timing of the torque phase, and predetermined (see the sixth line in FIG. 10). The certain time period $\Delta x2$ is a value to start the inertia phase, and predetermined (see the sixth line in FIG. 10). When the elapsed time x1 from the start timing of the preparation phase is less than the certain time period $\Delta x1$, the CVT controller 61 determines that the start timing of increasing the torque-up command value Tup has not come yet, and terminates the current process.

On the other hand, when the elapsed time x1 from the start timing of the preparation phase is equal to or more than the certain time period $\Delta x1$ and less than the certain time period $\Delta x2$, the CVT controller 61 advances the process to Step S43 and following Steps to perform the torque-up (increase the torque-up command value Tup from zero).

In Step S43, the CVT controller 61 searches a table including the content of FIG. 13 with the engine rotation speed Ne to calculate the constant C2 [abstract number]. In Step S44, the CVT controller 61 uses the following formula including the basic engine torque Te1 [Nm] as the current engine torque and the constant C2 to calculate the reached torque-up amount Treach2 [Nm].

$$\text{Treach2}=Te1\times C2 \quad (11)$$

The basic engine torque Te1 of the formula (11) is calculated by searching the map including the content of FIG. 11 with the intake air amount Qa and the throttle valve opening TVO.

In Step S45, the CVT controller 61 uses the following formula including the reached torque-up amount Treach2 and a predetermined time $\Delta x3$ to calculate a straight line gradient a1 in the case where the torque-up command value Tup is provided with the straight line characteristic in the torque phase.

$$a1=\text{Treach2}/\Delta x3 \quad (12)$$

The certain time period $\Delta x3$ of the formula (12) is predetermined. In Step S46, the CVT controller 61 uses the following formula including the gradient a1 and the elapsed time x1 from the start timing of the preparation phase to calculate the torque-up command value Tup1 [Nm] in the case where the torque-up command value Tup is provided with the straight line characteristic in the torque phase.

$$\text{Tup1}=a1\times(x1-\Delta x1) \quad (13)$$

The right side of the formula (13), $(x1-\Delta x1)$, is the elapsed time from the t11 in FIG. 10 (that is, the elapsed time from the timing to increase the torque command value).

In Step S47, the CVT controller 61 compares the torque-up amount Tup1 with the reached torque-up amount Treach2. When the torque-up amount Tup1 is equal to or less than the reached torque-up amount Treach2, the CVT controller 61 advances the process to Step S33 skipping Step S48 to transfer the value of the Tup1 to the torque-up command value Tup [Nm].

On the other hand, in Step S47, when the torque-up amount Tup1 exceeds the reached torque-up amount Treach2, the CVT controller 61 advances the process to Step S48 to input the reached torque-up amount Treach2 to the torque-up amount Tup1. Then, in Step S33, the CVT controller 61 transfers the value of the Tup1 to the torque-up command value Tup. This causes the maximum value of the torque-up command value Tup to be the reached torque-up amount Treach2.

On the other hand, in Steps S41 and S42, when the elapsed time x1 from the start timing of the preparation phase is equal to or more than the certain time period $\Delta x2$, the CVT controller 61 advances the process to Step S49 to determine whether the phase is the termination phase. When the phase is not the termination phase, the CVT controller 61 determines that the phase is the inertia phase and advances the process to Steps S34 and S35 to decrease the torque-up command value Tup.

In Step S34, the CVT controller 61 uses the following formula including the reached torque-up amount Treach2 and the inertia phase increase rate R2 [%] to calculate the torque-up command value Tup2 [Nm] in the case where the torque-up command value Tup is provided with the straight line characteristic in the inertia phase. Then, in Step S35, the CVT controller 61 transfers the value of the Tup2 to the torque-up command value Tup.

$$\text{Tup2}=\text{Treach2}(1-R2/100) \quad (14)$$

Thus, in the third embodiment, the CVT controller 61 (the torque-up command means) starts to increase the torque-up command value Tup (command to increase the engine torque) at the timing before the start of the torque phase. This ensures to increase the actual engine torque without delaying to the start timing of the torque phase even if the supply of the intake air delays.

In the third embodiment, the timing before the start of the torque phase is set corresponding to the delay of the supply of the intake air. Then, the start timing of increasing the torque-up command value Tup can be set with high accuracy in accordance with the supply delay of the intake air.

In the third embodiment, the CVT controller 61 (the torque-up command means) causes the engine torque to reach the reached torque-up amount Treach2 (the maximum value of the torque-up command value to be increased) before the termination of the torque phase. This ensures the engine torque to reach the reached torque-up amount Treach2 without delaying to the termination timing of the torque phase even if the supply of the intake air delays.

In the third embodiment, the reached torque-up amount Treach2 (the maximum value of the torque-up amount increased by the torque-up command means) is determined corresponding to the engine rotation speed Ne and the basic engine torque Te1. This ensures to provide the reached torque-up amount Treach2 corresponding to the maximum value of the acceleration in the vehicle front-rear direction during the first-to-second speed shifting without excess or deficiency even if in the case where the basic engine torque Te1 is calculated without the engine rotation speed Ne as the parameter (variable).

(Fourth Embodiment)

Figure 15:
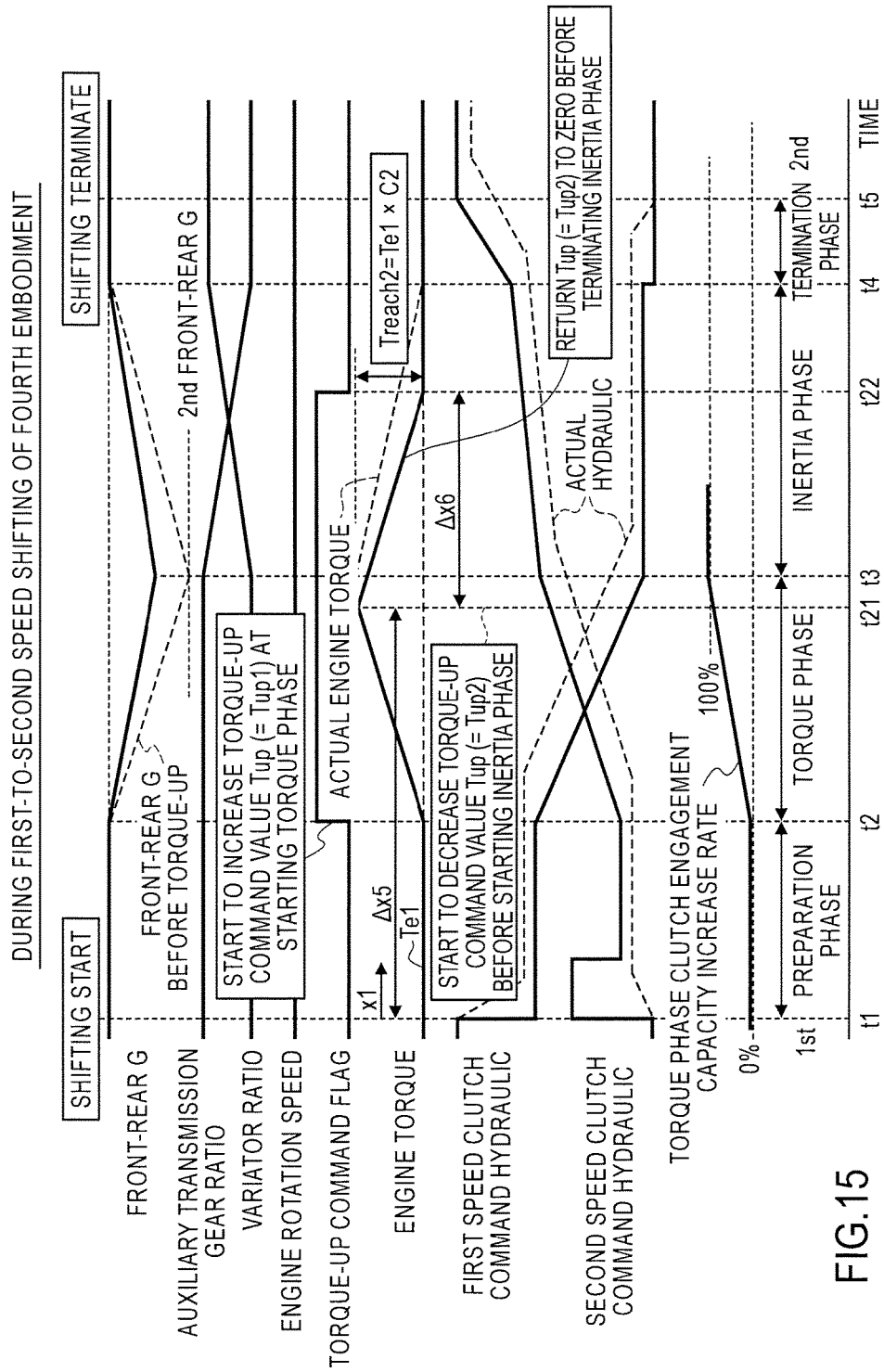
FIG. 15 is a timing chart illustrating a change during a first-to-second speed shifting according to a fourth embodiment.

FIG. 15 is a timing chart illustrating the change during the first-to-second speed shifting of a fourth embodiment. FIG. 15 mainly indicates the torque-down (decreasing the torque-up command value Tup to zero) in the inertia phase. In FIG. 15, like reference numerals denote like elements as in FIG. 8B of the second embodiment.

In the second embodiment, the torque-up command value Tup starts to be decreased from the reached torque-up amount Treach1 at the start timing of the inertia phase. On the other hand, in the fourth embodiment, as illustrated in the sixth line of FIG. 15, the CVT controller 61 (the torque-down command means) starts the command to decrease the torque-up command value Tup at the timing of a t21 before the start of the inertia phase.

Here, the reason that the command to decrease the torque-up command value Tup is started at the timing of the t21 before the start of the inertia phase is as follows. That is, when the CVT controller 61 commands the engine controller 21 to decrease the engine torque, a response lag exists from the command timing to the start of the actual decrease of the engine torque. This is because the engine torque does not decrease immediately even if the engine controller 21 decreases the throttle valve opening by a certain amount to decrease the intake air amount at the timing of receiving the command. That is, the process is as follows; the intake air decreased at the section of the throttle valve 11 reaches the combustion chamber 6 with a supply delay corresponding to the amount of the volume from the throttle valve 11 to the intake port 5, and is mixed with the fuel from the fuel injection valve 7 to be the air-fuel mixture. Then, this air-fuel mixture is ignited to burn by the ignition plug 8 and increases the engine torque. If the decrease of the torque-up command value Tup is started at the start timing of the inertia phase without considering the above-described supply delay of the intake air, the actual engine torque decreases with the delay to the start timing of the inertia phase. The increase of the acceleration in the vehicle front-rear direction fails to be reduced in the period of the delay of the decrease of the actual engine torque. Therefore, starting the command to decrease the torque-up command value Tup at the timing of the t21 before the start of the inertia phase decreases the actual engine torque without delaying to the start timing of the inertia phase even if the supply of the intake air delays.

In the fourth embodiment, as illustrated in the sixth line of FIG. 15, the CVT controller 61 (the torque-down command means) returns the engine torque to the basic engine torque Te1 at the timing of a t22 before the termination of the inertia phase.

Here, the reason to return the engine torque to the basic engine torque Te1 at the timing of the t22 before the termination of the inertia phase is as follows. That is, if the command of the decrease is terminated at the termination timing of the inertia phase without considering the above-described supply delay of the intake air, the engine torque returns to the basic engine torque Te1 with the delay to the termination timing of the inertia phase. Then, the increase of the acceleration in the vehicle front-rear direction fails to be reduced in the period of the delay to return to the basic engine torque Te1. Therefore, returning the engine torque to the basic engine torque Te1 before the termination of the inertia phase returns the engine torque to the basic engine torque Te1 without delaying to the termination timing of the inertia phase even if the supply of the intake air delays.

Figure 16:
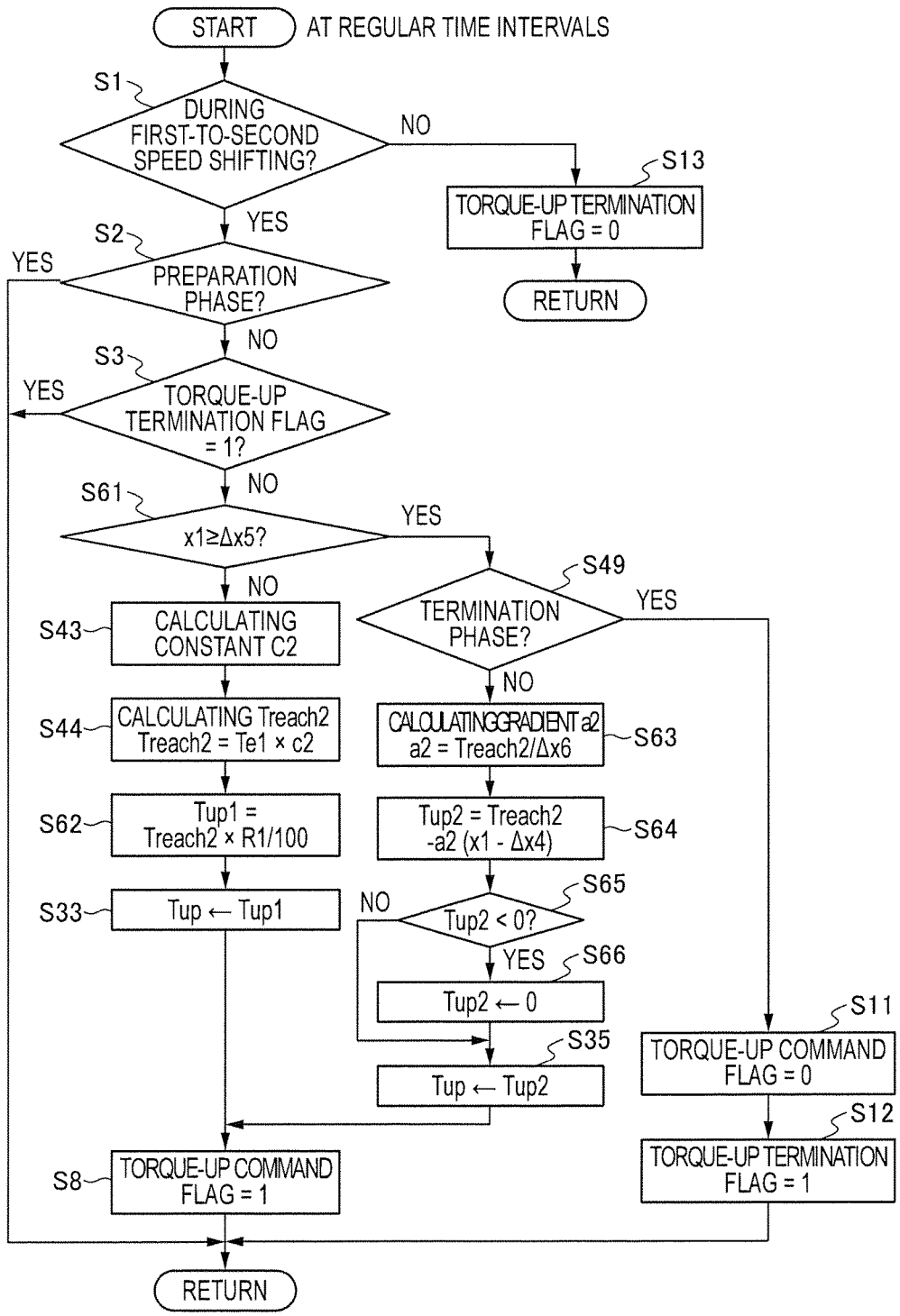
FIG. 16 is a flowchart indicating a calculation of an engine torque command value according to the fourth embodiment.

The flowchart in FIG. 16 is a flowchart to set the torque-up command flag of the fourth embodiment, and this flowchart is executed by the CVT controller 61 at regular time intervals (such as every 10 ms). In FIG. 16, like reference numerals designate like elements as in the flowchart in FIG. 9 of the second embodiment and FIG. 14 of the third embodiment.

A description will be given of mainly the parts different from the flowcharts in FIG. 9 and FIG. 14. In Step S61, the CVT controller 61 compares the elapsed time x1 from the start timing of the preparation phase with a certain time period Δx5. Here, the certain time period Δx5 is a value to start to decrease the torque-up command value Tup before the start timing of the inertia phase, and predetermined. When the elapsed time x1 from the start timing of the preparation phase is less than the certain time period Δx5, the CVT controller 61 determines that the start timing of decreasing the torque-up command value Tup has not come yet, and terminates the current process.

On the other hand, when the elapsed time x1 from the start timing of the preparation phase is equal to or more than the certain time period Δx5, the CVT controller 61 advances the process to Step S43 and following Steps to perform the torque-down (decrease the torque-up command value Tup to zero).

In Step S43, the CVT controller 61 searches a table including the content of FIG. 13 with the engine rotation speed Ne to calculate the constant C2 [abstract number]. In Step S44, the CVT controller 61 uses the following formula including the basic engine torque Te1 [Nm] as the current engine torque and the constant C2 to calculate the reached torque-up amount Treach2 [Nm].

$$\text{Treach2} = Te1 \times C2 \tag{15}$$

The basic engine torque Te1 of the formula (15) is calculated by searching the map including the content of FIG. 11 with the intake air amount Qa and the throttle valve opening TVO.

In Step S62, the CVT controller 61 uses the following formula including the reached torque-up amount Treach2 and the torque phase engagement clutch capacity increase rate R1 [%] to calculate the torque-up command value Tup1 [Nm] in the case where the torque-up command value Tup is provided with the straight line characteristic in the torque phase. Then, in Step S33, the CVT controller 61 transfers the value of the Tup1 to the torque-up command value Tup.

$$\text{Tup1} = \text{Treach2} \times R1/100 \tag{16}$$

In Step S61, the CVT controller 61 advances the process to Step S49 when the elapsed time x1 from the start timing of the preparation phase is equal to or more than the certain time period Δx5 to determine whether the phase is the termination phase. When the phase is not the termination phase, the CVT controller 61 advances the process to Steps S63 to S66 to decrease the torque-up command value Tup.

Steps S63 to S66 are steps to decrease the torque-up command value Tup in the inertia phase. In Step S63, the CVT controller 61 uses the following formula including the reached torque-up amount Treach2 and a predetermined time Δx6 to calculate a straight line gradient a2 in the case where the torque-up command value Tup is provided with the straight line characteristic in the inertia phase.

$$a2 = Treach2/\Delta x6 \quad (17)$$

The certain time period Δx6 of the formula (17) is predetermined. In Step S64, the CVT controller 61 uses the following formula including the gradient a2 and the elapsed time x1 from the start timing of the preparation phase to calculate the torque-up command value Tup2 [Nm] in the case where the torque-up command value Tup is provided with the straight line characteristic in the inertia phase.

$$Tup2 = Treach2 - a2 \times (x1 - \Delta x4) \quad (18)$$

The (x1−Δx4) of the formula (18) is the elapsed time from the t21 in FIG. 15 (that is, the elapsed time from the timing to decrease the torque command value).

In Step S65, the CVT controller 61 compares the torque-up command value Tup2 with zero. When the torque-up command value Tup2 is equal to or more than zero, the CVT controller 61 advances the process to Step S35 skipping Step S66, and transfers the value of the Tup2 to the torque-up command value Tup.

On the other hand, in Step S65, when the torque-up command value Tup2 is less than zero, the CVT controller 61 advances the process to Step S66 to input zero to the torque-up command value Tup2. Then, the CVT controller 61 transfers the value of the Tup2 to the torque-up command value Tup in Step S35.

In the fourth embodiment, the CVT controller 61 (the torque-down command means) starts the command to decrease the engine torque at the timing before the start of the inertia phase. This ensures to decrease the actual engine torque without delaying to the start timing of the inertia phase even if the response of the intake air delays.

In the fourth embodiment, the timing before the start of the inertia phase is set corresponding to the supply delay of the intake air. Then, the start timing of the decrease of the torque-up command value Tup can be set with high accuracy in accordance with the supply delay of the intake air.

In the fourth embodiment, the CVT controller 61 (the torque-down command means) returns the engine torque to the basic engine torque Te1 before the termination of the inertia phase. This ensures to return the engine torque to the basic engine torque Te1 without delaying to the termination timing of the inertia phase even if the supply of the intake air delays.

(Fifth Embodiment)

Figure 17:
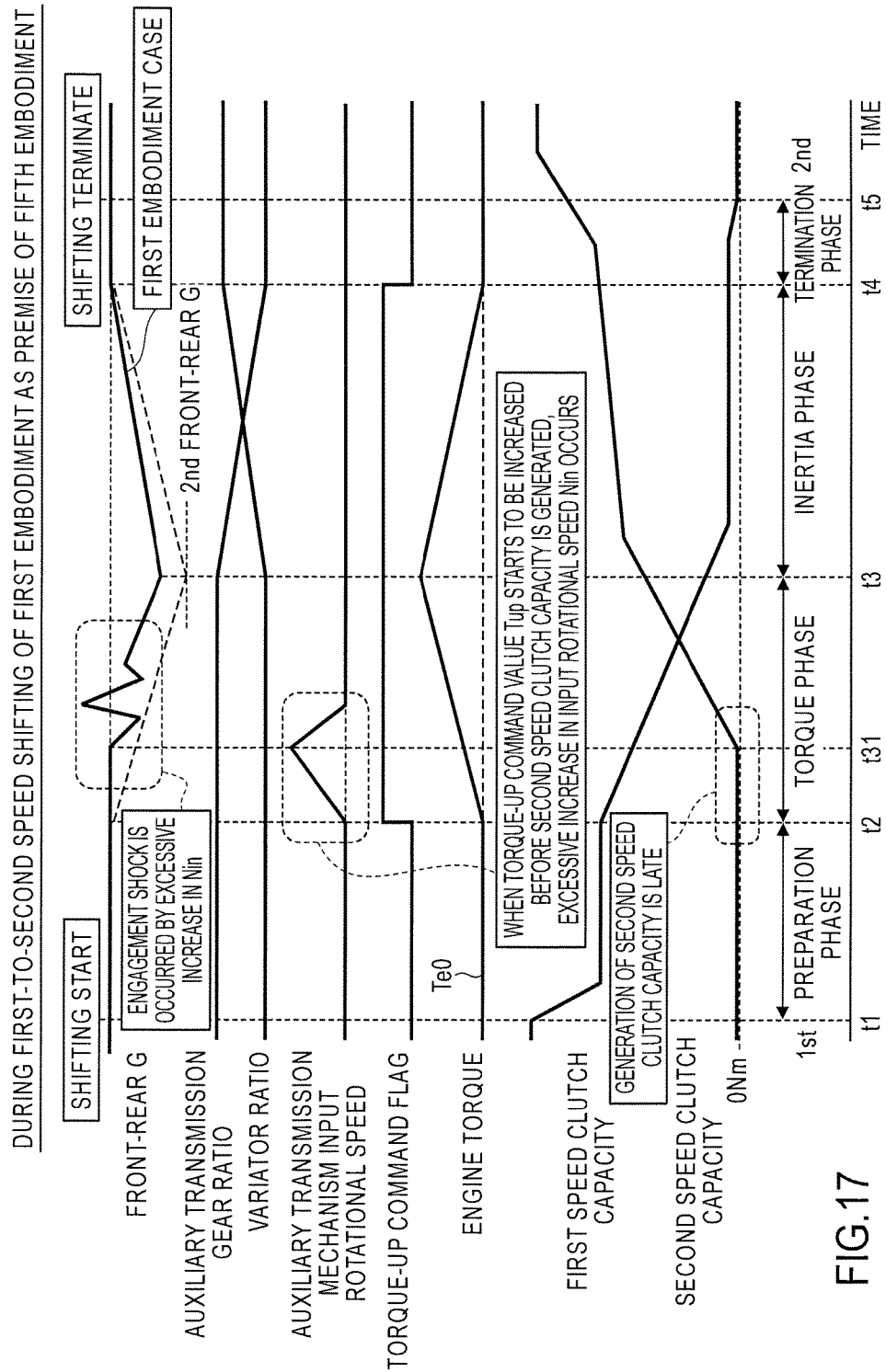
FIG. 17 is a timing chart illustrating a change during the first-to-second speed shifting of the first embodiment as a premise according to a fifth embodiment.
Figure 18:
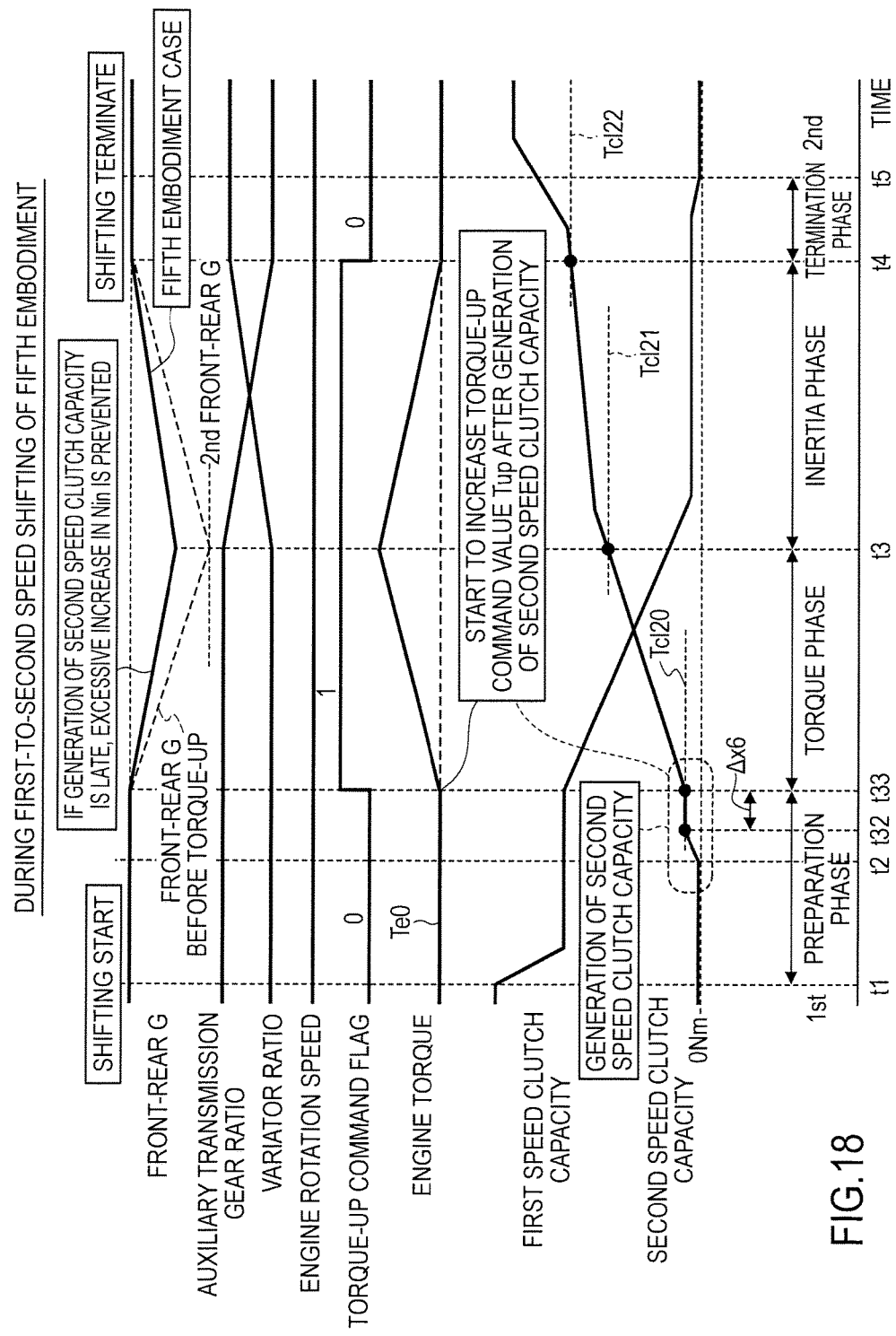
FIG. 18 is a timing chart illustrating a change during a first-to-second speed shifting according to the fifth embodiment.

FIG. 17 is a timing chart illustrating the change during the first-to-second speed shifting of the first embodiment as a premise of a fifth embodiment, and FIG. 18 is a timing chart illustrating the change during the first-to-second speed shifting of the fifth embodiment. In FIG. 17 and FIG. 18, like reference numerals denote like elements as in the flowchart in FIG. 4 of the first embodiment.

As illustrated in the lowermost line of FIG. 4, in the first embodiment, the second speed clutch capacity is generated (accordingly, the second speed clutch 56 starts to be engaged) at the timing of the t2. However, the second speed clutch capacity is generated not necessarily corresponding to the second speed clutch command hydraulic. As illustrated in the lowermost line of FIG. 4, an actual hydraulic (a hydraulic actually supplied to the second speed clutch 56) rises delaying to the second speed clutch command hydraulic. Since the second speed clutch capacity is approximately proportionate to the actual hydraulic not to the second speed clutch command hydraulic, the second speed clutch capacity is usually generated delaying to the rising up of the second speed clutch command hydraulic. In other words, since the start timing of the torque phase is determined on the basis of the second speed clutch command hydraulic, the second speed clutch capacity is generated (the second speed clutch 56 starts to be engaged) delaying to the start timing of the torque phase. While, in the first embodiment, the delay period from the start timing of the torque phase to the generation timing of the second speed clutch capacity is assumed to be small and ignored, in the fifth embodiment, the delay is a problem to be solved.

A description will be further given of this problem by referring to FIG. 17. The lowermost line of FIG. 17 again indicates how the second speed clutch capacity during the first-to-second speed shifting changes. As illustrated in the lowermost line of FIG. 17, assume that the generation of the second speed clutch capacity is delayed to the torque phase start timing (t2). For example, assume that the second speed clutch capacity is generated (the second speed clutch 56 starts to be engaged) at the timing of a t31. That is, in the period from the t2 to the t31, it is a state before the second speed clutch 56 starts to be engaged while the phase is the torque phase. Then, when the torque-up (increase the torque-up command value Tup from zero) is performed at the timing of the t2 before the second speed clutch 56 starts to be engaged, as illustrated in the fourth line of FIG. 17, the input rotational speed Nin of the auxiliary transmission mechanism 51 excessively increases from the timing of the t2. Hereinafter, the input rotational speed Nin of the auxiliary transmission mechanism 51 is referred to as "an auxiliary transmission mechanism input rotational speed Nin," or also referred to simply as "an input rotational speed Nin." When the second speed clutch capacity is generated (the second speed clutch 56 starts to be engaged) at the t31 in the middle of the excessive increase in the auxiliary transmission mechanism input rotational speed Nin, a shock is generated in accordance with the engagement of the second speed clutch 56 (see the top line of FIG. 17).

Accordingly, in the fifth embodiment, as illustrated in FIG. 18, the CVT controller 61 (the torque-up command means) starts the command to increase the torque-up command value Tup after the second speed clutch capacity (the engagement capacity of the second engagement portion) is generated. In detail, when the second speed clutch capacity is not generated (the second speed clutch 56 has not started to engage) at the t2 in FIG. 18, the CVT controller 61 stands by without starting to increase the torque-up command value Tup. Then, the second speed clutch capacity is generated (the second speed clutch 56 starts to be engaged) at the t32. However, the CVT controller 61 does not start to increase the torque-up command value Tup immediately at the t32. At the timing of the t33 where the generation of the second speed clutch capacity has been continued for the predetermined time Δx6, the CVT controller 61 starts to increase the torque-up command value Tup.

Whether the second speed clutch capacity is generated (the second speed clutch 56 starts to be engaged) can be determined as follows. That is, as illustrated in the lowermost line of FIG. 18, a predetermined value Tc120 [Nm] is predetermined, and the predetermined value is compared with a second speed clutch capacity Tc12 [Nm]. Then, it is determined whether the second speed clutch capacity Tc12 is equal to or more than the predetermined value Tc120, and at the timing of the t32 where the second speed clutch capacity Tc12 becomes equal to or more than the predetermined value Tc120, the second speed clutch capacity Tc12 is determined to be generated. The second speed clutch capacity Tc12 is detected (described later).

To surely determine whether the second speed clutch capacity Tc12 is generated, it is determined whether the state where the second speed clutch capacity Tc12 is equal to or more than the predetermined value Tc120 continues for the predetermined time Δx6. That is, the second speed clutch capacity Tc12 possibly returns to less than the predetermined value Tc120 after becoming equal to or more than the predetermined value Tc120 just for a moment. If the torque-up command value Tup starts to be increased even in this case, the engagement shock possibly occurs. Accordingly, the torque-up command value Tup starts to be increased after the predetermined time Δx6 has passed.

In the fifth embodiment, the torque phase starts at the timing of the t33 where the generation of the second speed clutch capacity Tc12 has continued for the predetermined time Δx6. That is, in the fifth embodiment, since the torque phase, the inertia phase, and the termination phase are not configured to be determined on the basis of the second speed clutch command hydraulic, it is necessary to determine the torque phase, the inertia phase, and the termination phase on the basis of the second speed clutch capacity Tc12. Then, as illustrated in the lowermost line of FIG. 18, it is determined that the torque phase terminates (the inertia phase starts) at the timing where the second speed clutch capacity Tc12 reaches a predetermined value Tc121. It is determined that the inertia phase terminates (the termination phase starts) at the timing where the second speed clutch capacity Tc12 reaches a predetermined value Tc122.

Figure 19:
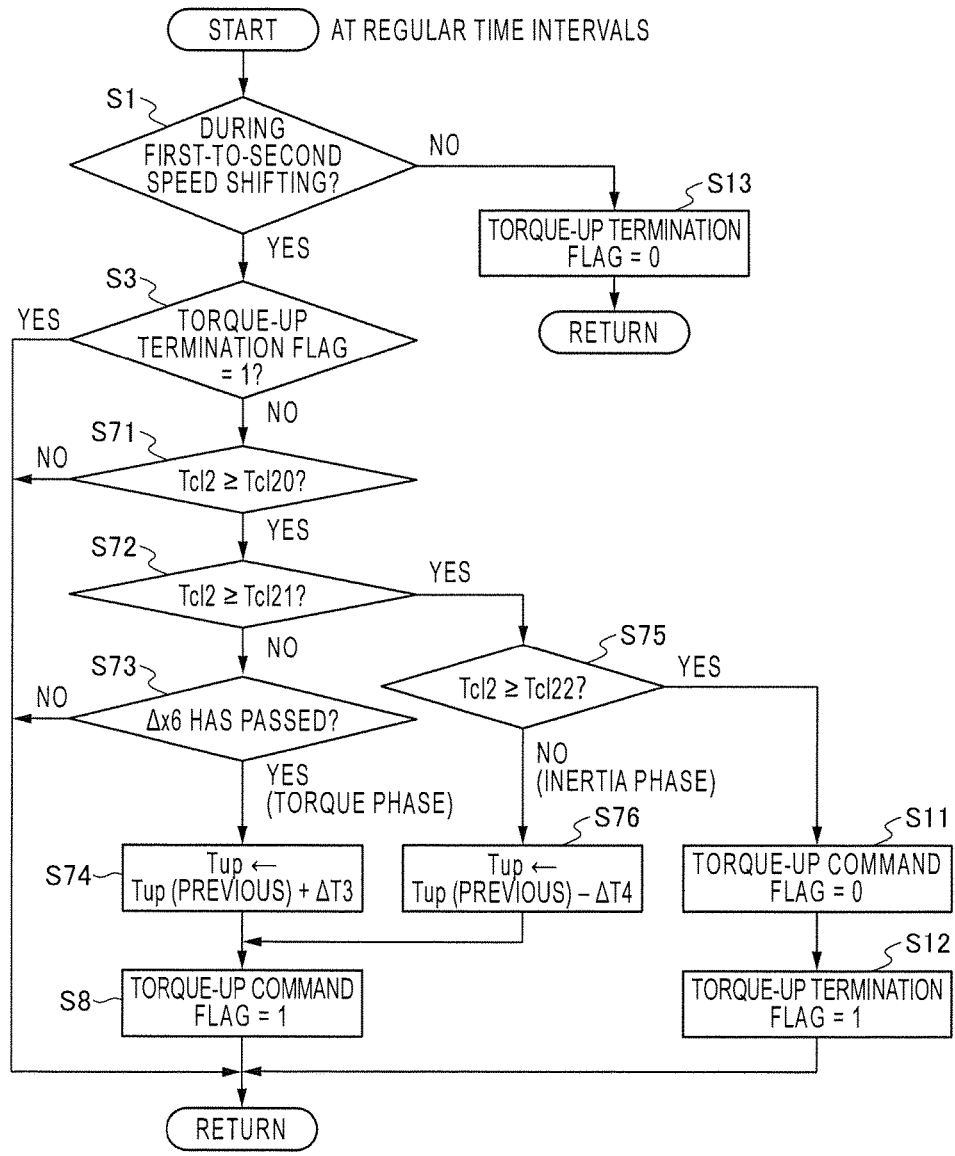
FIG. 19 is a flowchart indicating a setting of a torque-up command flag according to the fifth embodiment.

The flowchart in FIG. 19 is a flowchart to set the torque-up command flag of the fifth embodiment, and this flowchart is executed by the CVT controller 61 at regular time intervals (such as every 10 ms). In FIG. 19, like reference numerals designate like elements as in the flowchart in FIG. 5 of the first embodiment.

A description will be given of mainly the parts different from the flowchart in FIG. 5. In Steps S71 and S72, the CVT controller 61 compares the second speed clutch capacity Tc12 [Nm] with the predetermined values Tc120 and Tc121 [Nm]. Here, the predetermined value Tc120 is a value to determine whether the second speed clutch capacity Tc12 is generated (the second speed clutch 56 starts to be engaged), and predetermined. The predetermined value Tc121 is the second speed clutch capacity at the time when the torque phase terminates (when the inertia phase starts), and predetermined.

Figure 20:
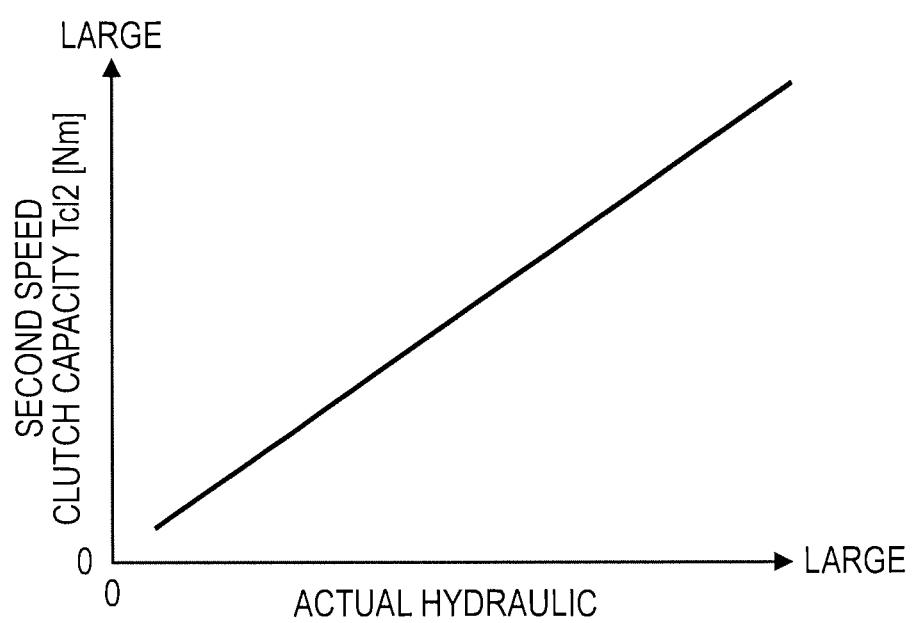
FIG. 20 is a characteristic diagram illustrating a second speed clutch capacity according to the fifth embodiment.

The second speed clutch capacity Tc12 is obtained as follows. The second speed clutch capacity Tc12 is proportionate to the actual hydraulic (the hydraulic actually supplied to the second speed clutch 56). Therefore, a hydraulic sensor 59 (see FIG. 2) is disposed to detect the actual hydraulic, and searching the table with the content of FIG. 20 with the actual hydraulic detected by the hydraulic sensor 59 obtains the second speed clutch capacity Tc12.

When the second speed clutch capacity Tc12 obtained in this way is less than the predetermined value Tc120, the CVT controller 61 determines that the second speed clutch capacity has not been generated, and terminates the current process.

In Steps S71 and S72, when the second speed clutch capacity Tc12 is equal to or more than the predetermined value Tc120 and less than the predetermined value Tc121, the CVT controller 61 determines that the second speed clutch capacity has been generated, and advances the process to Step S73. In Step S73, the CVT controller 61 determines whether the state where the second speed clutch capacity Tc12 is equal to or more than the predetermined value Tc120 and less than the predetermined value Tc121 has continued for the predetermined time Δx6. The predetermined time Δx6 is predetermined. Before the state where the second speed clutch capacity Tc12 is equal to or more than the predetermined value Tc120 and less than the predetermined value Tc121 has continued for the predetermined time Δx6, the CVT controller 61 terminates the current process.

In Step S73, when the state where the second speed clutch capacity Tc12 is equal to or more than the predetermined value Tc120 and less than the predetermined value Tc121 has continued for the predetermined time Δx6, the CVT controller 61 determines that the second speed clutch capacity is surely generated. Then, the CVT controller 61 advances the process to Step S74. In Step S74, the CVT controller 61 calculates a value where a predetermined value ΔT3 [Nm] is added to "a Tup (previous)," which is the torque-up command value of the previous process, (inputting zero as the initial value) as the torque-up command value Tup of the current process. The above-described predetermined value ΔT3 is a value to determine the gradient of the increase of the torque-up command value in the torque phase, and predetermined.

In the fifth embodiment, the timing where the second speed clutch capacity is determined to be surely generated is the start timing of the torque phase. Accordingly, after the predetermined time Δx6 has continued, the phase is the torque phase. During the torque phase, the operation of Step S74 is repeated. This increases the torque-up command value Tup, which is zero at the start of the torque phase, by the predetermined value ΔT3 during the torque phase.

Later, when the second speed clutch capacity Tc12 rises to equal to or more than the predetermined value Tc121 in Step S72, the CVT controller 61 determines that the torque phase is terminated, and advances the process to Step S75. Then, the CVT controller 61 compares the second speed clutch capacity Tc12 with the predetermined value Tc122 [Nm]. Here, the predetermined value Tc122 is the second speed clutch capacity at the time when the inertia phase terminates (when the termination phase starts), and predetermined. When the second speed clutch capacity Tc12 is less than the predetermined value Tc122, the CVT controller 61 determines that the phase is the inertia phase. Then, the CVT controller 61 advances the process to Step S76. In Step S76, the CVT controller 61 calculates a value where a predetermined value ΔT4 [Nm] is subtracted from "the Tup (previous)," which is the torque-up command value of the previous process, as the torque-up command value Tup of the current process. The above-described predetermined value ΔT4 is a value to determine the gradient of the torque-up command value in the inertia phase, and predetermined.

Insofar as in the inertia phase in Step S75, the operation of Step S76 is repeated. This decreases the torque-up command value Tup by the predetermined value ΔT4 from the start of the inertia phase.

In Step S75, when the second speed clutch capacity Tc12 rises to equal to or more than the predetermined value Tc122, the CVT controller 61 determines the inertia phase to be terminated, and advances the process to Steps S11 and S12.

In the fifth embodiment, the CVT controller 61 (the torque-up command means) starts to increase the torque-up command value Tup (command to increase the engine torque) after the generation of the second speed clutch engagement capacity (the engagement capacity of the second engagement portion). This prevents the excessive increase in the auxiliary transmission mechanism input rotational speed NM because of increasing the torque-up command value Tup before the generation of the second speed clutch capacity, and prevents the clutch engagement shock after the excessive increase.

(Sixth Embodiment)

Figure 21A:
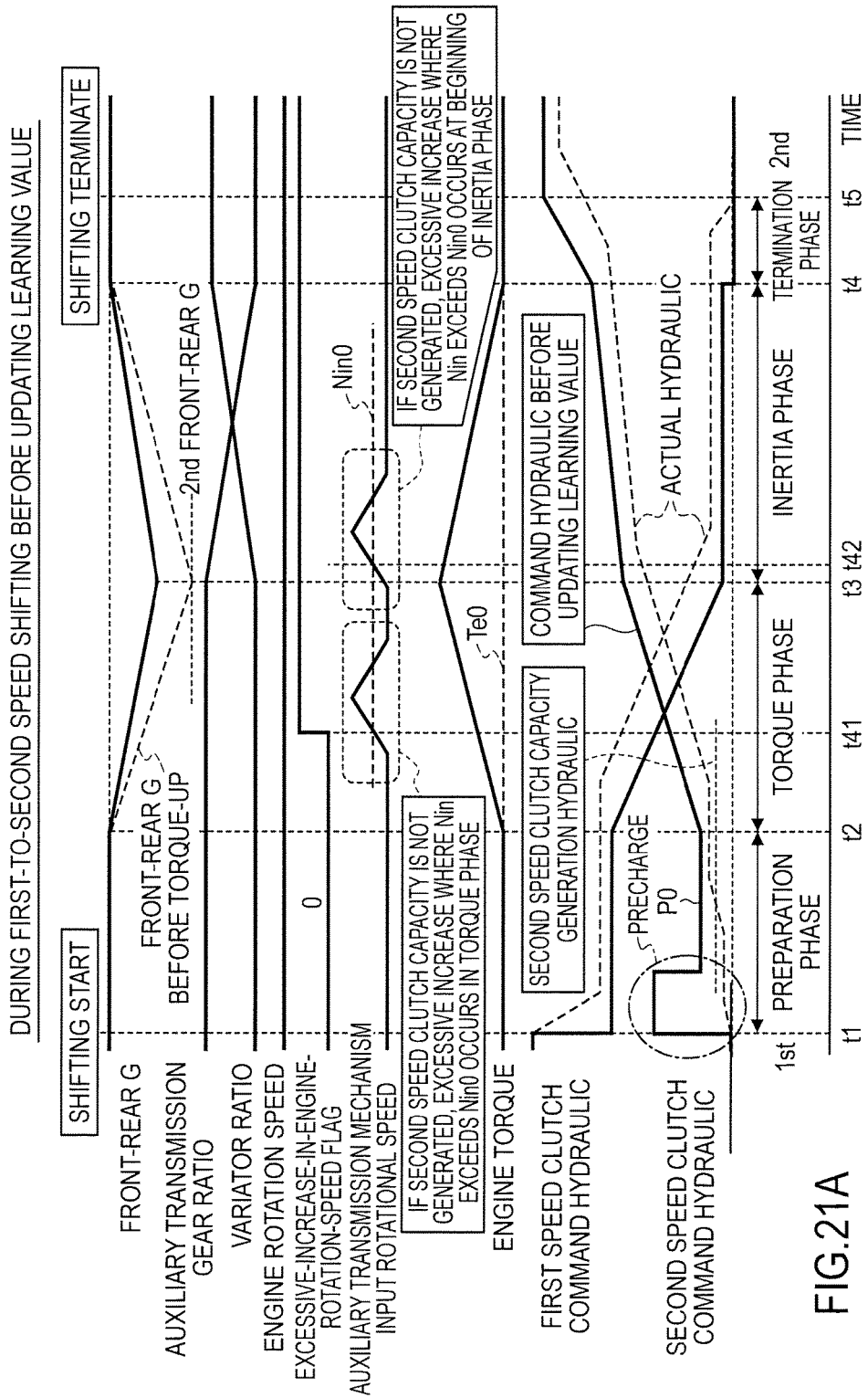
FIG. 21A is a timing chart illustrating a change during a first-to-second speed shifting before a convergence of a learning value according to a sixth embodiment.
Figure 21B:
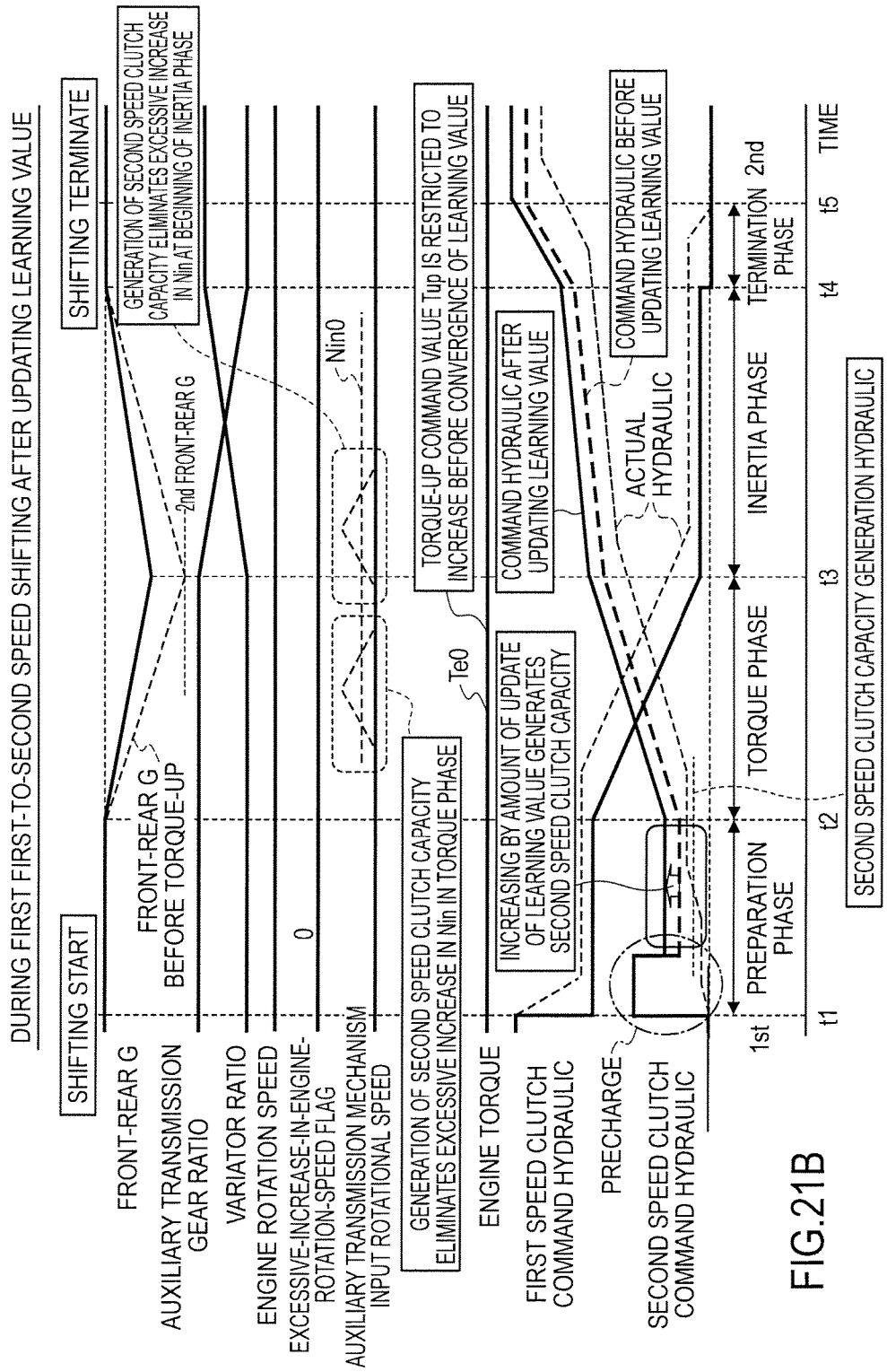
FIG. 21B is a timing chart illustrating a change during the first-to-second speed shifting for the first time after an update of the learning value according to the sixth embodiment.
Figure 21C:
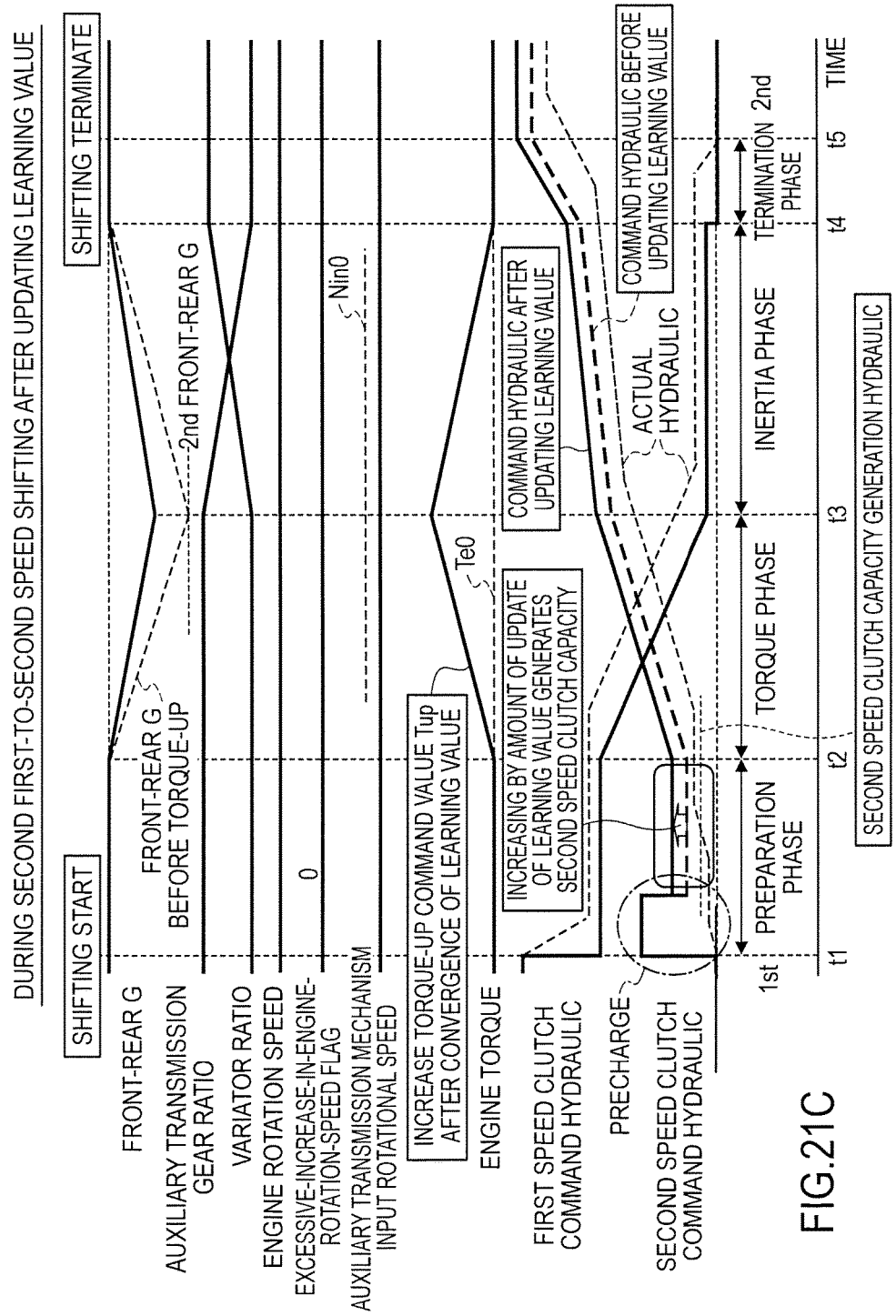
FIG. 21C is a timing chart illustrating a change during the first-to-second speed shifting for the second time after the update of the learning value according to the sixth embodiment.

FIG. 21A, FIG. 21B, and FIG. 21C are timing charts illustrating the change during the first-to-second speed shifting of the sixth embodiment. Among them, FIG. 21A indicates the change during the first-to-second speed shifting before updating a learning value. FIG. 21B indicates the change during the first-to-second speed shifting for the first time after updating the learning value. FIG. 21B indicates the change during the first-to-second speed shifting for the second time after updating the learning value. In FIG. 21A, FIG. 21B, and FIG. 21C, like reference numerals designate like elements as in FIG. 4 of the first embodiment. To ease the explanation, the sixth embodiment describes the case where the learning value converges by only one updating of the learning value. However, it is needless to say that the embodiment is not limited to the case where the learning value converges by only one updating of the learning value.

As illustrated in the lowermost line of FIG. 21A, in the preparation phase, the second speed clutch command hydraulic exceeds a second speed clutch capacity generation hydraulic (the hydraulic that generates the second speed clutch capacity). Then, the auxiliary transmission mechanism input rotational speed Nin is supposed not to excessively increase even if the torque-up command value Tup is increased from zero at the start timing of the torque phase. However, performing the torque-up (increasing the torque-up command value Tup from zero) at the timing of the t2 possibly causes the auxiliary transmission mechanism input rotational speed Nin to excessively increase at the beginning of the torque phase and the inertia phase as illustrated in the sixth line of FIG. 21A. If the second speed clutch capacity is actually generated (the second speed clutch starts to be engaged) after the excessive increase, a shock in accordance with the engagement of the second speed clutch 56 possibly occurs.

Here, as a cause that the input rotational speed Nin exceeds a predetermined value Nin0 at the beginning of the torque phase and the inertia phase to excessively increase, the insufficiency of the engaging force of the second speed clutch 56 is considered. That is, the second speed clutch 56 is originally configured of a wet-type multi-plate clutch. The wet-type multi-plate clutch has various variation factors because each plate of the multi plates is a friction plate and used in the state where the entire plate is constantly lubricated by the hydraulic oil. Because of the variation factors, even if the second speed clutch capacity generation hydraulic is supplied, for example, when the temperature of the hydraulic oil becomes high compared with the specified value, the engaging force of the second speed clutch 56 decreases by the amount of the decrease of the viscosity of the hydraulic oil compared with the case where the hydraulic oil has the temperature of the specified value. Alternatively, if the above-described variation factors decrease the friction coefficient of the friction material used for the above-described friction plate compared with the specified value caused by the aged deterioration, the engaging force of the second speed clutch 56 decreases compared with before the aged deterioration by the amount of the decrease of the friction coefficient. The engaging force of the second speed clutch 56 is significantly influenced by the environmental condition and the aged deterioration caused by the variation factors of the second speed clutch 56. Therefore, even if the second speed clutch capacity generation hydraulic is provided, the situation where the engaging force of the second speed clutch 56 is insufficient possibly occurs. If the torque-up (increasing the torque-up command value Tup from zero) is performed in the case where such situation occurs, the excessive increase where the auxiliary transmission mechanism input rotational speed Nin exceeds the predetermined value Nin0 occurs at the beginning of the torque phase and the inertia phase.

Thus, if the auxiliary transmission mechanism input rotational speed Nin excessively increases at the beginning of the torque phase and the inertia phase even though the second speed clutch capacity generation hydraulic is provided in the preparation phase, it is necessary to prevent the input rotational speed Nin from excessively increasing. In this case, to prevent the input rotational speed Nin from excessively increasing, the engaging force of the second speed clutch 56 is configured to increase to actually generate the second speed clutch capacity. Since the engaging force of the second speed clutch 56 is proportionate to the hydraulic supplied to the second speed clutch 56, the second speed clutch command hydraulic is increased to increase the engaging force of the second speed clutch 56.

Therefore, in the sixth embodiment, the CVT controller 61 additionally includes the function as a learning first execution means. The learning first execution means performs the operations of the following [1] and [2].

[1] When the auxiliary transmission mechanism input rotational speed Nin excessively increases in the torque phase or the inertia phase, the learning first execution means updates the learning value of the second speed clutch command hydraulic (hereinafter simply referred to as "the learning value") in the side to increase the second speed clutch command hydraulic (the command hydraulic). For example, the learning first execution means additionally introduces a learning value Pgaku to increase the second speed clutch command hydraulic, and constitutes the sum of a basic hydraulic Pbase and the learning value Pgaku as a second speed clutch command hydraulic Pcmd. In this configuration, increasing the learning value Pgaku increases the second speed clutch command hydraulic Pcmd.

[2] When the second speed clutch command hydraulic that includes the learning value after the update is given to the hydraulic control valve unit 51e (the hydraulic adjusting means) during the first-to-second speed shifting, the learning first execution means determines the learning value to be converged if the auxiliary transmission mechanism input rotational speed Nin ceases to excessively increase.

[3] Then, when the above-described learning first execution means converges the learning value, the second speed clutch engagement capacity (the engagement capacity of the second engagement portion) is determined to be generated.

In detail, the learning first execution means executes the following procedures of [11] to [16].

[11] During one first-to-second speed shifting, the learning first execution means determines whether the auxiliary transmission mechanism input rotational speed Nin excessively increases. For example, as illustrated in FIG. 21A, the learning first execution means determines that the input rotational speed Nin excessively increased at the timings of t41 and t42 where the input rotational speed Nin exceeds the predetermined value (become Nin>Nin0) in the torque phase or the beginning of the inertia phase.

[12] When the determination result indicates the occurrence of the excessive increase in the auxiliary transmission mechanism input rotational speed Nin, the learning first execution means updates the learning value to the side to increase the second speed clutch command hydraulic during the period after the first-to-second speed shifting where the excessive increase has occurred until the next first-to-second speed shifting of the first-to-second speed shifting. For example, the learning first execution means updates the learning value Pgaku to the side to increase by a certain value ΔP1 immediately after the termination timing of the first-to-second speed shifting where the excessive increase has occurred.

[13] During the first first-to-second speed shifting after updating the learning value, the learning first execution means gives the second speed clutch command hydraulic that includes the learning value to the hydraulic control valve unit 51e in the state where the CVT controller 61 is restricted to command the engine controller 21. Here, "the command by the CVT controller 61 to the engine controller 21" is the command for the torque-up (increasing the torque-up command value Tup from zero). For example, as illustrated in the lowermost line of FIG. 21B, during the first first-to-second speed shifting after updating the learning value Pgaku, the learning first execution means increases the second speed clutch command hydraulic Pcmd by the amount of the update of the learning value Pgaku (ΔP1) compared with before the update of the learning value Pgaku.

[14] Similarly, during the first first-to-second speed shifting after updating the learning value, the learning first execution means determines whether the excessive increase in the auxiliary transmission mechanism input rotational speed Nin occurs in the state where the torque-up (increasing the torque-up command value Tup from zero) is restricted. This is performed to determine the result of the learning. For example, as illustrated in the sixth line of FIG. 21B, during the first first-to-second speed shifting after updating the learning value Pgaku, the auxiliary transmission mechanism input rotational speed Nin holds the certain value at the beginning of the torque phase and the inertia phase. That is, the excessive increase in the input rotational speed Nin has not occurred (it is not Nin>Nin0). Increasing the engaging force of the second speed clutch 56 by the amount of the update of the learning value Pgaku (ΔP1) actually generates the second speed clutch capacity (the second speed clutch starts to be engaged). This restricts the excessive increase in the auxiliary transmission mechanism input rotational speed Nin.

[15] When the determination result indicates that the excessive increase in the input rotational speed has not occurred, the learning first execution means determines that the learning value has been converged. For example, the learning first execution means determines that the learning value Pgaku has been converged immediately after the first first-to-second speed shifting after updating the learning value Pgaku.

[16] During the first-to-second speed shifting after the learning value has been converged, the learning first execution means releases the restriction of the command by the CVT controller 61 (the command means) to the engine controller 21 (the engine control means), and permits to increase the engine torque from the basic engine torque Te0. For example, as illustrated in FIG. 21C, during the second first-to-second speed shifting after updating the learning value Pgaku (after the first convergence of the learning value), the learning first execution means releases the restriction of the torque-up (increasing the torque-up command value Tup from zero) and permits (causes to perform) the torque-up.

Figure 22:
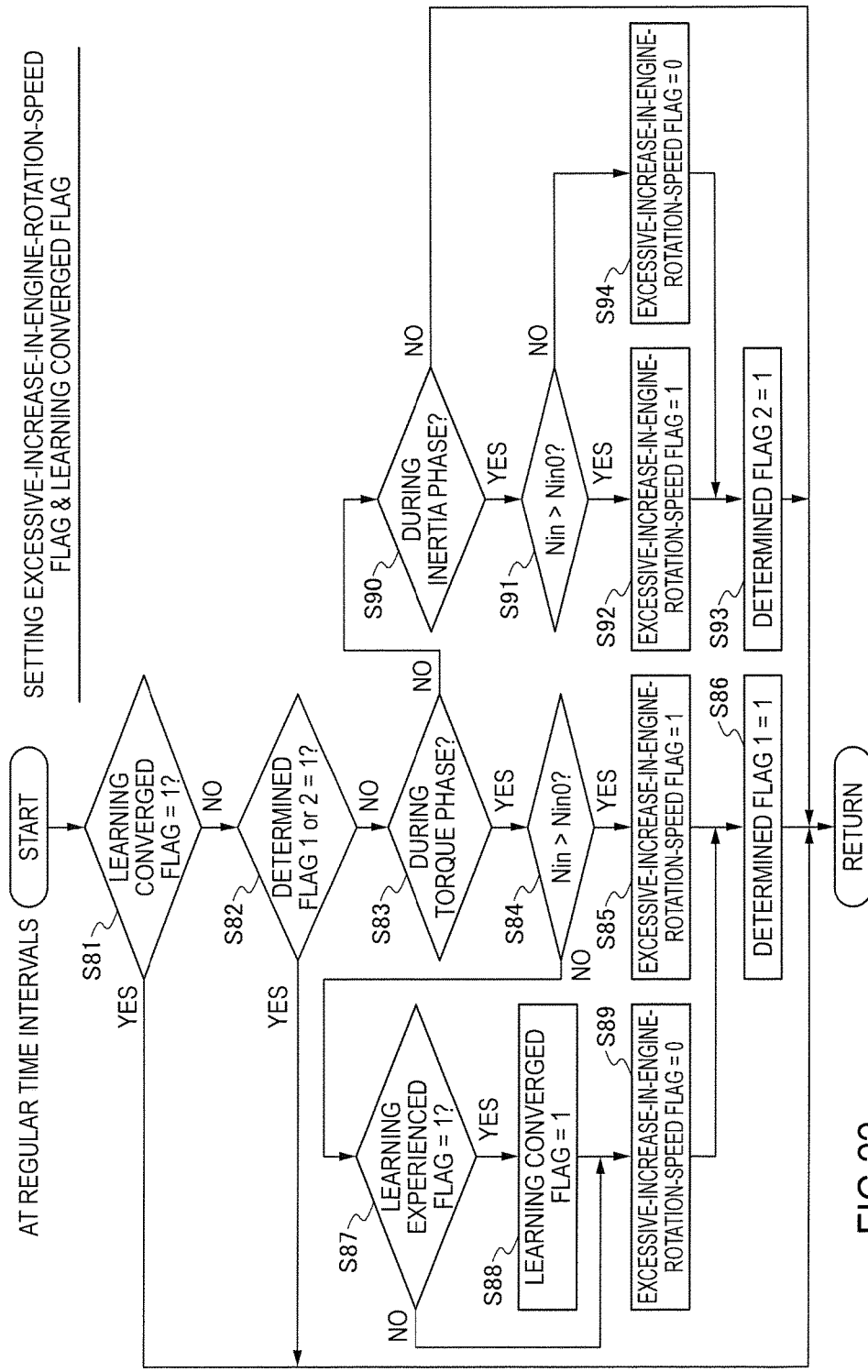
FIG. 22 is a flowchart indicating a setting of an excessive-increase-in-engine-rotation-speed flag and a learning converged flag according to the sixth embodiment.

The flowchart in FIG. 22 is a flowchart to set an excessive-increase-in-engine-rotation-speed flag and a learning converged flag of the sixth embodiment, and this flowchart is executed by the CVT controller 61 at regular time intervals (such as every 10 ms).

In Step S81, the CVT controller 61 refers to the learning converged flag. Here, assuming to the learning converged flag=0, the CVT controller 61 advances the process to Step S82. In Step S82, the CVT controller 61 refers to a determined flag 1 or a determined flag 2. Here, assuming to the determined flag 1=0 and the determined flag 2=0, the CVT controller 61 advances the process to Step S83.

In Step S83, the CVT controller 61 determines whether the phase is the torque phase. Then, when the phase is the torque phase, the CVT controller 61 advances the process to Step S84. Then, the CVT controller 61 compares the auxiliary transmission mechanism input rotational speed Nin [rpm] detected by the input rotational speed sensor 59 (see FIG. 2) with the predetermined value Nin0 [rpm]. Here, the predetermined value Nin0 is a value to determine whether the excessive increase in the auxiliary transmission mechanism input rotational speed has occurred, and predetermined. When the auxiliary transmission mechanism input rotational speed Nin is equal to or less than the predetermined value Nin0, the CVT controller 61 determines that the excessive increase in the input rotational speed Nin has not occurred, and advances the process to Step S89 to set the excessive-increase-in-engine-rotation-speed flag=0. Steps S87 and S88, of which explanations are skipped, will be described later.

In Step S84, when the auxiliary transmission mechanism input rotational speed Nin exceeds the predetermined value Nin0, the CVT controller 61 determines that the excessive increase in the input rotational speed Nin has occurred in the torque phase. Then, the CVT controller 61 advances the process to Steps S85 and S86. In Step S85, the CVT controller 61 sets the excessive-increase-in-engine-rotation-speed flag=1. In Step S86, the CVT controller 61 sets the determined flag 1=1. Here, the excessive-increase-in-engine-rotation-speed flag=1 indicates the occurrence of the excessive increase in the input rotational speed Nin in the torque phase. The determined flag 1=1 indicates that the excessive increase in the input rotational speed Nin in the torque phase has been already determined.

In Step S83, when the phase is not the torque phase, the CVT controller 61 determines that the phase has transitioned to next phase, and advances the process to Step S90. In Step S90, the CVT controller 61 determines whether the phase is the inertia phase. When the phase is not the inertia phase, the CVT controller 61 terminates the current process.

In Step S90, when the phase is the inertia phase, the CVT controller 61 advances the process to Step S91. The operation of Step S91 is similar to the operation of Step S84. That is, the CVT controller 61 compares the auxiliary transmission mechanism input rotational speed Nin [rpm] detected by the input rotational speed sensor 59 with the predetermined value Nin0 [rpm]. The predetermined value Nin0 is a value to determine whether the excessive increase in the auxiliary transmission mechanism input rotational speed has occurred, and predetermined. When the input rotational speed Nin of the auxiliary transmission mechanism 51 is equal to or less than the predetermined value Nin0, the CVT controller 61 determines that the excessive increase in the input rotational speed Nin has not occurred. Then, the CVT controller 61 advances the process to Step S94 to set the excessive-increase-in-engine-rotation-speed flag=0.

In Step S91, when the input rotational speed Nin of the auxiliary transmission mechanism 51 exceeds the predetermined value Nin0, the CVT controller 61 determines that the excessive increase in the input rotational speed Nin has occurred at the beginning of the inertia phase. Then, the CVT controller 61 advances the process to Steps S92 and S93. The operations of Steps S92 and S93 are similar to the operations of Steps S85 and S86. That is, in Step S92, the CVT controller 61 sets the excessive-increase-in-engine-rotation-speed flag=1. In Step S93, the CVT controller 61 sets the determined flag 2=1. Here, the excessive-increase-in-engine-rotation-speed flag=1 indicates the occurrence of the excessive increase in the input rotational speed Nin at the beginning of the inertia phase. The determined flag 2=1 indicates that the excessive increase in the input rotational speed Nin in the inertia phase has been already determined.

Because of the determined flag 1=1 in Step S86 or the determined flag 2=1 in Step S93, the CVT controller 61 cannot proceed the process from Step S82 to Step S83 and following Steps in the subsequent process. In other words, when the auxiliary transmission mechanism input rotational speed Nin exceeds the predetermined value Nin0 in the torque phase, it is the determined flag 1=1. This omits the determination whether the auxiliary transmission mechanism input rotational speed Nin rises to equal to or more than the predetermined value Nin0 in the inertia phase subsequent to the torque phase. On the other hand, if the auxiliary transmission mechanism input rotational speed Nin has not exceeded the predetermined value Nin0 in the torque phase, the determination whether the auxiliary transmission mechanism input rotational speed Nin exceeds the predetermined value Nin0 in the inertia phase subsequent to the torque phase is performed. This sets the determined flag 2=1 when the auxiliary transmission mechanism input rotational speed Nin exceeds the predetermined value Nin0. Then, the determination whether the excessive increase in the input rotational speed Nin occurs is not performed in following Steps.

Figure 23:
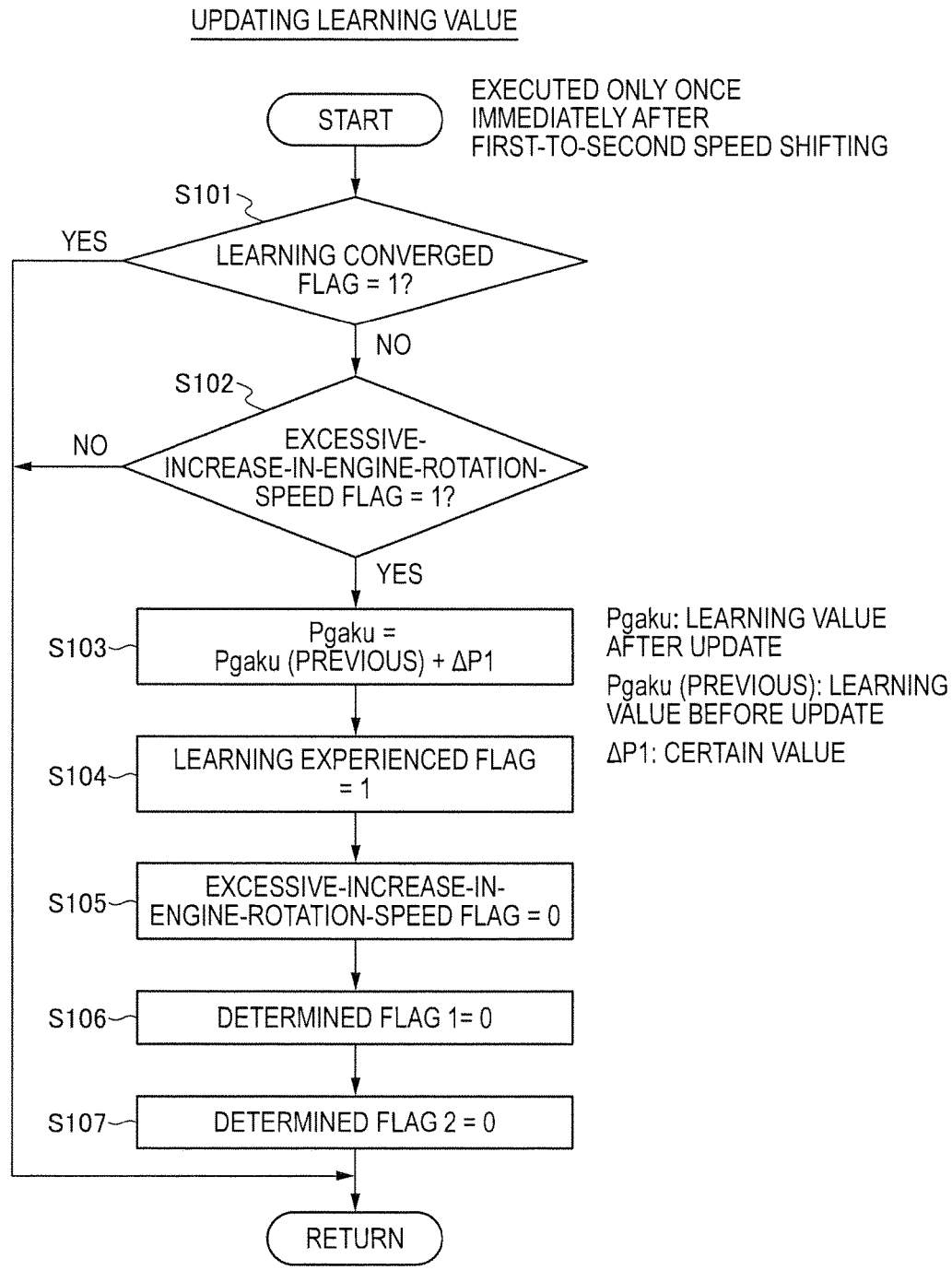
FIG. 23 is a flowchart indicating an update of the learning value according to the sixth embodiment.

The flowchart in FIG. 23 is a flowchart to update the learning value of the sixth embodiment, and this flowchart is executed only once immediately after the termination of the first-to-second speed shifting (after the termination timing of the termination phase) by the CVT controller 61 subsequently to the flowchart in FIG. 22. The timing to update the learning value is not limited to immediately after the termination of the first-to-second speed shifting, and any timing is applicable insofar as the timing immediately before the start of the next first-to-second speed shifting (before the start timing of the preparation phase). That is, it is only necessary to complete the update of the learning value immediately before the start of the next first-to-second speed shifting.

At the timing of the termination of the first-to-second speed shifting, the CVT controller 61 advances the process to Step S101 to refer to the learning converged flag. Here, assuming to the learning converged flag=0, the CVT controller 61 advances the process to Step S102. In Step S102, the excessive-increase-in-engine-rotation-speed flag (already set in the flowchart in FIG. 22) is referred. In the case of the excessive-increase-in-engine-rotation-speed flag=0, the CVT controller 61 determines that the excessive increase in the auxiliary transmission mechanism input rotational speed Nin did not occur during the first-to-second speed shifting performed immediately before updating the learning value, that is, it is not necessary to update the learning value, to terminate the current process.

In the case of the excessive-increase-in-engine-rotation-speed flag=1 in Step S102, the CVT controller 61 determines that the excessive increase in the auxiliary transmission mechanism input rotational speed Nin occurred during the first-to-second speed shifting performed immediately before updating the learning value. That is, the CVT controller 61 determines that it is necessary to update the learning value in the side to increase the second speed clutch command hydraulic. At this case, the CVT controller 61 advances the process to Step S103 and following Steps. In Step S103, the CVT controller 61 updates the learning value Pgaku while setting a value where the certain value ΔP1 [kPa] is added to "a Pgaku (previous)" [kPa], which is a previous learning value, as the current learning value Pgaku [kPa]. That is, the CVT controller 61 uses the following formula to update the learning value Pgaku.

$$Pgaku = Pgaku(\text{previous}) + \Delta P1 \quad (19)$$

As the certain value ΔP1 of the formula (19), a positive value is predetermined. As the initial value of the learning value Pgaku, zero is input.

This terminates the update of the learning value Pgaku. Then, in Step S94, the CVT controller 61 sets the learning experienced (the learning value updated) flag=1. Here, the learning experienced flag=1 indicates that the update of the learning value has been experienced. To determine whether the excessive increase in the input rotational speed Nin has occurred during the first first-to-second speed shifting after updating the learning value Pgaku, the CVT controller 61 sets the excessive-increase-in-engine-rotation-speed flag=0, the determined flag 1=0, and the determined flag 2=0 in Steps S105, S106, and S107 respectively.

Figure 24:
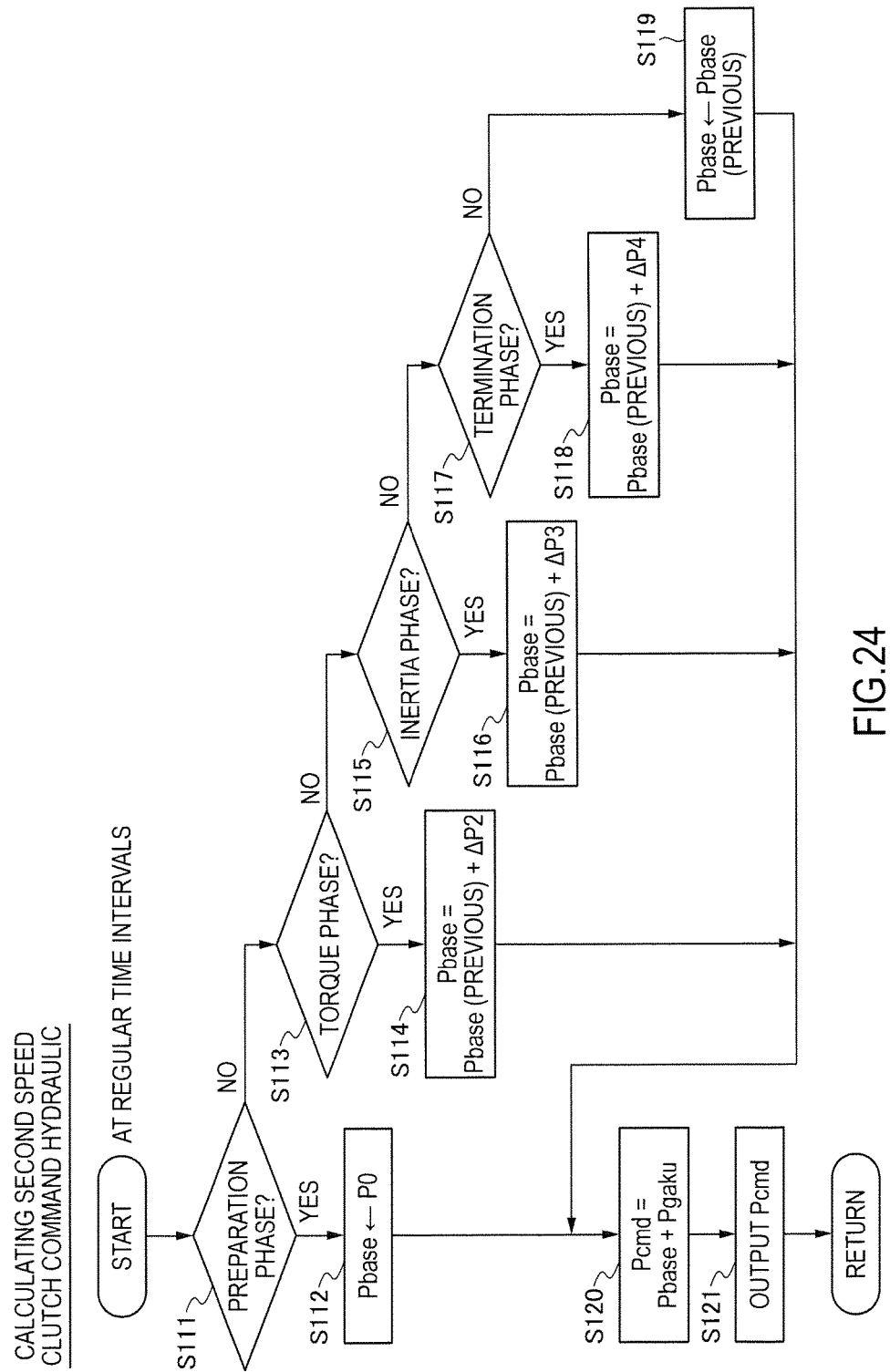
FIG. 24 is a flowchart indicating a calculation of a second speed clutch command hydraulic according to the sixth embodiment.

The flowchart in FIG. 24 is a flowchart to calculate the second speed clutch command hydraulic Pcmd of the sixth embodiment, and this flowchart is executed by the CVT controller 61 at regular time intervals (such as every 10 ms) subsequently to the flowchart in FIG. 23. Here, for easy description, assume that each period of the preparation phase, the torque phase, the inertia phase, and the termination phase is predetermined with the start timing in performing the first-to-second speed shifting as the criteria. A precharge illustrated in the lowermost line of FIG. 21 temporarily provides a large hydraulic at the beginning of the preparation phase compared with the latter period of the preparation phase for the purpose of such as improving the movement of the hydraulic control valve unit 51e. The operation of the precharge is omitted in the flowchart in FIG. 24.

In Steps S111, S113, S115, and S117, it is determined that which phase of the preparation phase, the torque phase, the inertia phase, and the termination phase the phase is. When the phase is the preparation phase, the CVT controller 61 advances the process from Step S111 to Step S112. Then, the CVT controller 61 puts an initial value P0 [kPa] to the basic hydraulic Pbase [kPa]. Insofar as the phase is the preparation phase, the operation of Step S112 is repeated. This maintains the basic hydraulic Pbase to the initial value P0 in the preparation phase.

When the preparation phase terminates and the torque phase starts, the CVT controller 61 advances the process from Step S113 to Step S114. In Step S114, the CVT controller 61 calculates a value where a certain value ΔP2

[kPa] is added to "a Pbase (previous)" [kPa], which is a previous basic hydraulic, as the current basic hydraulic Pbase [kPa]. The certain value ΔP2 is a value to determine the amount of the increase of the second speed clutch command hydraulic in the torque phase, and predetermined. Insofar as the phase is the torque phase, the operation of Step S114 is repeated. This gradually increases the basic hydraulic Pbase in the torque phase.

When the torque phase terminates and the inertia phase starts, the CVT controller 61 advances the process from Step S115 to Step S116. In Step S116, the CVT controller 61 calculates a value where a certain value ΔP3 [kPa] is added to "the Pbase (previous)" [kPa], which is the previous basic hydraulic, as the current basic hydraulic Pbase [kPa]. The certain value ΔP3 is a value to determine the amount of the increase of the second speed clutch command hydraulic in the inertia phase, and predetermined. As the certain value ΔP3, a value smaller than the above-described certain value ΔP2 is set. Insofar the phase is the inertia phase, the operation of Step S116 is repeated. This gradually increases the basic hydraulic Pbase in the inertia phase at a low speed compared with the torque phase.

When the inertia phase terminates and the termination phase starts, the CVT controller 61 advances the process from Step S117 to Step S118. In Step S118, the CVT controller 61 calculates a value where a certain value ΔP4 [kPa] is added to "the Pbase (previous)" [kPa], which is the previous basic hydraulic, as the current basic hydraulic Pbase [kPa]. The certain value ΔP4 is a value to determine the amount of the increase of the second speed clutch command hydraulic in the termination phase, and predetermined. As the certain value ΔP4, a value larger than the above-described certain value ΔP2 is set. Insofar as the phase is the termination phase, the operation of Step S118 is repeated. This increases the basic hydraulic Pbase in the termination phase at a high speed compared with the torque phase.

After the termination of the termination phase, the CVT controller 61 advances the process from Step S117 to Step S119. In Step S119, the CVT controller 61 transfers the value put in "the Pbase (previous)" [kPa], which is the previous basic hydraulic, to the current basic hydraulic Pbase [kPa] as it is. After the termination of the termination phase, the operation of Step S119 is repeated. This maintains the basic hydraulic Pbase at the termination of the termination phase after the termination of the termination phase.

In Step S120, the CVT controller 61 calculates the value where the basic hydraulic Pbase calculated in such way is added to the learning value Pgaku (already updated in the flowchart in FIG. 23) as the second speed clutch command hydraulic Pcmd [kPa], that is, uses the following formula to calculate the second speed clutch command hydraulic Pcmd.

$$Pcmd = Pbase + Pgaku \quad (20)$$

According to the formula (20), the basic hydraulic Pbase is increased by the amount of the learning value Pgaku. This increases the engaging force of the second speed clutch 56.

The second speed clutch command hydraulic Pcmd calculated in such way is output in Step S121. When the second speed clutch command hydraulic Pcmd is provided to each solenoid valve in the hydraulic control valve unit 51e, each solenoid valve supplies the hydraulic to the second speed clutch 56 in accordance with the second speed clutch command hydraulic Pcmd.

Next, a description will be given of Steps S87 and S88 not described in the flowchart in FIG. 22. During the first first-to-second speed shifting after updating the learning value Pgaku in the flowchart in FIG. 23, the flowchart in FIG. 22 is executed again. That is, in the state where the torque-up (increasing the torque-up command value Tup from zero) is restricted, the second speed clutch command hydraulic Pcmd is increased by the amount (ΔP1) of the update of the learning value Pgaku compared with before the update of the learning value Pgaku. If the phase becomes the torque phase in the state where the second speed clutch command hydraulic Pcmd is increased, the CVT controller 61 advances the process from Steps S81 to S83, to Step S84 in the flowchart in FIG. 22. Then, the CVT controller 61 compares the auxiliary transmission mechanism input rotational speed Nin with the predetermined value Nin0 again. If the input rotational speed Nin is equal to or less than the predetermined value Nin0, the engaging force of the second speed clutch 56 is increased by the amount (ΔP1) of the update of the learning value Pgaku to actually generate the second speed clutch capacity. This determines the excessive increase in the input rotational speed Nin not to have been occurred. Here, since the learning value is updated to the side increasing the command hydraulic to generate the second speed clutch capacity, the actual generation of the second speed clutch capacity indicates that it is not necessary to update the learning value more to the side increasing the command hydraulic (that is, the learning value has been converged). At this case, the CVT controller 61 advances the process to Step S87 to refer to the learning experienced flag (already set in the flowchart in FIG. 23). Here, since it is the learning experienced flag=1, the CVT controller 61 advances the process to Step S88. Then, after setting the learning converged flag=1, the CVT controller 61 sets the excessive-increase-in-engine-rotation-speed flag=0 in Step S89. Here, the learning converged flag=1 indicates that it is not necessary to update the learning value Pgaku more (that is, the learning value has been converged).

After the learning converged flag=1 is set in Step S88 in FIG. 22, the flowchart in FIG. 23 is executed. That is, in Step S101 in FIG. 23, the CVT controller 61 refers to the learning converged flag (already set in the flowchart in FIG. 22). At this case, since it is the learning converged flag=1, the CVT controller 61 cannot proceed the process to Step S102 and following Steps. This prevents the learning value Pgaku from being updated again after the convergence of the learning value Pgaku.

Figure 25:
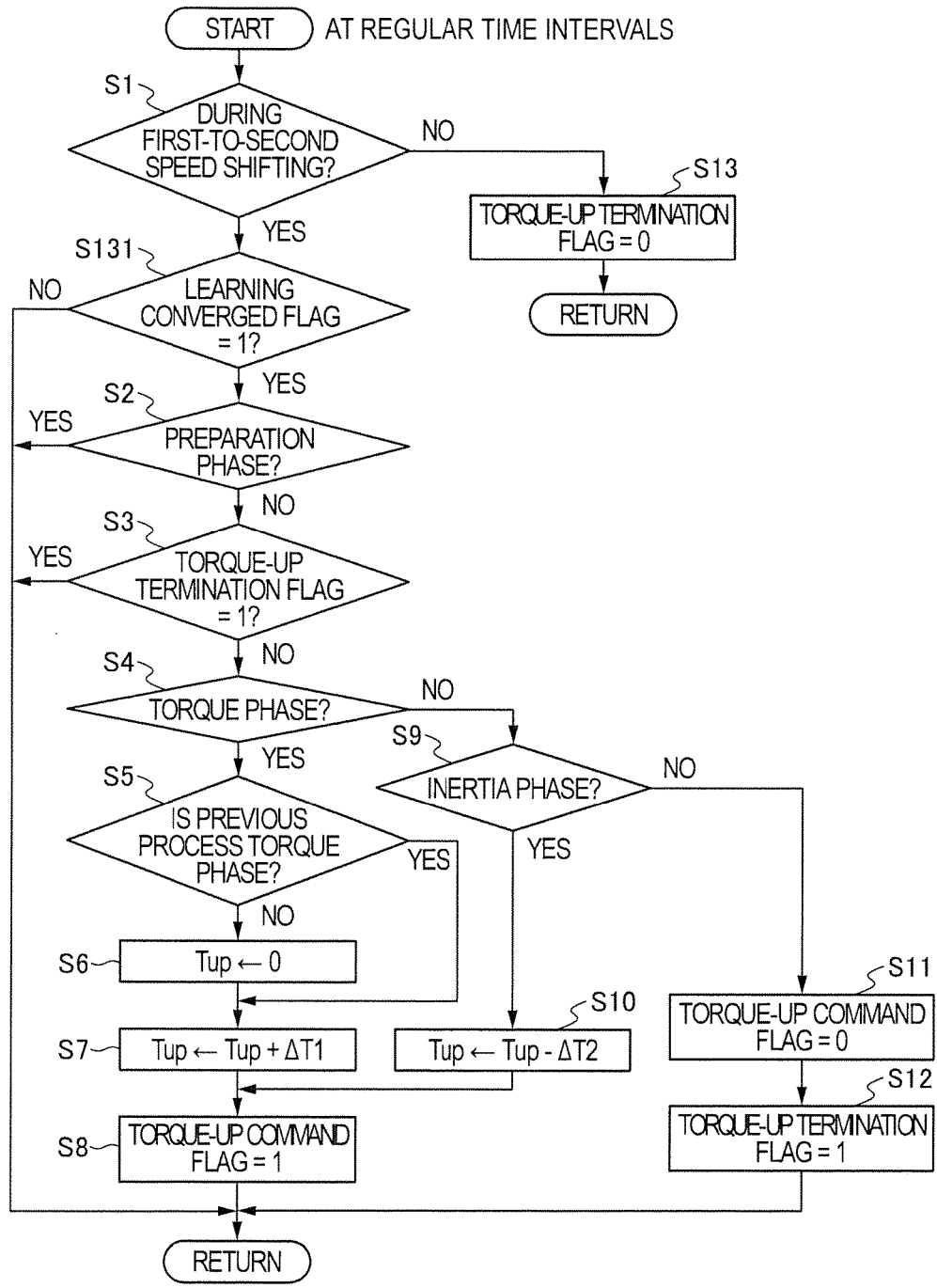
FIG. 25 is a flowchart indicating a setting of a torque-up command flag according to the sixth embodiment.

The flowchart in FIG. 25 is a flowchart to set the torque-up command flag of the sixth embodiment, and this flowchart is executed by the CVT controller 61 at regular time intervals (such as every 10 ms) subsequently to the flowcharts in FIG. 22 and FIG. 23. In FIG. 25, like reference numerals designate like elements as in the flowchart in FIG. 5 of the first embodiment.

A description will be given of mainly the parts different from the flowchart in FIG. 5. FIG. 25 is a flowchart where Step S131 is added to the flowchart in FIG. 5. That is, in the case of the first-to-second speed shifting flag=1 in Step S1, the CVT controller 61 determines that it is during the first-to-second speed shifting. Then, the CVT controller 61 advances the process to Step S131 to refer to the learning converged flag (already set in the flowchart in FIG. 22). When it is the learning converged flag=0, the CVT controller 61 determines that the learning value Pgaku has not been converged yet to terminate the current process. When the learning value Pgaku has not been converged, the CVT controller 61 cannot proceed the process to the setting of the torque-up command flag in Step S2 and following Steps (that is, the torque-up (increasing the torque-up command value Tup from zero) is restricted).

The reason to restrict the torque-up in the state where the learning value Pgaku has not been converged is as follows. That is, even in the state where the learning value Pgaku has not been converged, the flowchart in FIG. 25 is executed. Then, if it is during the first-to-second speed shifting in Step S1 in FIG. 25, and the process is proceeded to Step S2 and following Steps to set the torque-up command flag (that is, the torque-up is performed) during the first-to-second speed shifting, the excessive increase in the auxiliary transmission mechanism input rotational speed Nin possibly occurs again. Therefore, the CVT controller 61 is configured not to proceed the process to the setting of the torque-up command flag in Step S2 and following Steps in the case of the learning converged flag=0.

On the other hand, in the case of the learning converged flag=1 in Step S131, the CVT controller 61 advances the process to the setting of the torque-up command flag in Step S2 and following Steps. That is, the restriction of the torque-up is released to perform the torque-up. During the first first-to-second speed shifting after updating the learning value Pgaku, it is determined whether the excessive increase in the input rotational speed Nin has occurred in the state where the torque-up is restricted, and when the excessive increase in the input rotational speed Nin has not occurred, the learning value Pgaku is determined to have been converged. In other words, according to the second speed clutch command hydraulic when the learning value Pgaku has been converged, the more the second speed clutch capacity actually generates, the more sufficient the engaging force of the second speed clutch becomes to prevent the excessive increase in the input rotational speed Nin from occurring. Therefore, since the engaging force of the second speed clutch is sufficient even during the second first-to-second speed shifting after updating the learning value Pgaku, the excessive increase in the input rotational speed Nin does not occur if the torque-up is performed during the second first-to-second speed shifting after updating the learning value Pgaku.

In the sixth embodiment, the hydraulic control valve unit 51e (the hydraulic adjusting means) that adjusts the second speed clutch command hydraulic (the command hydraulic provided to the second engagement portion) and the learning first execution means are disposed. In the above-described learning first execution means, when the excessive increase in the auxiliary transmission mechanism input rotational speed Nin has occurred during the first-to-second speed shifting, the learning value Pgaku is updated to the side to increase the second speed clutch command hydraulic (the command hydraulic). When the second speed clutch commands hydraulic Pcmd that includes the learning value Pgaku after updating during the first-to-second speed shifting is provided to the hydraulic control valve unit 51e, the learning first execution means determines that the learning value Pgaku has been converged if the excessive increase ceases to occur. Then, when the learning value Pgaku is converged, the learning first execution means determines that the second speed clutch engagement capacity (the engagement capacity of the second engagement portion) is generated. This prevents the excessive increase in the auxiliary transmission mechanism input rotational speed Nin and the engagement shock after the excessive increase after the convergence of the learning value, even if the second speed clutch engagement capacity is not actually generated because of the environmental condition and the aged deterioration when the command hydraulic is provided to the second speed clutch 56.

In the sixth embodiment, the learning first execution means and the permission means are disposed. The learning second execution means causes to perform the following operations. Whether the excessive increase in the auxiliary transmission mechanism input rotational speed NM has occurred during the first-to-second speed shifting is determined. On the basis of the determination result, when the excessive increase in the auxiliary transmission mechanism input rotational speed NM has occurred, the learning value Pgaku is updated to the side to increase the second speed clutch command hydraulic. During the first first-to-second speed shifting after updating the learning value Pgaku, the state where the CVT controller 61 (the command means) is restricted to command the engine controller 21 (the engine control means) is made. In this restricted state, the second speed clutch command hydraulic that includes the learning value Pgaku is provided to the hydraulic control valve unit 51e (the hydraulic adjusting means). Similarly, during the first first-to-second speed shifting after updating the learning value Pgaku, in the state where the increase of the engine torque is restricted, whether the excessive increase in the auxiliary transmission mechanism input rotational speed Nin occurs is determined. When the excessive increase in the input rotational speed NM is determined not to occur in this determination, the learning value Pgaku is determined to have been converged. During the first-to-second speed shifting after the convergence of the learning value Pgaku, the above-described permission means releases the restriction of the command to the engine controller 21 by the CVT controller 61 to permit to increase the engine torque from the basic engine torque Te0. This prevents the excessive increase in the auxiliary transmission mechanism input rotational speed NM and the clutch engagement shock after the excessive increase after the first convergence of the learning value even if the second speed clutch engagement capacity is not actually generated because of the environmental condition and the aged deterioration.

(Seventh Embodiment)

Figure 26A:
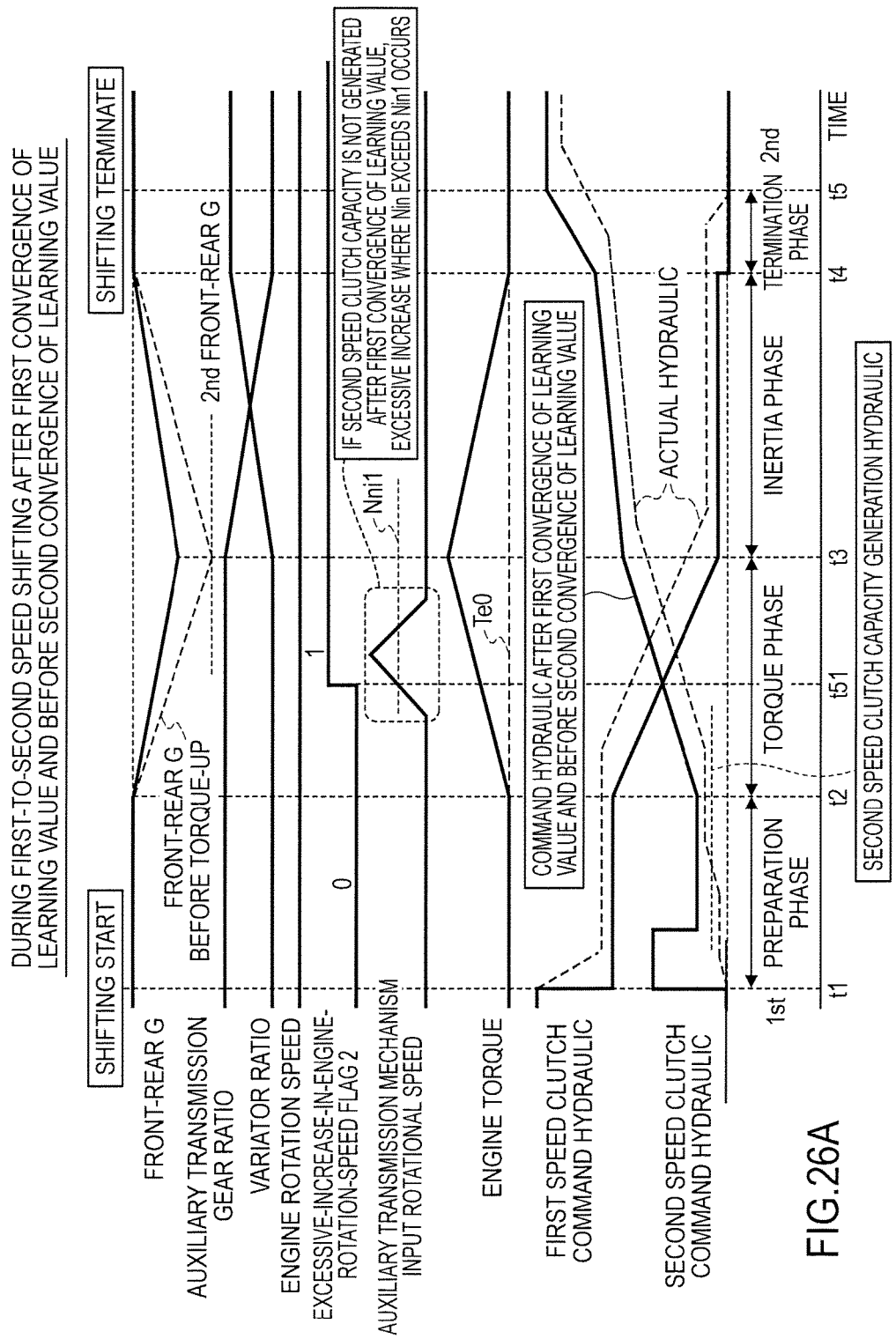
FIG. 26A is a timing chart illustrating a change during a first-to-second speed shifting after a first convergence of a learning value and before a second convergence of the learning value according to a seventh embodiment.
Figure 26B:
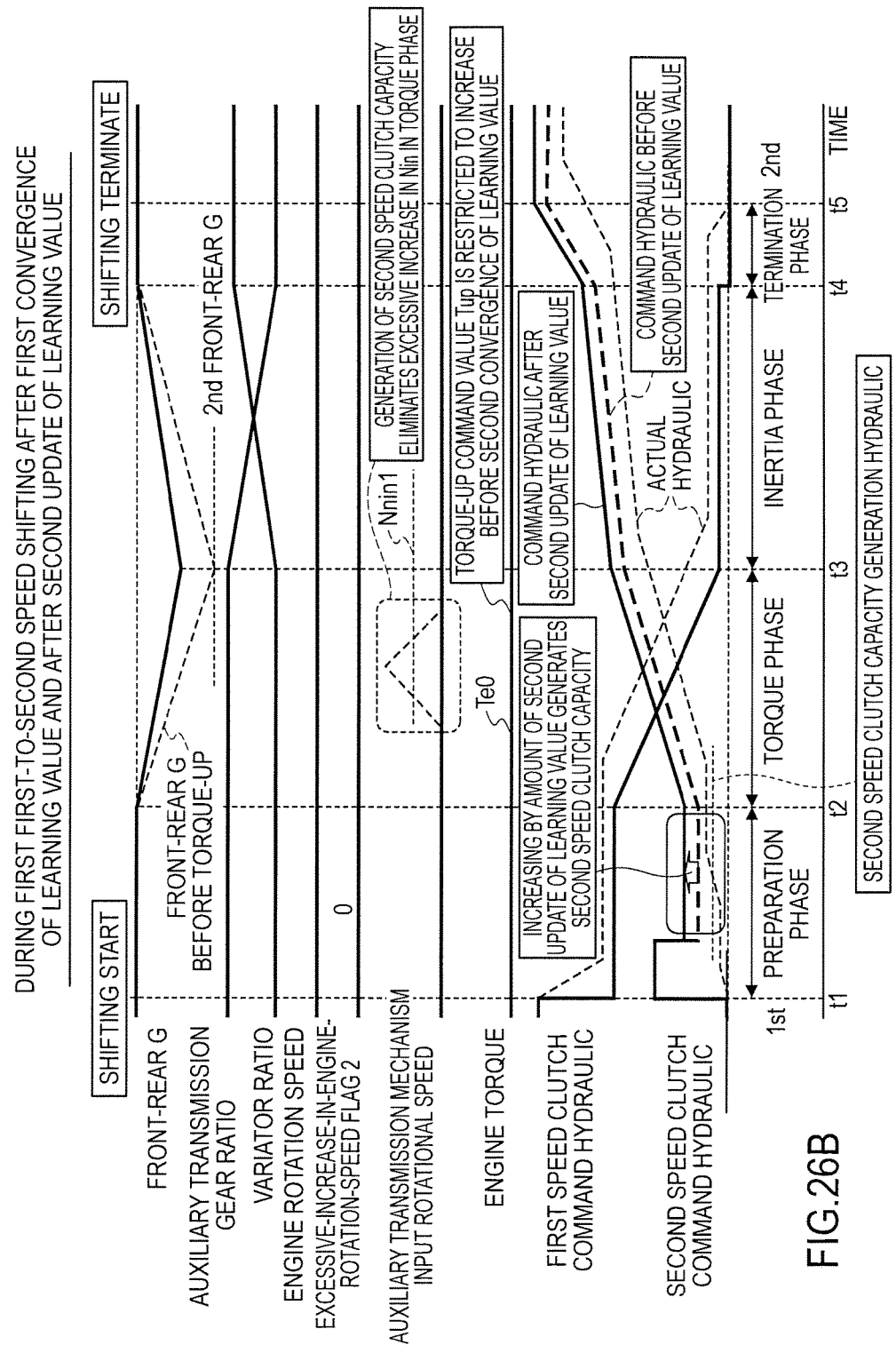
FIG. 26B is a timing chart illustrating a change during the first-to-second speed shifting for the first time after the first convergence of the learning value and after a second update of the learning value according to the seventh embodiment.
Figure 26C:
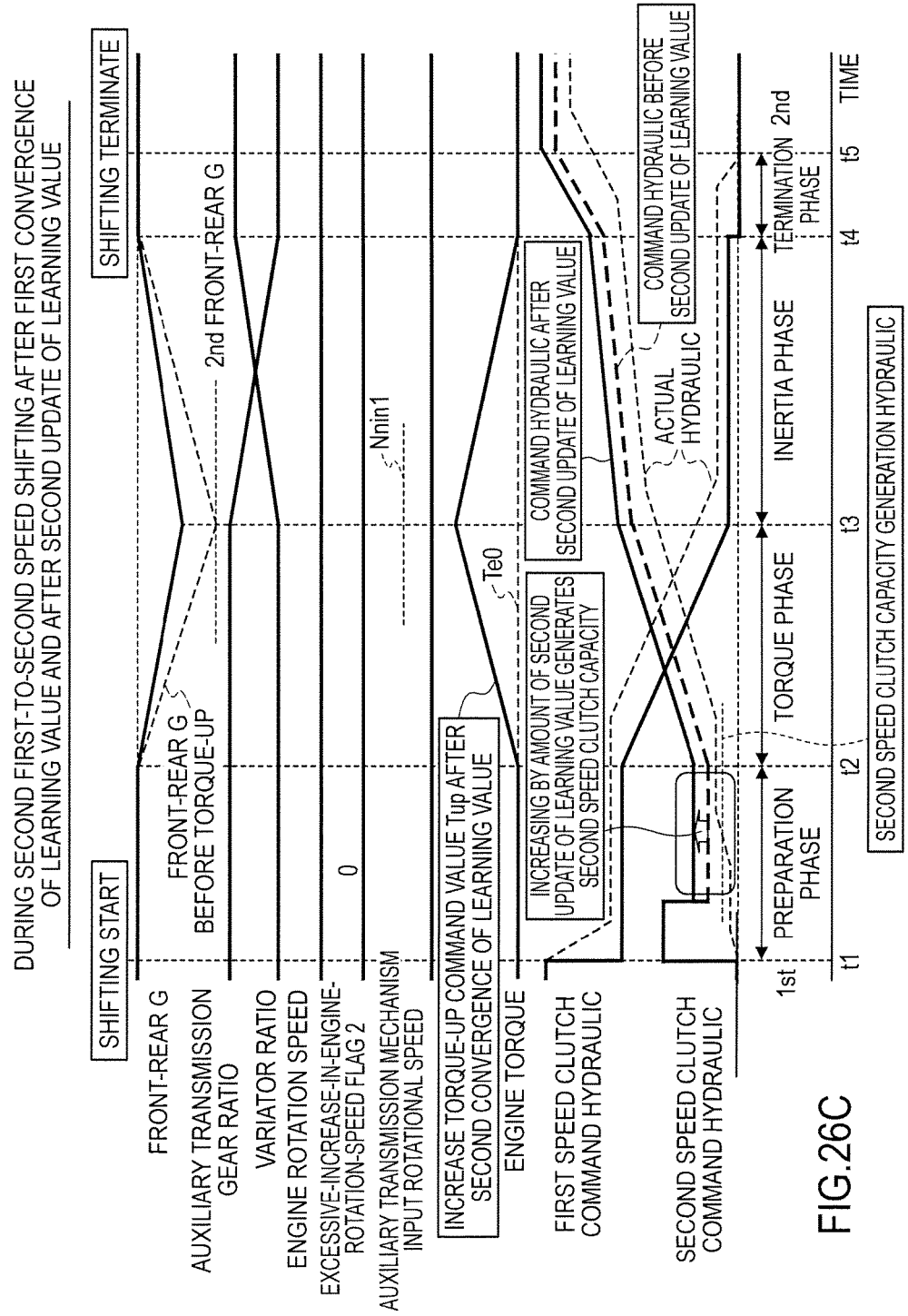
FIG. 26C is a timing chart illustrating a change during the first-to-second speed shifting for the second time after the first convergence of the learning value and after the second update of the learning value according to the seventh embodiment.

FIG. 26A, FIG. 26B, and FIG. 26C are timing charts illustrating the change during the first-to-second speed shifting of the seventh embodiment. Among them, FIG. 26A indicates the change during the first-to-second speed shifting after the first convergence of the learning value and before the second convergence of the learning value. FIG. 26B indicates the change during the first first-to-second speed shifting after the first convergence of the learning value and after the second update of the learning value. FIG. 26C indicates the change during the second first-to-second speed shifting after the first convergence of the learning value and after the second update of the learning value. To ease the explanation, the seventh embodiment describes the case where the learning value is converged by the first update of the learning value and the learning value is converged again by the second update of the learning value after the first convergence of the learning value. However, it is needless to say that the embodiment is not limited to the case where the learning value is converged by the first update of the learning value and the learning value is converged again by the second update of the learning value after the first convergence of the learning value. Here, "the second update of the learning value" means the update of the learning value for the second time when the first update of the learning value is considered as the update for the first time. In FIG. 26A, FIG. 26B, and FIG. 26C, like reference numerals designate like elements as in FIG. 4 of the first embodiment.

In the sixth embodiment, the excessive increase in the auxiliary transmission mechanism input rotational speed Nin no more occurs during the first-to-second speed shifting after the convergence of the learning value (=after the first convergence of the learning value). However, as illustrated in the sixth line of FIG. 26A, when the torque-up (increasing the torque-up command value Tup from zero) is performed during the first-to-second speed shifting after the first convergence of the learning value, the excessive increase in the auxiliary transmission mechanism input rotational speed Nin possibly occurs. In FIG. 26A, only the excessive increase in the auxiliary transmission mechanism input rotational speed Nin that occurs in the torque phase is illustrated. If the second speed clutch capacity is actually generated (the second speed clutch starts to be engaged) after the excessive increase, a shock in accordance with the engagement of the second speed clutch 56 is possibly generated.

Here, the cause that the excessive increase where the input rotational speed NM exceeds the predetermined value Nin0 occurs again during the first-to-second speed shifting after the first convergence of the learning value is similar to the description of the sixth embodiment. That is, even if the engaging force of the second speed clutch 56 has been decreased to less than the specified value because of the aged deterioration, since the engaging force of the second speed clutch 56 is returned to the specified value after the first convergence of the learning value Pgaku, the second speed clutch capacity is actually generated (the second speed clutch 56 starts to be engaged). Thus, the decrease of the engaging force of the second speed clutch 56 caused by the aged deterioration is supposed to be solved after the first convergence of the learning value Pgaku. However, in accordance with the change of the environmental condition generated after the first convergence of the learning value, the engaging force of the second speed clutch 56 is possibly decreased to prevent the second speed clutch capacity from being actually generated. The sixth embodiment cannot correspond to such decrease of the engaging force of the second speed clutch 56 generated after the first convergence of the learning value. For example, if the temperature of the hydraulic oil rises to higher than the specified value after the first convergence of the learning value Pgaku, the engaging force of the second speed clutch 56 decreases by the amount of the decrease of the viscosity of the hydraulic oil compared with the case where the hydraulic oil has the temperature of the specified value. This actually prevents the second speed clutch capacity from being generated. Alternatively, the friction coefficient of the friction material used for the above-described friction plate is possibly decreased to less than the specified value immediately after the first convergence of the learning value Pgaku because of the significant aged deterioration. When the engaging force of the second speed clutch 56 is decreased by the amount, the second speed clutch capacity ceases to be actually generated. The engaging force of the second speed clutch 56 is significantly influenced by the environmental condition and the aged deterioration caused by the variation factors of the second speed clutch 56 even after the first convergence of the learning value Pgaku. Then, it is possibly occurs that the second speed clutch capacity is actually not generated. Therefore, the case where the engaging force of the second speed clutch 56 is not sufficient even after the first convergence of the learning value Pgaku possibly occurs. If the torque-up (increasing the torque-up command value Tup from zero) is performed when such case is occurring, the excessive increase where the auxiliary transmission mechanism input rotational speed Nin exceeds a predetermined value Nin1 occurs at the beginning of the torque phase and the inertia phase.

Thus, if the excessive increase in the auxiliary transmission mechanism input rotational speed Nin occurs during the first-to-second speed shifting after the first convergence of the learning value, it is necessary to prevent the input rotational speed Nin from excessively increasing. In this case, to prevent the input rotational speed Nin from excessively increasing, similarly to the sixth embodiment, the engaging force of the second speed clutch 56 is configured to increase to actually generate the second speed clutch capacity. Since the engaging force of the second speed clutch 56 is proportionate to the hydraulic supplied to the second speed clutch 56, the second speed clutch command hydraulic is increased to increase the engaging force of the second speed clutch 56.

Therefore, in the seventh embodiment, the following operations are performed during the first-to-second speed shifting after the first convergence of the learning value (after the learning value is converged). That is, when the excessive increase in the auxiliary transmission mechanism input rotational speed Nin occurs in the case where the CVT controller 61 (the command means) commanded to increase, the CVT controller 61 is restricted to command the engine controller 21 during the next first-to-second speed shifting. For example, as illustrated in FIG. 26A, assume that the excessive increase in the input rotational speed Nin occurs at the timing of a t51 (become Nin>Nin1) during the first-to-second speed shifting after the first convergence of the learning value. In this case, as illustrated in FIG. 26B, the torque-up (increasing the torque-up command value Tup from zero) is restricted to be performed during the first-to-second speed shifting next of the first-to-second speed shifting where the excessive increase occurred.

In the seventh embodiment, the functions of the learning second execution means and the permission means are additionally disposed on the CVT controller 61. The learning second execution means performs the following operations of [21] to [23].

[21] During the first-to-second speed shifting next of the first-to-second speed shifting where the excessive increase in the input rotational speed Nin occurred, the learning second execution means makes a state where the CVT controller 61 (the command means) is restricted to command the engine controller 21 (the engine control means).

[22] In this restricted state, when the excessive increase in the auxiliary transmission mechanism input rotational speed Nin occurs again, the learning second execution means updates the learning value of the second speed clutch command hydraulic to the side to increase the second speed clutch command hydraulic. For example, the learning second execution means updates the learning value Pgaku again to the side to increase by a certain value ΔP5 immediately after the termination of the first-to-second speed shifting next of the first-to-second speed shifting where the excessive increase occurred. Since the update performed again is the second time counting from the first update of the learning value, it is the second update.

[23] When the second speed clutch command hydraulic that includes the learning value after updating is provided to the hydraulic control valve unit 51e during the first-to-second speed shifting next of the first-to-second speed shifting where the excessive increase in the input rotational speed Nin occurred, if the excessive increase ceases to occur, the learning second execution means determines that the learning value has been converged. For example, as illustrated in FIG. 26B, the learning second execution means uses the second speed clutch command hydraulic Pcmd that includes the learning value Pgaku increased by the certain value ΔP5 to engage the second speed clutch 56 during the first first-to-second speed shifting after the second update of the learning value Pgaku after the first convergence of the learning value.

Next, during the first first-to-second speed shifting after the second update of the learning value Pgaku after the first convergence of the learning value, the learning second execution means determines whether the excessive increase in the input rotational speed Nin occurs (whether it becomes Nin>Nin1) in the state where the torque-up (increasing the torque-up command value Tup from zero) is restricted. This is performed to determine the result of the learning. At this case, as illustrated in the sixth line of FIG. 26B, during the first first-to-second speed shifting after the second update of the learning value Pgaku after the first convergence of the learning value, the auxiliary transmission mechanism input rotational speed Nin holds the certain value at the beginning of the torque phase and the inertia phase. That is, the excessive increase in the input rotational speed Nin has not occurred (it has not been Nin>Nin0). Increasing the engaging force of the second speed clutch 56 by the amount (ΔP5) of the second update of the learning value Pgaku actually generates the second speed clutch capacity (the second speed clutch starts to be engaged). This restricts the excessive increase in the auxiliary transmission mechanism input rotational speed Nin. As the result, the learning value is determined to be converged during the first first-to-second speed shifting after the second update of the learning value Pgaku after the first convergence of the learning value.

The above-described permission means performs the following operations.

[31] During the first-to-second speed shifting after the learning second execution means converged the learning value, the permission means releases the restriction of the command by the CVT controller 61 to the engine controller 21, and permits to increase the engine torque from the basic engine torque Te0. For example, as illustrated in FIG. 26C, during the second (after the second convergence of the learning value) first-to-second speed shifting after the first convergence of the learning value and after the second update of the learning value Pgaku, the permission means permits (causes to perform) the torque-up (increasing the torque-up command value Tup from zero).

Figure 27A:
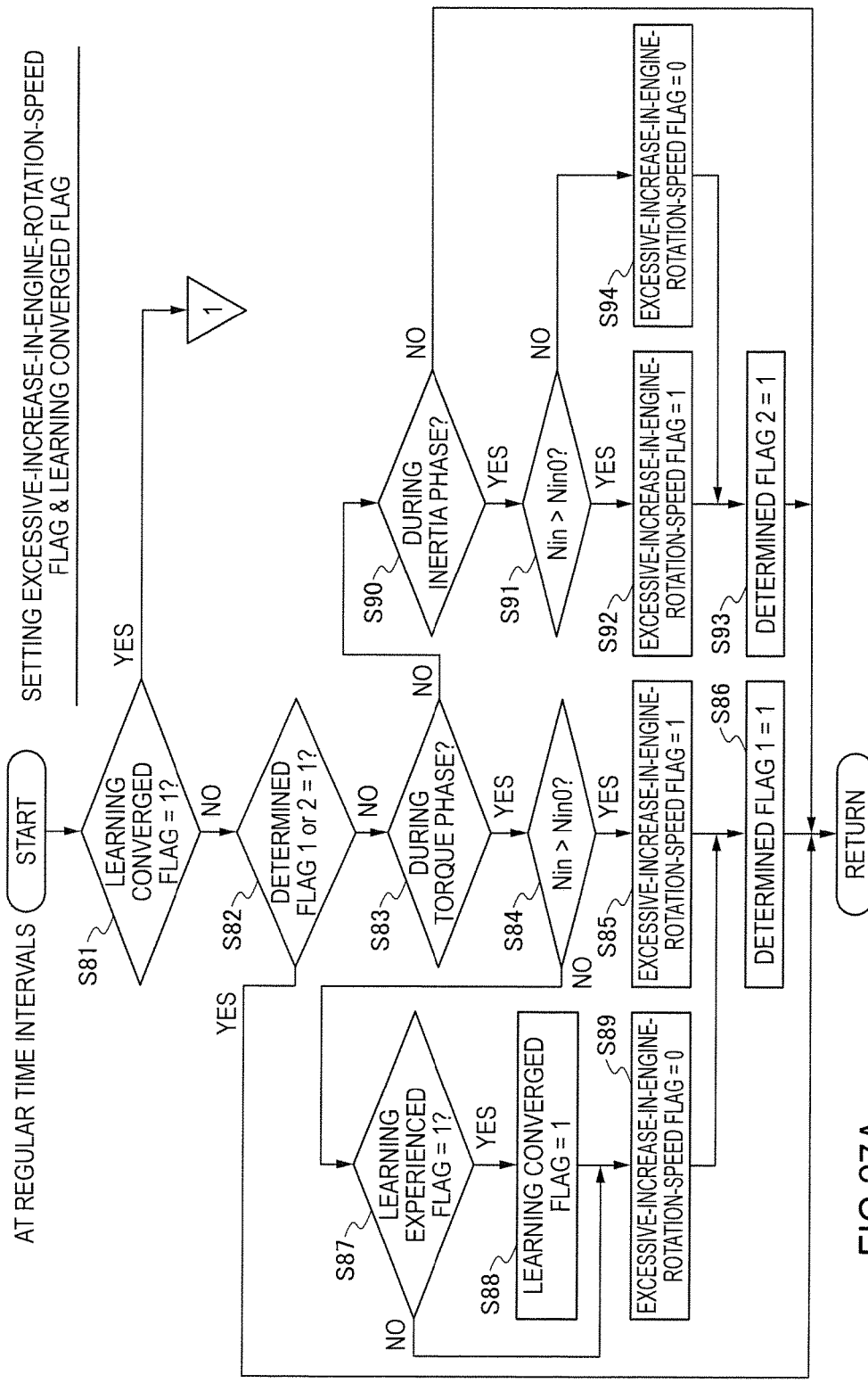
FIG. 27A is a flowchart indicating a setting of two excessive-increase-in-engine-rotation-speed flags and two learning converged flags according to the seventh embodiment.
Figure 27B:
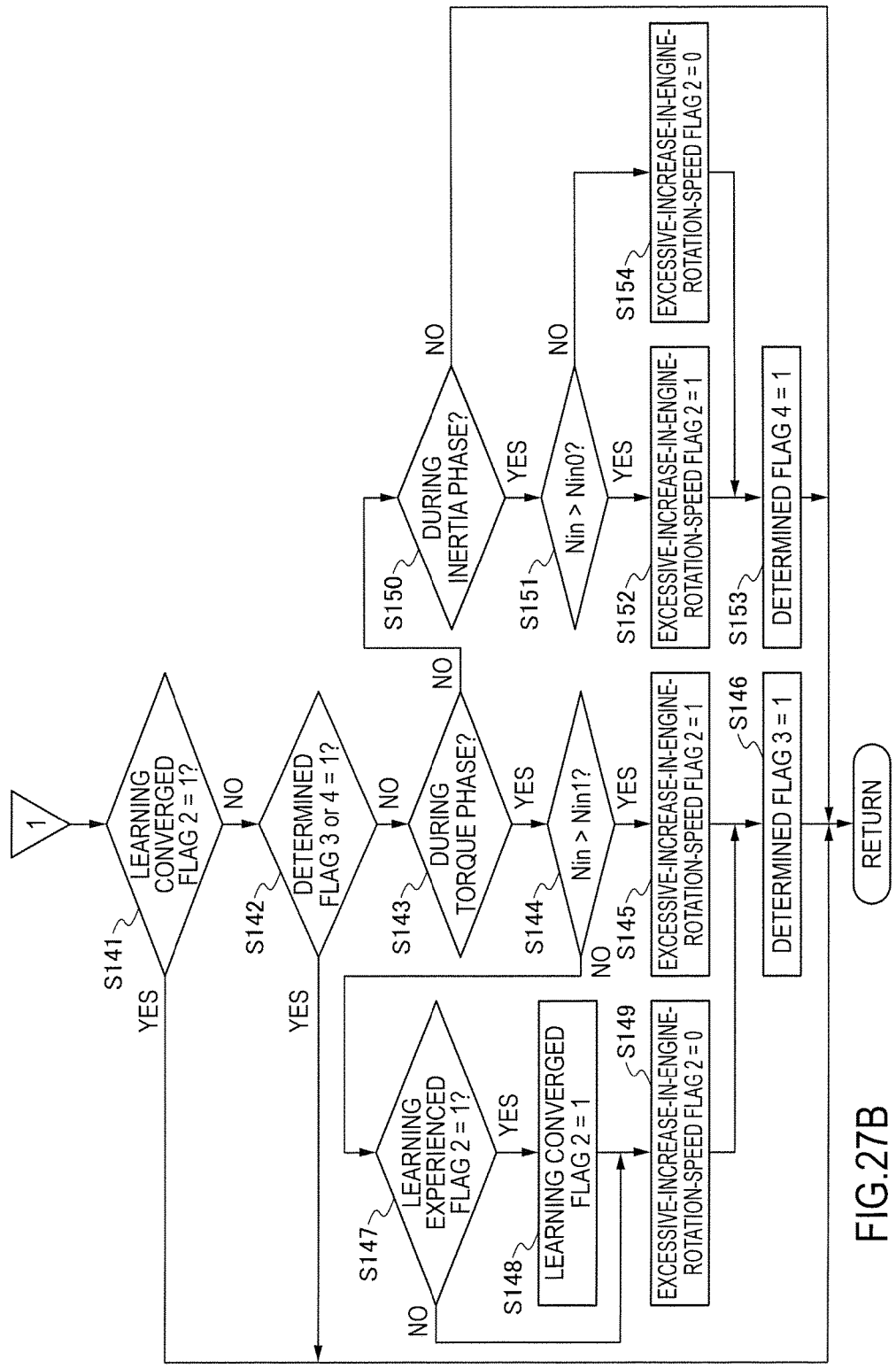
FIG. 27B is a flowchart indicating a setting of two excessive-increase-in-engine-rotation-speed flags and two learning converged flags according to the seventh embodiment.

The flowchart in FIG. 27A and FIG. 27B is a flowchart to set two excessive-increase-in-engine-rotation-speed flags and two learning converged flags of the seventh embodiment. These flowcharts are executed by the CVT controller 61 at regular time intervals (such as every 10 ms). In FIG. 27A and FIG. 27B, like reference numerals designate like elements as in the flowchart in FIG. 22 of the sixth embodiment. Here, while, in the sixth embodiment, the excessive-increase-in-engine-rotation-speed flag and the learning converged flag are introduced for the first updating of the learning value, in the seventh embodiment, the excessive-increase-in-engine-rotation-speed flag and the learning converged flag are introduced also for the second updating of the learning value. To distinguish the two, the excessive-increase-in-engine-rotation-speed flag required for the second update of the learning value is referred to as "an excessive-increase-in-engine-rotation-speed flag 2." The learning converged flag required for the second update of the learning value is referred to as "a learning converged flag 2."

A description will be given of mainly the parts different from the flowchart in FIG. 22. In Step S81 in FIG. 27A, the CVT controller 61 refers to the learning converged flag. In the case of the learning converged flag=1 (after the first convergence of the learning value), the CVT controller 61 advances the process to the process in FIG. 27B.

In Step S141 in FIG. 27B, the CVT controller 61 refers to the learning converged flag 2. Here, assuming to the learning converged flag 2=0, the CVT controller 61 advances the process to Step S142. In Step S142, the CVT controller 61 refers to a determined flag 3 or a determined flag 4. Here, assuming to the determined flag 3=0 and the determined flag 4=0, the CVT controller 61 advances the process to Step S143.

In Step S143 in FIG. 27B, the CVT controller 61 determines whether the phase is the torque phase. When the phase is the torque phase, the CVT controller 61 advances the process to Step S144. Then, the CVT controller 61 compares the auxiliary transmission mechanism input rotational speed Nin [rpm], which is detected by the input rotational speed sensor 59 (see FIG. 2), with the predetermined value Nin1 [rpm]. Here, the predetermined value Nin1 is a value to determine whether the excessive increase in the auxiliary transmission mechanism input rotational speed Nin has occurred, and predetermined. The predetermined value Nin1 may be identical to the predetermined value Nin0 used for the first learning (see Steps S84 and S91 in FIG. 27A), or may be different from the predetermined value Nin0. When the auxiliary transmission mechanism input rotational speed Nin is equal to or less than the predetermined value Nin1, the CVT controller 61 determines that the excessive increase in the input rotational speed Nin has not occurred, and advances the process to Step S149 to set the excessive-increase-in-engine-rotation-speed flag 2=0. Steps S147 and S148, of which explanations are skipped, will be described later.

When the auxiliary transmission mechanism input rotational speed Nin exceeds the predetermined value Nin1 in Step S144 in FIG. 27B, the CVT controller 61 determines that the excessive increase in the input rotational speed Nin has occurred in the torque phase. Then, the CVT controller 61 advances the process to Steps S145 and S146. In Step S145 in FIG. 27B, the CVT controller 61 sets the excessive-increase-in-engine-rotation-speed flag 2=1. In Step S146, the CVT controller 61 sets the determined flag 3=1. Here, the excessive-increase-in-engine-rotation-speed flag 2=1 indicates the occurrence of the excessive increase in the input rotational speed Nin in the torque phase. The determined flag 3=1 indicates that the excessive increase in the input rotational speed Nin in the torque phase has been already determined.

In Step S143 in FIG. 27B, when the phase is not the torque phase, the CVT controller 61 advances the process to Step S150 to determine whether the phase is the inertia phase. When the phase is not the inertia phase, the CVT controller 61 terminates the current process.

In Step S150 in FIG. 27B, when the phase is the inertia phase, the CVT controller 61 advances the process to Step S151. The operation of Step S151 is similar to the operation of Step S144. That is, the CVT controller 61 compares the auxiliary transmission mechanism input rotational speed Nin [rpm], which is detected by the input rotational speed sensor 59, with the predetermined value Nin1 [rpm]. The predetermined value Nin1 is a value to determine whether the excessive increase in the auxiliary transmission mechanism input rotational speed NM has occurred, and predetermined. When the auxiliary transmission mechanism input rotational speed Nin is equal to or less than the predetermined value Nin1, the CVT controller 61 determines that the excessive increase in the input rotational speed NM has not occurred. Then, the CVT controller 61 advances the process to Step S154 to set the excessive-increase-in-engine-rotation-speed flag 2=0.

When the auxiliary transmission mechanism input rotational speed Nin exceeds the predetermined value Nin1 in Step S151 in FIG. 27B, the CVT controller 61 determines that the excessive increase in the input rotational speed Nin occurred at the beginning of the inertia phase. Then, the CVT controller 61 advances the process to Steps S152 and S153. The operations of Steps S152 and S153 in FIG. 27B are similar to the operations of Steps S145 and S146 in FIG. 27B. That is, in Step S152, the CVT controller 61 sets the excessive-increase-in-engine-rotation-speed flag 2=1. In Step S153, the CVT controller 61 sets the determined flag 4=1. Here, the excessive-increase-in-engine-rotation-speed flag 2=1 indicates the occurrence of the excessive increase in the input rotational speed NM at the beginning of the inertia phase. The determined flag 4=1 indicates that the excessive increase in the input rotational speed NM in the inertia phase has been already determined.

Because of the determined flag 3=1 of Step S146, or the determined flag 4=1 of Step S153 in FIG. 27B, the CVT controller 61 cannot proceed the process from Step S142 to Step S143 and following Steps in FIG. 27B in the subsequent process. In other words, when the auxiliary transmission mechanism input rotational speed NM exceeds the predetermined value Nin1 in the torque phase, the determined flag 3=1 is set. This prevents to perform the determination whether the auxiliary transmission mechanism input rotational speed Nin rises to equal to or more than the predetermined value Nin1 in the inertia phase subsequent to the torque phase. On the other hand, if the auxiliary transmission mechanism input rotational speed NM does not exceed the predetermined value Nin1 in the torque phase, whether the auxiliary transmission mechanism input rotational speed Nin exceeds the predetermined value Nin1 in the inertia phase subsequent to the torque phase is determined. This sets the determined flag 4=1 when the auxiliary transmission mechanism input rotational speed NM exceeds the predetermined value Nin1. Then, the determination whether the excessive increase in the input rotational speed NM occurs is not performed in following Steps.

Figure 28:
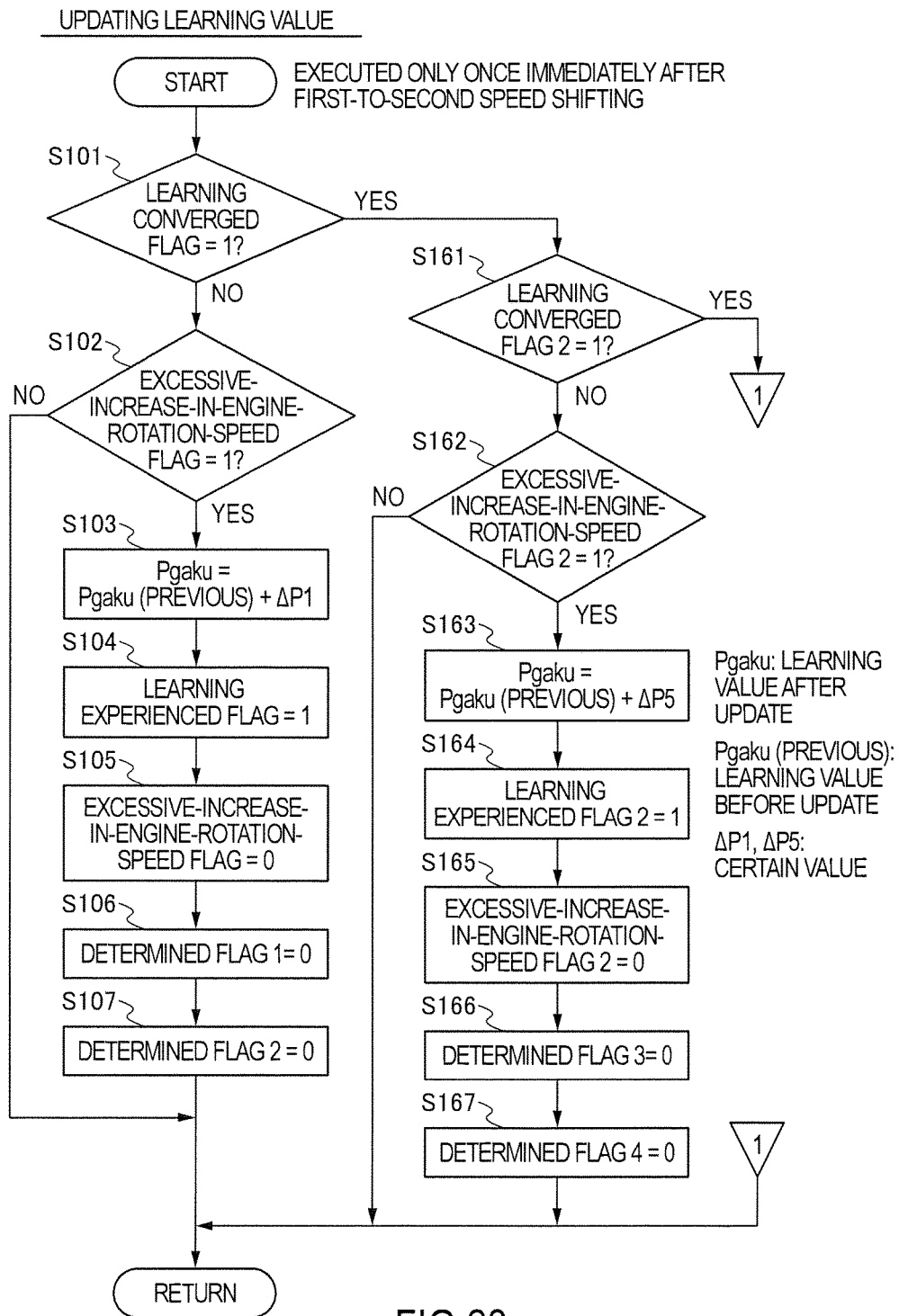
FIG. 28 is a flowchart indicating twice updates of the learning value according to the seventh embodiment.

The flowchart in FIG. 28 is a flowchart to update the learning value of the seventh embodiment. This flowchart is executed only once immediately after the first-to-second speed shifting (after the termination timing of the termination phase) by the CVT controller 61 subsequently to the flowcharts in FIG. 27A and FIG. 27B. As described above, in the seventh embodiment, the learning value is updated twice of the first time and the second time, different from the sixth embodiment. That is, in the sixth embodiment, the learning value is updated once, and the learning value is converged by the first update. On the other hand, in the seventh embodiment, the learning value is updated again after the first convergence of the learning value, and the learning value is converged again by the second update. The timing of the twice updates of the learning value of the first time and the second time is not limited to immediately after the first-to-second speed shifting, and any timing is applicable insofar as the timing immediately before the next first-to-second speed shifting (before the start timing of the preparation phase). That is, it is only necessary to complete each update of the learning value of the first time and the second time immediately before the next first-to-second speed shifting. In FIG. 28, like reference numerals designate like elements as in the flowchart in FIG. 23 of the sixth embodiment.

A description will be given of mainly the parts different from the flowchart in FIG. 23 of the sixth embodiment. At the timing of the termination of the first-to-second speed shifting, the CVT controller 61 advances the process to Step S101 to refer to the learning converged flag. Here, assuming to the learning converged flag=1 (after the first convergence of the learning value), the CVT controller 61 advances the process to Step S161. In Step S161, the CVT controller 61 refers to the learning converged flag 2. Here, assuming to the learning converged flag 2=0, the CVT controller 61 advances the process to the second update of the learning value in Step S162 and following Steps.

In Step S162, the CVT controller 61 refers to the excessive-increase-in-engine-rotation-speed flag 2 (already set in the flowcharts in FIG. 27A and FIG. 27B). In the case of the excessive-increase-in-engine-rotation-speed flag 2=0, the CVT controller 61 determines that the excessive increase in the auxiliary transmission mechanism input rotational speed NM has not occurred during the first-to-second speed shifting after the first convergence of the learning value. That is, the CVT controller 61 determines that it is not necessary to perform the second update of the learning value, and terminates the current process.

In the case of the excessive-increase-in-engine-rotation-speed flag 2=1 in Step S162, the CVT controller 61 determines that the excessive increase in the auxiliary transmission mechanism input rotational speed NM has occurred during the first-to-second speed shifting after the first convergence of the learning value. That is, the CVT controller 61 determines that it is necessary to perform the second update of the learning value to the side to increase the second speed clutch command hydraulic. In this case, the CVT controller 61 advances the process to Step S163 and following Steps. In Step S163, the CVT controller 61 updates the learning value Pgaku while setting a value where the certain value $\Delta P5$ [kPa] is added to "the Pgaku (previous)" [kPa], which is the previous learning value, as the current learning value Pgaku [kPa]. That is, the CVT controller 61 uses the following formula to update the learning value Pgaku.

$$Pgaku = Pgaku(\text{previous}) + \Delta P5 \quad (21)$$

As the certain value $\Delta P5$ of the formula (21), a positive value is predetermined. The certain value $\Delta P5$ may be identical to the certain value $\Delta P1$ used for the first (for the first time) update of the learning value (see Step S103 in FIG. 28), or may be different from the certain value $\Delta P1$.

This terminates the second update of the learning value Pgaku. Then, in Step S164, the CVT controller 61 sets the learning experienced (the learning value updated) flag 2=1. Here, the learning experienced flag 2=1 indicates that the second update of the learning value has experienced. To determine whether the excessive increase in the input rotational speed Nin has occurred during the first-to-second speed shifting after the second update of the learning value, the CVT controller 61 sets the excessive-increase-in-engine-rotation-speed flag 2=0, the determined flag 3=0, and the determined flag 4=0 in Steps S165, S166, and S167 respectively.

Next, a description will be given of Steps S147 and S148 not described in the flowchart in FIG. 27B. In the flowchart in FIG. 28, during the first first-to-second speed shifting after the second update of the learning value Pgaku, the flowchart in FIG. 27B is executed again. That is, in the state where torque-up (increasing the torque-up command value Tup from zero) is restricted, the second speed clutch command hydraulic Pcmd is increased by the amount (ΔP5) of the second update of the learning value Pgaku compared with before the second update of the learning value Pgaku. If the phase becomes the torque phase in the state where the second speed clutch command hydraulic Pcmd is increased, the CVT controller 61 advances the process from Steps S141 to S143, to Step S144 in the flowchart in FIG. 27B. Then, the CVT controller 61 compares the input rotational speed Nin with the predetermined value Nin1 again. If the input rotational speed Nin is equal to or less than the predetermined value Nin1, the engaging force of the second speed clutch 56 is increased by the amount (ΔP5) of the update of the learning value Pgaku to actually generate the second speed clutch capacity. This determines the excessive increase in the input rotational speed Nin not to have been occurred. Here, since the learning value is updated again to the side increasing the command hydraulic to generate the second speed clutch capacity, the actual generation of the second speed clutch capacity can eliminate the more update of the learning value to the side increasing the command hydraulic. That is, the second update of the learning value indicates that the learning value has been converged again. In this case, the CVT controller 61 advances the process to Step S147 to refer to the learning experienced flag 2 (already set in the flowchart in FIG. 28). Here, since the learning experienced flag 2=1 is set, the CVT controller 61 advances the process to Step S148. Then, after setting the learning converged flag 2=1, the CVT controller 61 sets the excessive-increase-in-engine-rotation-speed flag 2=0 in Step S149. Here, the learning converged flag 2=1 indicates that it is not necessary to update the learning value Pgaku more after the second update of the learning value Pgaku (that is, the learning value is converged also at the second time).

After the learning converged flag 2=1 is set in Step S148 in FIG. 27B, the flowchart in FIG. 28 is executed. That is, in Step S161 in FIG. 28, the CVT controller 61 refers to the learning converged flag 2 (already set in the flowchart in FIG. 27B). In this case, since the learning converged flag 2=1 is set, the CVT controller 61 cannot proceed the process to Step S162 and following Steps. This prevents the learning value Pgaku from updated again after the second convergence of the learning value Pgaku.

Figure 29:
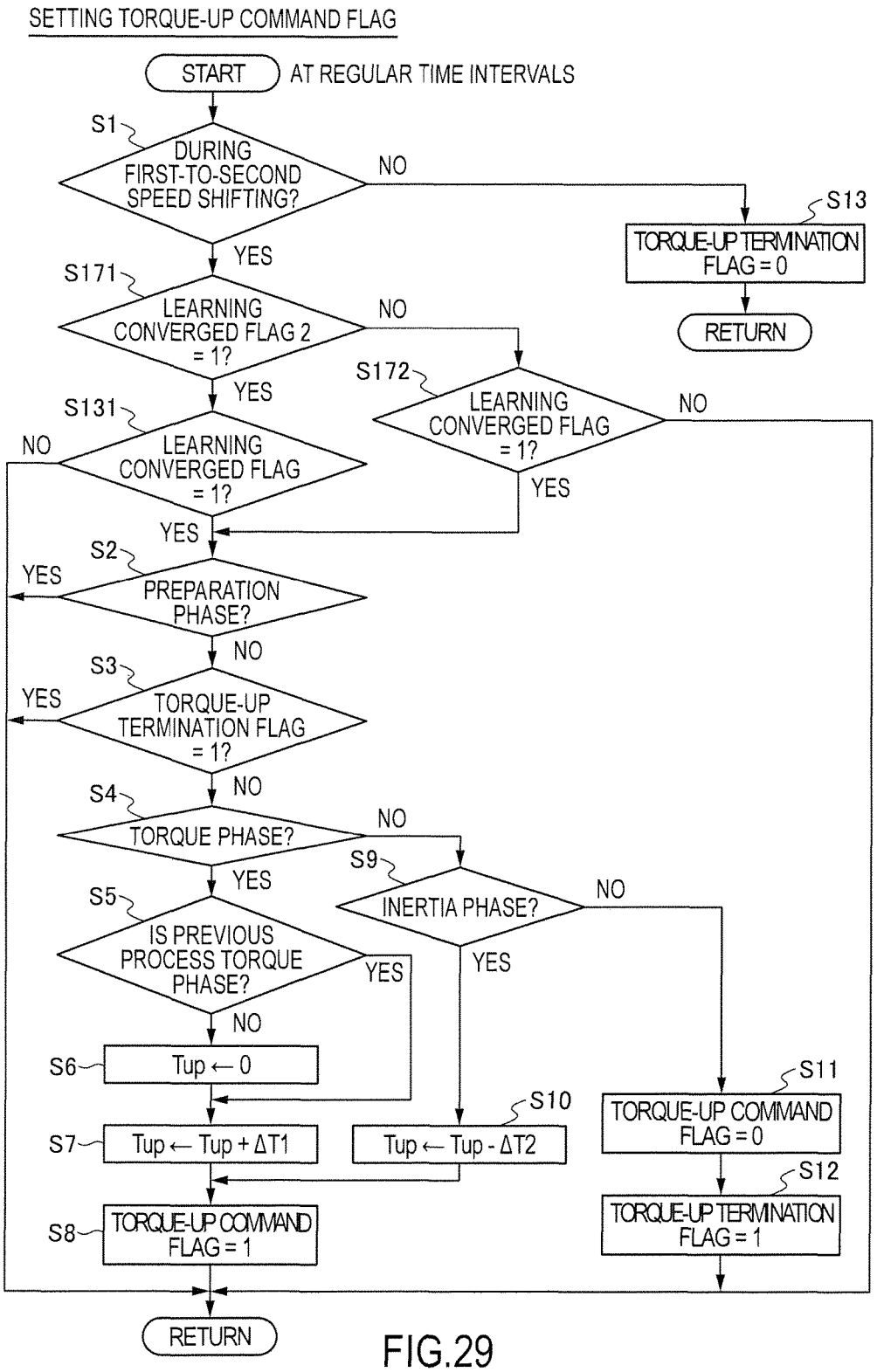
FIG. 29 is a flowchart indicating a setting of a torque-up command flag according to the seventh embodiment.

The flowchart in FIG. 29 is a flowchart to set the torque-up command flag of the seventh embodiment. This flowchart is executed by the CVT controller 61 at regular time intervals (such as every 10 ms) subsequently to the flowcharts in FIG. 27A, FIG. 27B, and FIG. 28. In FIG. 29, like reference numerals designate like elements as in the flowchart in FIG. 25 of the sixth embodiment.

A description will be given of mainly the parts different from the flowchart in FIG. 25 of the sixth embodiment. In FIG. 29, Steps S171 and S172 are added to the flowchart in FIG. 25. That is, in the case of the first-to-second speed shifting flag=1 in Step S1, the CVT controller 61 determines that it is during the first-to-second speed shifting. Then, the CVT controller 61 advances the process to Step S171 to refer to the learning converged flag 2 (already set in the flowchart in FIG. 27B). In the case of the learning converged flag 2=0, the CVT controller 61 determines that the learning value has not been converged yet as the second time after the first convergence of the learning value. Then, the CVT controller 61 advances the process not to Step S2 and following Steps but to Step S172. When the learning value has not been converged yet as the second time after the first convergence of the learning value (that is, before the second convergence of the learning value), the CVT controller 61 does not proceed the process to the setting of the torque-up command flag in Step S2 and following Steps. That is, the CVT controller 61 restricts the torque-up (increasing the torque-up command value Tup from zero).

The reason to restrict the torque-up after the first convergence of the learning value and before the second convergence of the learning value is as follows. That is, the flowchart in FIG. 29 is executed also after the first convergence of the learning value and before the second convergence of the learning value. Then, if it is during the first-to-second speed shifting in Step S1 in FIG. 29, and the process is proceeded to Step S2 and following Steps to set the torque-up command flag (that is, the torque-up is performed) during the first-to-second speed shifting, the excessive increase in the auxiliary transmission mechanism input rotational speed Nin possibly occurs again. Therefore, the CVT controller 61 is configured not to proceed the process to the setting of the torque-up command flag in Step S2 and following Steps in the case of the learning converged flag 2=0 (after the first convergence of the learning value and before the second convergence of the learning value).

In the seventh embodiment, since the learning value is configured to be performed the first update, even before the second convergence of the learning value, the process is permitted to proceed to Step S2 and following Steps insofar as after the first convergence of the learning value. Accordingly, in Step S172, the CVT controller 61 refers to the learning converged flag (already set in the flowchart in FIG. 27A). In the case of the learning converged flag=0, the CVT controller 61 determines that the learning value has not been converged yet by the first update of the learning value. Then, the CVT controller 61 terminates the current process. In the case of the learning converged flag=1 in Step S172, the CVT controller 61 determines that the learning value has been converged by the first update of the learning value, and advances the process to the setting of the torque-up command flag in Step S2 and following Steps.

On the other hand, in the case of the learning converged flag 2=1 (after the second convergence of the learning value) in Step S171, the CVT controller 61 advances the process to the setting of the torque-up command flag in Step S2 and following Steps. That is, after the second convergence of the learning value, the restriction of the torque-up (increasing the torque-up command value Tup from zero) is released to perform the torque-up. During the first first-to-second speed shifting after the second convergence of the learning value, the CVT controller 61 determines whether the excessive increase in the input rotational speed Nin has occurred in the state where the torque-up is restricted. Then, when the excessive increase in the input rotational speed Nin has not occurred, the CVT controller 61 determines that the learning value was converged again by the second update of the learning value. In other words, according to the second speed clutch command hydraulic when the learning value was converged again by the second update of the learning value, the more the second speed clutch capacity is actually generated, the more sufficient the engaging force of the second speed clutch becomes to prevent the excessive increase in the input rotational speed Nin from occurring. Therefore, since the engaging force of the second speed clutch is sufficient even during the second first-to-second speed shifting after the second update of the learning value, the excessive increase in the input rotational speed Nin does not occur if the torque-up is performed during the second first-to-second speed shifting after the second update of the learning value.

In the seventh embodiment, when the excessive increase in the input rotational speed Nin occurs in the case where the CVT controller 61 commanded to increase the torque-up command value Tup during the first-to-second speed shifting after the first convergence of the learning value (after the learning value was converged), the following operation is performed. That is, during the first-to-second speed shifting next of the first-to-second speed shifting where the excessive increase occurred, the CVT controller 61 (the command means) is restricted to command the engine controller 21 (the engine control means). The command is a command to increase the torque-up command value Tup. This prevents the excessive increase in the auxiliary transmission mechanism input rotational speed Nin and the engagement shock after the excessive increase even if the second speed clutch engagement capacity is not generated because of the environmental condition and the aged deterioration during the first-to-second speed shifting that comes after the first convergence of the learning value.

In the seventh embodiment, the learning second execution means and the permission means are disposed. The learning second execution means performs the following operations. During the first-to-second speed shifting next of the first-to-second speed shifting where the excessive increase occurred, the learning second execution means makes a state where the CVT controller 61 (the command means) is restricted to command the engine controller 21 (the engine control means). In this restricted state, when the excessive increase in the auxiliary transmission mechanism input rotational speed Nin occurs again, the learning second execution means updates the learning value to the side to increase the second speed clutch command hydraulic. When the second speed clutch command hydraulic that includes the learning value after updating is provided to the hydraulic control valve unit 51e (the hydraulic adjusting means) during the first-to-second speed shifting next of the first-to-second speed shifting where the excessive increase occurred, if the excessive increase ceases to occur, the learning second execution means determines that the learning value has been converged again. During the first-to-second speed shifting after the learning value was converged again by the learning second execution means, the permission means releases the restriction of the command by the CVT controller 61 to the engine controller 21, and permits to increase the engine torque from the basic engine torque Te0. This prevents the excessive increase in the auxiliary transmission mechanism input rotational speed Nin and the clutch engagement shock after the excessive increase after the second convergence of the learning value, even if the second speed clutch engagement capacity is not actually generated after the first convergence of the learning value because of the environmental condition and the aged deterioration.

While the above-described embodiments describe only until the learning second execution means, an embodiment that includes learning third execution means (this embodiment is referred to as an eighth embodiment.) is applicable. That is, in the eighth embodiment, restriction means, the learning third execution means, and permission means are disposed. The restriction means performs the following operations during the first-to-second speed shifting after the learning value was converged again by the learning second execution means. That is, the restriction means determines whether the excessive increase in the auxiliary transmission mechanism input rotational speed Nin occurs when the torque-up (increasing the torque-up command value Tup from zero) is performed. Then, when the excessive increase has occurred, the restriction means restricts the CVT controller 61 (the command means) to command the engine controller 21 (the engine control means) during the first-to-second speed shifting next of the first-to-second speed shifting where the excessive increase occurred. The learning third execution means performs the following operations. That is, the learning third execution means makes a state where the CVT controller 61 is restricted to command the engine controller 21 during the first-to-second speed shifting next of the first-to-second speed shifting where the excessive increase occurred. In this restricted state, when the excessive increase in the auxiliary transmission mechanism input rotational speed Nin occurs, the learning third execution means updates the learning value to the side to increase the second speed clutch command hydraulic (the command hydraulic). When the second speed clutch command hydraulic that includes the learning value after updating is provided to the hydraulic control valve unit 51e (the hydraulic adjusting means) during the first-to-second speed shifting next of the first-to-second speed shifting where the excessive increase occurred, if the excessive increase ceases to occur, the learning third execution means determines that the learning value has converged for the third time. During the first-to-second speed shifting after the learning value was converged for the third time by the learning third execution means, the permission means releases the restriction of the command by the CVT controller 61 to the engine controller 21, and permits to increase the engine torque from the basic engine torque Te0. This prevents the excessive increase in the auxiliary transmission mechanism input rotational speed Nin and the clutch engagement shock after the excessive increase after the learning value was converged for the third time, even if the second speed clutch engagement capacity is not actually generated after the learning value was converged for the third time because of the environmental condition and the aged deterioration.

While the above-described embodiments are described as a single embodiment, they may be combined as necessary.

The embodiments of the present invention described above are merely illustration of some application examples of the present invention and not of the nature to limit the technical scope of the present invention to the specific constructions of the above embodiments.

This application claims a priority based on the patent application No. 2014-062210 filed before the Japanese Patent Office on Mar. 25, 2014, the entire contents of which are incorporated herein by reference.

The invention claimed is:

1. A control device for a vehicle, wherein
the vehicle includes a power train that includes an engine and a continuously variable transmission coupled to one another, wherein the continuously variable transmission includes:
a continuously variable transmission mechanism configured to steplessly change a transmission gear ratio;
an auxiliary transmission mechanism disposed in series with respect to the continuously variable transmission mechanism, the auxiliary transmission mechanism including at least a first engagement portion and a second engagement portion, the auxiliary transmission mechanism achieving a gear shifting from a first speed stage to a second speed stage by shifting the first engagement portion from an engaged state to a released state while shifting the second engagement portion from a released state to an engaged state, the second speed stage having a small transmission gear ratio compared with the first speed stage; and a hydraulic adjusting unit configured to adjust a command hydraulic provided to the second engagement portion, the vehicle control device comprising:

an engine controller configured to control the engine so as to obtain a basic engine torque corresponding to an operating state of the vehicle; and a shift controller configured to set a target value of a transmission gear ratio through the continuously variable transmission mechanism and the auxiliary transmission mechanism based on the operating state of the vehicle, the shift controller controlling the continuously variable transmission mechanism and the auxiliary transmission mechanism such that the target value is achieved, wherein the shift controller is further configured to:

command the engine controller to increase an engine torque from the basic engine torque during the gear shifting from the first speed stage to the second speed stage;

update a learning value of the command hydraulic to a side to increase the command hydraulic when an excessive increase in an input rotational speed of the auxiliary transmission mechanism occurs during the gear shifting, and determine the learning value to be converged if the excessive increase ceases to occur when the command hydraulic including the learning value after the update is provided to the second engagement portion during another gear shifting after the gear shifting; and determine that the engagement capacity of the second engagement portion has been generated when the learning value is converged.

2. The vehicle control device according to claim 1, wherein during the gear shifting, a torque phase that distributes an input torque of the auxiliary transmission mechanism to the first engagement portion and the second engagement portion to perform a changeover of a torque, and an inertia phase where an input rotational speed of the auxiliary transmission mechanism transitions from a rotation speed before the changeover of the torque to a rotation speed after the changeover of the torque are included, and the shift controller generates a torque-up command to increase the engine torque from the basic engine torque, and a torque-down command to decrease the engine torque to return to the basic engine torque after the command to increase the engine torque.

3. The vehicle control device according to claim 2, wherein a timing when the shift controller starts increasing the engine torque from the basic engine torque is a start timing of the torque phase.

4. The vehicle control device according to claim 2, wherein the shift controller sets an increase rate, the increase rate linearly increasing from the start timing of the torque phase to a termination timing of the torque phase, the start timing of the torque phase being 0%, the termination timing of the torque phase being 100%, and commands to increase the engine torque in synchronization with the increase rate.

5. The vehicle control device according to claim 2, wherein a maximum value of an amount of torque-up increased by the shift controller is determined corresponding to the basic engine torque.

6. The vehicle control device according to claim 2, wherein a timing when the shift controller starts decreasing the engine torque is a start timing of the inertia phase.

7. The vehicle control device according to claim 2, wherein the shift controller sets a progress rate, the progress rate linearly increasing from the start timing of the inertia phase to a termination timing of the inertia phase, the start timing of the inertia phase being 0%, the termination timing of the inertia phase being 100%, and commands to decrease the engine torque in synchronization with the progress rate.

8. The vehicle control device according to claim 2, wherein the shift controller starts the command to increase the engine torque at a timing before the start of the torque phase.

9. The vehicle control device according to claim 8, wherein the timing before the start of the torque phase is set with an amount of a supply delay of intake air corresponding to an amount of volume from a throttle valve to an intake port.

10. The vehicle control device according to claim 8, wherein the shift controller causes the engine torque to reach a maximum value of the torque-up amount before the torque phase terminates.

11. The vehicle control device according to claim 2, wherein a maximum value of an amount of torque-up increased by the shift controller is determined corresponding to an engine rotation speed and the basic engine torque.

12. The vehicle control device according to claim 2, wherein the shift controller starts the command to decrease the engine torque at a timing before the start of the inertia phase.

13. The vehicle control device according to claim 12, wherein the timing before the start of the inertia phase is set with an amount of a supply delay of intake air corresponding to an amount of volume from a throttle valve to an intake port.

14. The vehicle control device according to claim 12, wherein the shift controller returns the engine torque to the basic engine torque before the inertia phase terminates.

15. The vehicle control device according to claim 1, wherein the shift controller stops the command to increase the engine torque upon updating of the learning value of the command hydraulic, and starts again the command to increase the engine torque after determining that the engagement capacity of the second engagement portion has been generated.

16. The vehicle control device according to claim 1, wherein the shift controller is further configured to:

determine whether the excessive increase in the input rotational speed of the auxiliary transmission mechanism occurs during the gear shifting;

update the learning value to the side to increase the command hydraulic when the occurrence of the excessive increase during the gear shifting is determined;

provide the command hydraulic including the learning value to the second engagement portion in a state where the shift controller is restricted to command the engine controller during a gear shifting after updating the learning value, and determine whether an excessive increase in the input rotational speed of the auxiliary transmission mechanism occurs;

determine the learning value to have been converged when the occurrence of the excessive increase during the gear shifting after the updating is not determined; and permit the engine torque to increase from the basic engine torque during a gear shifting after the convergence of the learning value.

17. The vehicle control device according to claim 16, wherein when an excessive increase in the input rotational speed of the auxiliary transmission mechanism occurs as a result of increasing the engine torque during the gear shifting after the convergence of the learning value, the shift controller is restricted to command to the engine controller during a gear shifting next of the gear shifting where the excessive increase occurred.

18. The vehicle control device according to claim 17, wherein the shift controller is further configured to:

perform a second learning of the command hydraulic that updates the learning value to the side to increase the command hydraulic when the excessive increase in the input rotational speed of the auxiliary transmission mechanism occurs again in the state where the shift controller is restricted to command the engine controller during the gear shifting next of the gear shifting where the excessive increase occurred, and determine the learning value to have been converged again if the excessive increase ceases to occur when the command hydraulic including the learning value after the update is provided to the second engagement portion during a gear shifting after the second learning; and permit the engine torque to increase from the basic engine torque during a gear shifting after the learning value was converged again.

19. The vehicle control device according to claim 18, wherein the shift controller is further configured to:

when an excessive increase in the input rotational speed of the auxiliary transmission mechanism occurs as a result of increasing the engine torque during the gear shifting after the learning value was converged again, restrict the command to the engine controller during a gear shifting next of the gear shifting where the excessive increase occurred;

perform a third learning of the command hydraulic that updates the learning value to the side to increase the command hydraulic when an excessive increase in the input rotational speed of the auxiliary transmission mechanism occurs in the state where the shift controller is restricted to command the engine controller during the gear shifting next of the gear shifting where the excessive increase occurred, and determine the learning value to have been converged for the third time if the excessive increase ceases to occur when the command hydraulic including the learning value after the update is provided to the second engagement portion during a gear shifting after the third learning; and permit the engine torque to increase from the basic engine torque during a gear shifting after the learning value was converged for the third time.

20. A method of controlling a vehicle including a power train that includes an engine and a continuously variable transmission coupled to one another, wherein the continuously variable transmission includes:

a continuously variable transmission mechanism configured to steplessly change a transmission gear ratio; and an auxiliary transmission mechanism disposed in series with respect to the continuously variable transmission mechanism, the auxiliary transmission mechanism including at least a first engagement portion and a second engagement portion, the auxiliary transmission mechanism achieving a gear shifting from a first speed stage to a second speed stage by shifting the first engagement portion from an engaged state to a released state while shifting the second engagement portion from a released state to an engaged state, the second speed stage having a small transmission gear ratio compared with the first speed stage, the method comprising:

controlling the engine so as to obtain a basic engine torque corresponding to an operating state of the vehicle;

setting a target value of a transmission gear ratio through the continuously variable transmission mechanism and the auxiliary transmission mechanism based on the operating state of the vehicle, and control the continuously variable transmission mechanism and the auxiliary transmission mechanism such that the target value is achieved;

increasing an engine torque from the basic engine torque during the gear shifting from the first speed stage to the second speed stage;

updating a learning value of a command hydraulic provided to the second engagement portion to a side to increase the command hydraulic when an excessive increase in an input rotational speed of the auxiliary transmission mechanism occurs during the gear shifting, and determining the learning value to be converged if the excessive increase ceases to occur when the command hydraulic including the learning value after the update is provided to the second engagement portion during another gear shifting after the gear shifting; and determining that the engagement capacity of the second engagement portion has been generated when the learning value is converged.

* * * * *